United States Patent
Carroll et al.

(10) Patent No.: US 10,373,223 B2
(45) Date of Patent: Aug. 6, 2019

(54) SYSTEM AND METHOD FOR RECEIVING AND MANAGING REMOTELY PLACED ORDERS

(71) Applicant: RESTAURANT TECHNOLOGY INC., Oakbrook, IL (US)

(72) Inventors: Roger D. Carroll, Downers Grove, IL (US); Natalie Muhs, Woodridge, IL (US); Jeff Pollard, Plainfield, IL (US); Jeffrey Steres, Northbrook, IL (US); Kim Wilson, Highland Park, IL (US)

(73) Assignee: Restaurant Technology Inc., Oakbrook Terrace, IL (US)

( * ) Notice: Subject to any disclaimer, the term of this patent is extended or adjusted under 35 U.S.C. 154(b) by 0 days.

(21) Appl. No.: 14/937,112

(22) Filed: Nov. 10, 2015

(65) Prior Publication Data
US 2016/0063585 A1   Mar. 3, 2016

Related U.S. Application Data

(63) Continuation of application No. 14/078,396, filed on Nov. 12, 2013, now abandoned.
(Continued)

(51) Int. Cl.
*G06Q 30/00* (2012.01)
*G06Q 30/06* (2012.01)
*G06Q 50/12* (2012.01)

(52) U.S. Cl.
CPC ..... *G06Q 30/0609* (2013.01); *G06Q 30/0633* (2013.01); *G06Q 30/0635* (2013.01); *G06Q 30/0641* (2013.01); *G06Q 50/12* (2013.01)

(58) Field of Classification Search
CPC .......... G06Q 30/0255; G06Q 30/0235; G06Q 10/105; G06Q 10/103; G06Q 10/067;
(Continued)

(56) References Cited

U.S. PATENT DOCUMENTS

| 1,901,243 A | 3/1933 | Horwitt |
| 2,044,467 A | 6/1936 | Cleveland |

(Continued)

FOREIGN PATENT DOCUMENTS

| CA | 1236546 A1 | 5/1988 |
| CA | 2044467 C | 5/1995 |

(Continued)

OTHER PUBLICATIONS

DiPietroe et al, The Use of Social Networking Sites in the Restaurant Industry: Best Practices, 2012, Journal of Foodservice Business Research, pp. 265-285 (Year: 2012).*

(Continued)

*Primary Examiner* — Anita Coupe
*Assistant Examiner* — Uche Byrd
(74) *Attorney, Agent, or Firm* — James P. Muraff; Neal, Gerber & Eisenberg LLP

(57) ABSTRACT

A system for enabling the remote ordering of products, primarily for use in a multi-vendor system, is disclosed. Orders are placed remotely, such as through wireless devices connected to a central server. The central server, in turn, is in communication (wireless or otherwise) with a server located at one or more venues within the organization operating the system. The one or more venues provide products or services available for ordering through the system. Where multiple venues are involved, the system is designed to handle differences in the product or service availability at those different venues, and provides for an ability to make corrections to orders that may be or may become necessary on account of those differences. The system provides for multiple options through which users can pay for and receive orders, and also provides methods for synchronizing the remote ordering system with pre- (Continued)

existing, conventional methods of ordering and product/service order fulfillment.

25 Claims, 29 Drawing Sheets

Related U.S. Application Data

(60) Provisional application No. 61/725,379, filed on Nov. 12, 2012.

(58) Field of Classification Search
CPC .. G06Q 30/02; G06Q 10/06315; G06Q 40/00; G06Q 30/00; G06Q 30/06; G06Q 30/0609; H04Q 7/20
See application file for complete search history.

(56) References Cited

U.S. PATENT DOCUMENTS

| | | |
|---|---|---|
| 2,070,575 A | 2/1937 | Bochskandl |
| 2,098,697 A | 11/1937 | Vanderput |
| 2,219,172 A | 10/1940 | Bany |
| 2,887,382 A | 5/1959 | Rivoche |
| 2,975,055 A | 3/1961 | Brown et al. |
| 3,267,436 A | 8/1966 | Alpert et al. |
| 3,304,416 A | 2/1967 | Wolf |
| 3,339,671 A | 9/1967 | Simjian |
| 3,420,336 A | 1/1969 | Luther |
| 3,622,995 A | 11/1971 | Dilks et al. |
| 3,759,388 A | 9/1973 | Thomason |
| 3,824,544 A | 7/1974 | Simijian |
| 3,826,344 A | 7/1974 | Wahlberg |
| 3,831,807 A | 8/1974 | Deaton et al. |
| 3,836,755 A | 9/1974 | Ehrat |
| 3,946,220 A | 3/1976 | Brobeck et al. |
| 4,043,483 A | 8/1977 | Gore et al. |
| 4,073,368 A | 2/1978 | Mustapick |
| 4,123,212 A | 10/1978 | Piazza |
| 4,347,359 A | 8/1982 | Farge et al. |
| 4,348,551 A | 9/1982 | Nakatani et al. |
| 4,373,133 A | 2/1983 | Clyne et al. |
| 4,385,366 A | 5/1983 | Housey, Jr. |
| 4,388,689 A | 6/1983 | Hayman et al. |
| 4,392,119 A | 7/1983 | Price et al. |
| 4,396,985 A | 8/1983 | Ohara |
| 4,415,065 A | 11/1983 | Sandstedt |
| 4,449,186 A | 5/1984 | Kelly et al. |
| 4,481,590 A | 11/1984 | Otten |
| 4,505,194 A | 3/1985 | Bishop et al. |
| 4,519,522 A | 5/1985 | McElwee |
| 4,530,067 A | 7/1985 | Dorr |
| 4,547,851 A | 10/1985 | Kurland |
| 4,553,222 A | 11/1985 | Kurland et al. |
| 4,567,359 A | 1/1986 | Lockwood |
| 4,569,421 A | 2/1986 | Sandstedt |
| RE32,115 E | 4/1986 | Lockwood et al. |
| 4,582,172 A | 4/1986 | Takeuchi et al. |
| 4,598,810 A | 7/1986 | Shore et al. |
| 4,638,312 A | 1/1987 | Quinn et al. |
| 4,649,481 A | 3/1987 | Takahashi |
| 4,654,513 A | 3/1987 | Hennessy |
| 4,661,908 A | 4/1987 | Hamano et al. |
| 4,668,150 A | 5/1987 | Blumberg |
| 4,675,151 A | 6/1987 | Leclercq |
| 4,675,515 A | 6/1987 | Lucero |
| 4,676,343 A | 6/1987 | Humble et al. |
| 4,706,794 A | 11/1987 | Awane et al. |
| 4,722,053 A | 1/1988 | Dubno et al. |
| 4,723,212 A | 2/1988 | Mindrum et al. |
| 4,734,005 A | 3/1988 | Blumberg |
| 4,772,053 A | 9/1988 | Oxley |
| 4,775,935 A | 10/1988 | Yourick |
| 4,797,818 A | 1/1989 | Cotter |
| 4,807,169 A | 2/1989 | Overbeck |
| 4,812,629 A | 3/1989 | O'Niel et al. |
| 4,814,592 A | 3/1989 | Bradt et al. |
| 4,825,045 A | 4/1989 | Humble |
| 4,843,547 A | 6/1989 | Fuyama et al. |
| 4,858,743 A | 8/1989 | Paraskevakos et al. |
| 4,858,775 A | 8/1989 | Crouch |
| 4,860,876 A | 8/1989 | Moore et al. |
| 4,879,650 A | 11/1989 | Kurimoto et al. |
| 4,882,475 A | 11/1989 | Miller et al. |
| 4,891,756 A | 1/1990 | Williams, III |
| 4,893,727 A | 1/1990 | Near |
| 4,896,024 A | 1/1990 | Morello et al. |
| 4,903,815 A | 2/1990 | Hirschfeld et al. |
| 4,915,205 A | 4/1990 | Reid et al. |
| 4,922,435 A | 5/1990 | Cahlander et al. |
| 4,935,720 A | 6/1990 | Kalfoun |
| 4,959,686 A | 9/1990 | Spallone et al. |
| 4,967,906 A | 11/1990 | Morello et al. |
| 4,991,739 A | 2/1991 | Levasseur |
| 5,003,472 A | 3/1991 | Perrill et al. |
| 5,007,518 A | 4/1991 | Crooks et al. |
| 5,012,077 A | 4/1991 | Takano |
| 5,013,897 A | 5/1991 | Harman et al. |
| 5,020,958 A | 6/1991 | Tuttobene |
| 5,031,098 A | 7/1991 | Miller et al. |
| 5,042,686 A | 8/1991 | Stucki |
| 5,077,462 A | 12/1991 | Newell et al. |
| 5,077,607 A | 12/1991 | Johnson et al. |
| 5,083,638 A | 1/1992 | Schneider |
| 5,088,586 A | 2/1992 | Isobe et al. |
| 5,095,195 A | 3/1992 | Harman et al. |
| 5,111,391 A | 5/1992 | Fields et al. |
| 5,128,862 A | 7/1992 | Mueller |
| 5,132,914 A | 7/1992 | Cahlander et al. |
| 5,132,992 A | 7/1992 | Yurt et al. |
| 5,139,384 A | 8/1992 | Tuttobene |
| 5,143,193 A | 9/1992 | Geraci |
| 5,159,560 A | 10/1992 | Newell et al. |
| 5,172,328 A | 12/1992 | Cahlander et al. |
| 5,186,281 A | 2/1993 | Jenkins |
| 5,191,749 A | 3/1993 | Cappi et al. |
| 5,202,825 A | 4/1993 | Miller et al. |
| 5,206,814 A | 4/1993 | Cahlander et al. |
| 5,212,649 A | 5/1993 | Pelletier et al. |
| 5,218,527 A | 6/1993 | Ishikawa et al. |
| 5,235,509 A | 8/1993 | Mueller et al. |
| 5,239,165 A | 8/1993 | Novak |
| 5,250,789 A | 10/1993 | Johnsen |
| 5,253,275 A | 10/1993 | Yurt et al. |
| 5,253,564 A | 10/1993 | Rosenbrock et al. |
| 5,262,938 A | 11/1993 | Rapoport et al. |
| 5,272,747 A | 12/1993 | Meads |
| 5,273,183 A | 12/1993 | Tuttobene |
| 5,313,392 A | 5/1994 | Temma et al. |
| 5,323,327 A | 6/1994 | Carmichael et al. |
| D348,654 S | 7/1994 | Branck et al. |
| 5,353,219 A | 10/1994 | Mueller et al. |
| 5,357,426 A | 10/1994 | Morita et al. |
| 5,370,252 A | 12/1994 | Parsons et al. |
| 5,375,680 A | 12/1994 | Ikeda et al. |
| 5,377,097 A | 12/1994 | Fuyama et al. |
| 5,383,111 A | 1/1995 | Homma et al. |
| 5,385,265 A | 1/1995 | Schlamp |
| RE34,872 E | 3/1995 | Lucero |
| 5,412,560 A | 5/1995 | Dennison |
| 5,412,564 A | 5/1995 | Ecer |
| 5,445,295 A | 8/1995 | Brown |
| 5,454,721 A | 10/1995 | Kuch |
| 5,467,892 A | 11/1995 | Schlamp |
| 5,478,989 A | 12/1995 | Shepley |
| 5,482,139 A | 1/1996 | Rivalto |
| 5,488,202 A | 1/1996 | Baitz et al. |
| 5,497,314 A | 3/1996 | Novak |
| 5,499,707 A | 3/1996 | Steury |
| 5,504,589 A | 4/1996 | Montague et al. |
| 5,510,979 A | 4/1996 | Moderi et al. |
| 5,513,116 A | 4/1996 | Buckley et al. |
| 5,524,077 A | 6/1996 | Faaland et al. |
| 5,546,316 A | 8/1996 | Buckley et al. |

(56) References Cited

U.S. PATENT DOCUMENTS

| | | |
|---|---|---|
| 5,550,746 A | 8/1996 | Jacobs |
| 5,550,863 A | 8/1996 | Yurt et al. |
| 5,553,312 A | 9/1996 | Gattey et al. |
| 5,555,143 A | 9/1996 | Hinnen et al. |
| 5,559,714 A | 9/1996 | Banks et al. |
| 5,576,951 A | 11/1996 | Lockwood |
| 5,594,791 A | 1/1997 | Szlam et al. |
| 5,595,264 A | 1/1997 | Trotta, Jr. |
| 5,602,730 A | 2/1997 | Coleman et al. |
| 5,608,778 A | 3/1997 | Partridge, III |
| 5,616,269 A | 4/1997 | Fowler et al. |
| 5,630,070 A | 5/1997 | Dietrich et al. |
| 5,637,845 A | 6/1997 | Kolls |
| 5,647,507 A | 7/1997 | Kasper |
| 5,653,906 A | 8/1997 | Fowler et al. |
| 5,664,110 A | 9/1997 | Green et al. |
| 5,682,276 A | 10/1997 | Hinnen et al. |
| 5,704,350 A | 1/1998 | Williams, III |
| 5,712,985 A | 1/1998 | Lee et al. |
| 5,724,069 A | 3/1998 | Chen |
| 5,732,398 A | 3/1998 | Tagawa |
| 5,734,150 A | 3/1998 | Brown et al. |
| 5,754,850 A | 5/1998 | Janssen |
| 5,768,142 A | 6/1998 | Jacobs |
| 5,774,871 A | 6/1998 | Ferro |
| 5,804,807 A | 9/1998 | Murrah et al. |
| 5,806,071 A | 9/1998 | Balderrama et al. |
| 5,812,393 A | 9/1998 | Drucker |
| 5,819,735 A | 10/1998 | Mansfield et al. |
| 5,831,862 A | 11/1998 | Hetrick et al. |
| 5,832,446 A | 11/1998 | Neuhaus |
| 5,839,115 A | 11/1998 | Coleman |
| 5,842,603 A | 12/1998 | Schroeder et al. |
| 5,845,263 A | 12/1998 | Camaisa et al. |
| 5,864,824 A | 1/1999 | Iguchi et al. |
| 5,873,069 A | 2/1999 | Reuhl et al. |
| 5,875,110 A | 2/1999 | Jacobs |
| 5,878,337 A | 3/1999 | Joao et al. |
| 5,898,158 A | 4/1999 | Shimizu et al. |
| 5,907,275 A | 5/1999 | Battistini et al. |
| 5,913,454 A | 6/1999 | McHale |
| 5,937,386 A | 8/1999 | Frantz |
| 5,943,652 A | 8/1999 | Sisley et al. |
| 5,954,797 A | 9/1999 | Sidey |
| 5,963,452 A | 10/1999 | Etoh et al. |
| 5,969,968 A | 10/1999 | Pentel |
| 5,974,393 A | 10/1999 | McCullough et al. |
| 5,984,509 A | 11/1999 | Scott |
| 5,987,428 A | 11/1999 | Walter |
| 5,988,346 A | 11/1999 | Tedesco et al. |
| 5,988,431 A | 11/1999 | Roe |
| 5,997,924 A | 12/1999 | Olander, Jr. et al. |
| 6,002,395 A | 12/1999 | Wagner et al. |
| 6,002,720 A | 12/1999 | Yurt et al. |
| 6,010,067 A | 1/2000 | Elbaum |
| 6,014,137 A | 1/2000 | Burns |
| 6,024,281 A | 2/2000 | Shepley |
| 6,026,372 A | 2/2000 | Savage |
| 6,038,546 A | 3/2000 | Ferro |
| 6,039,244 A | 3/2000 | Finsterwald |
| 6,042,007 A | 3/2000 | Nugent, Jr. et al. |
| 6,047,338 A | 4/2000 | Grolemund |
| 6,049,780 A | 4/2000 | Fuyama |
| 6,050,448 A | 4/2000 | Willis |
| 6,056,194 A | 5/2000 | Kolls |
| 6,058,373 A | 5/2000 | Blinn et al. |
| 6,061,660 A | 5/2000 | Eggleston et al. |
| 6,062,478 A | 5/2000 | Izaguirre et al. |
| 6,072,481 A | 6/2000 | Matsushita et al. |
| 6,076,101 A | 6/2000 | Kamakura et al. |
| 6,078,806 A | 6/2000 | Heinonen et al. |
| 6,078,848 A | 6/2000 | Bernstein et al. |
| 6,085,888 A | 7/2000 | Tedesco et al. |
| 6,087,927 A | 7/2000 | Battistini et al. |
| 6,088,681 A | 7/2000 | Coleman et al. |
| 6,101,483 A | 8/2000 | Petrovich et al. |
| 6,102,162 A | 8/2000 | Teicher |
| 6,115,695 A | 9/2000 | Kern |
| 6,125,353 A | 9/2000 | Yagasaki |
| 6,138,911 A | 10/2000 | Fredregill et al. |
| 6,140,941 A | 10/2000 | Dwyer et al. |
| 6,141,647 A | 10/2000 | Meijer et al. |
| 6,144,702 A | 11/2000 | Yurt et al. |
| 6,161,059 A | 12/2000 | Tedesco et al. |
| 6,164,546 A | 12/2000 | Kumagai et al. |
| 6,169,890 B1 | 1/2001 | Vatanen |
| 6,179,206 B1 | 1/2001 | Matsumori |
| 6,181,051 B1 | 1/2001 | Puskas |
| 6,181,981 B1 | 1/2001 | Varga et al. |
| 6,199,141 B1 | 3/2001 | Weinreb et al. |
| 6,202,006 B1 | 3/2001 | Scott |
| 6,208,976 B1 | 3/2001 | Kinebuchi et al. |
| 6,216,953 B1 | 4/2001 | Kumagai et al. |
| 6,236,974 B1 | 5/2001 | Kolawa et al. |
| 6,246,998 B1 | 6/2001 | Matsumori |
| 6,281,928 B1 | 8/2001 | Umezaki et al. |
| 6,298,976 B1 | 10/2001 | David |
| 6,311,165 B1 | 10/2001 | Coutts et al. |
| 6,317,649 B1 | 11/2001 | Tedesco et al. |
| 6,321,985 B1 | 11/2001 | Kolls |
| 6,330,958 B1 | 12/2001 | Ruskin et al. |
| 6,334,110 B1 | 12/2001 | Walter et al. |
| 6,343,739 B1 | 2/2002 | Lippert |
| 6,345,259 B1 | 2/2002 | Sandoval |
| 6,356,940 B1 | 3/2002 | Short |
| 6,360,139 B1 | 3/2002 | Jacobs |
| 6,366,220 B1 | 4/2002 | Elliott |
| 6,367,653 B1 | 4/2002 | Ruskin et al. |
| 6,374,240 B1 | 4/2002 | Walker et al. |
| 6,381,582 B1 | 4/2002 | Walker et al. |
| 6,381,583 B1 | 4/2002 | Kenney |
| 6,387,049 B1 | 5/2002 | Moore |
| 6,397,126 B1 | 5/2002 | Nelson |
| 6,397,199 B1 | 5/2002 | Goodwin, III |
| 6,412,654 B1 | 7/2002 | Cleeve |
| 6,415,555 B1 | 7/2002 | Montague |
| 6,415,950 B1 | 7/2002 | Robrechts |
| 6,416,270 B1 | 7/2002 | Steury et al. |
| 6,425,524 B2 | 7/2002 | Pentel |
| 6,435,406 B1 | 8/2002 | Pentel |
| 6,435,413 B1 | 8/2002 | Kumagai et al. |
| 6,439,345 B1 | 8/2002 | Recktenwald et al. |
| 6,456,981 B1 | 9/2002 | Dejaeger et al. |
| 6,457,038 B1 | 9/2002 | Defosse |
| 6,462,644 B1 | 10/2002 | Howell et al. |
| 6,473,739 B1 | 10/2002 | Showghi et al. |
| 6,508,762 B2 | 1/2003 | Karnieli |
| 6,510,430 B1 | 1/2003 | Oberwager et al. |
| 6,533,168 B1 | 3/2003 | Ching |
| 6,539,282 B2 | 3/2003 | Metcalf et al. |
| 6,540,100 B2 | 4/2003 | Credle, Jr. et al. |
| 6,553,386 B1 | 4/2003 | Alabaster |
| 6,556,963 B1 | 4/2003 | Tetzlaff |
| 6,574,603 B1 | 6/2003 | Dickson et al. |
| 6,578,671 B2 | 6/2003 | Shen |
| 6,580,360 B1 | 6/2003 | McKee et al. |
| 6,585,516 B1 | 7/2003 | Alabaster |
| 6,636,835 B2 | 10/2003 | Ragsdale-Elliott et al. |
| 6,644,495 B2 | 11/2003 | Ruskin et al. |
| 6,646,659 B1 | 11/2003 | Brown et al. |
| 6,658,323 B2 | 12/2003 | Tedesco et al. |
| 6,661,997 B2 | 12/2003 | Ogo |
| 6,675,165 B1 | 1/2004 | Rothschild |
| 6,685,188 B2 | 2/2004 | Rehbein et al. |
| 6,708,879 B2 | 3/2004 | Hunt |
| 6,722,473 B1 | 4/2004 | Ramachandran et al. |
| 6,742,673 B2 | 6/2004 | Credle, Jr. et al. |
| 6,779,720 B2 | 8/2004 | Lewis |
| 6,792,334 B2 | 9/2004 | Metcalf et al. |
| RE38,626 E | 10/2004 | Kielland |
| 6,801,228 B2 | 10/2004 | Kargman |
| 6,810,304 B1 | 10/2004 | Dickson |
| 6,817,863 B2 | 11/2004 | Bisogno et al. |
| 6,842,719 B1 | 1/2005 | Fitzpatrick et al. |

(56) References Cited

U.S. PATENT DOCUMENTS

| | | | |
|---|---|---|---|
| 6,847,861 B2 | 1/2005 | Lunak et al. | |
| 6,853,976 B2 | 2/2005 | Tanaka | |
| 6,854,642 B2 | 2/2005 | Metcalf et al. | |
| 6,857,831 B2 | 2/2005 | Davis | |
| 6,859,215 B1 | 2/2005 | Brown et al. | |
| 6,860,426 B2 | 3/2005 | Kumagai et al. | |
| 6,873,739 B2 | 3/2005 | Cho et al. | |
| 6,873,970 B2 | 3/2005 | Showghi et al. | |
| 6,880,750 B2 | 4/2005 | Pentel | |
| 6,914,582 B2 | 7/2005 | Tanaka | |
| 6,914,583 B1 | 7/2005 | Chigira | |
| 6,920,431 B2 * | 7/2005 | Showghi | G06Q 10/02 |
| | | | 705/15 |
| 6,923,371 B2 | 8/2005 | Goodfellow | |
| 6,940,393 B2 | 9/2005 | Dev et al. | |
| 6,957,190 B1 | 10/2005 | Sakayori et al. | |
| 6,959,283 B1 | 10/2005 | White | |
| 6,973,437 B1 | 12/2005 | Olewicz et al. | |
| 6,976,004 B2 | 12/2005 | Wittrup | |
| 6,980,887 B2 | 12/2005 | Varga et al. | |
| 6,993,347 B2 | 1/2006 | Bodin et al. | |
| 7,021,538 B2 | 4/2006 | Ando et al. | |
| 7,024,378 B2 | 4/2006 | Razumov | |
| 7,031,930 B2 | 4/2006 | Freeman et al. | |
| 7,043,497 B1 | 5/2006 | Carty et al. | |
| 7,096,221 B2 | 8/2006 | Nakano | |
| 7,110,958 B2 | 9/2006 | Yang | |
| 7,110,964 B2 | 9/2006 | Tengler et al. | |
| 7,113,915 B1 | 9/2006 | Montemayor et al. | |
| 7,124,940 B2 | 10/2006 | Som | |
| 7,127,059 B2 | 10/2006 | Galvin | |
| 7,155,199 B2 | 12/2006 | Zalewski et al. | |
| 7,156,304 B2 | 1/2007 | Minowa et al. | |
| 7,167,842 B1 | 1/2007 | Josephson, II et al. | |
| 7,174,308 B2 | 2/2007 | Bergman et al. | |
| 7,188,154 B2 | 3/2007 | Minowa | |
| 7,203,675 B1 | 4/2007 | Papierniak et al. | |
| 7,209,903 B1 | 4/2007 | Mamdani et al. | |
| 7,234,640 B2 | 6/2007 | Pentel | |
| 7,238,024 B2 | 7/2007 | Rehbein et al. | |
| 7,299,970 B1 | 11/2007 | Ching | |
| 7,324,958 B2 | 1/2008 | Miyazaki et al. | |
| 7,343,174 B2 | 3/2008 | Suryanarayana et al. | |
| 7,350,230 B2 | 3/2008 | Forrest | |
| 7,359,868 B2 | 4/2008 | Kirkpatrick | |
| 7,373,244 B2 | 5/2008 | Kreft | |
| 7,406,693 B1 | 7/2008 | Goodwin, III | |
| 7,454,370 B2 | 11/2008 | Baril et al. | |
| 7,499,869 B2 | 3/2009 | Iknoian | |
| 7,562,032 B2 | 7/2009 | Abbosh et al. | |
| 7,587,329 B2 | 9/2009 | Thompson et al. | |
| 7,673,321 B2 | 3/2010 | Yurt et al. | |
| 7,721,969 B2 | 5/2010 | Johnson et al. | |
| 7,724,716 B2 | 5/2010 | Fadell | |
| 7,730,512 B2 | 6/2010 | Yurt et al. | |
| 7,752,075 B2 | 7/2010 | Angert et al. | |
| 7,762,945 B2 | 7/2010 | Blumenthal | |
| 7,774,231 B2 | 8/2010 | Pond et al. | |
| 7,774,236 B2 | 8/2010 | Steres et al. | |
| 7,797,204 B2 | 9/2010 | Balent | |
| 7,818,773 B2 | 10/2010 | Yurt et al. | |
| 7,831,475 B2 | 11/2010 | Baril et al. | |
| 7,835,946 B2 | 11/2010 | Goren et al. | |
| 7,841,514 B2 | 11/2010 | Mueller et al. | |
| RE42,077 E | 1/2011 | Savage | |
| 7,870,008 B2 | 1/2011 | Nacey | |
| 7,912,914 B2 | 3/2011 | Coutts et al. | |
| 7,945,778 B2 | 5/2011 | Hirayama et al. | |
| 8,011,587 B2 | 9/2011 | Johnson et al. | |
| 8,014,721 B2 | 9/2011 | Johnson | |
| 8,032,414 B2 | 10/2011 | Payne et al. | |
| 8,072,956 B2 | 12/2011 | Fadell | |
| 8,073,984 B2 | 12/2011 | Lydon et al. | |
| 8,123,130 B2 | 2/2012 | Pentel | |
| 8,145,523 B2 | 3/2012 | Leason et al. | |
| 8,175,917 B2 | 5/2012 | Flynn et al. | |
| 8,254,902 B2 | 8/2012 | Bell et al. | |
| 8,260,320 B2 | 9/2012 | Herz | |
| 8,346,987 B2 | 1/2013 | Lydon et al. | |
| 8,352,323 B2 | 1/2013 | Fisher | |
| 8,396,485 B2 | 3/2013 | Grainger et al. | |
| 8,489,451 B2 | 7/2013 | Ramchandani | |
| 8,630,662 B2 | 1/2014 | Herz | |
| 8,660,965 B1 * | 2/2014 | Bickerstaff | G06Q 20/3224 |
| | | | 235/379 |
| 8,682,729 B2 | 3/2014 | Werbitt | |
| 8,831,642 B2 | 9/2014 | Moldavsky et al. | |
| 2002/0010632 A1 | 1/2002 | Iguchi et al. | |
| 2002/0013730 A1 | 1/2002 | Bigus | |
| 2002/0016747 A1 | 2/2002 | Razumov | |
| 2002/0022774 A1 | 2/2002 | Karnieli | |
| 2002/0026325 A1 | 2/2002 | Hirahara et al. | |
| 2002/0027164 A1 | 3/2002 | Mault et al. | |
| 2002/0040313 A1 | 4/2002 | Hunter et al. | |
| 2002/0042745 A1 | 4/2002 | Nacey | |
| 2002/0046060 A1 | 4/2002 | Hoskyns et al. | |
| 2002/0046122 A1 | 4/2002 | Barber et al. | |
| 2002/0049644 A1 | 4/2002 | Kargman | |
| 2002/0052790 A1 | 5/2002 | Tomishima | |
| 2002/0059111 A1 | 5/2002 | Ding et al. | |
| 2002/0059175 A1 | 5/2002 | Nakano | |
| 2002/0077912 A1 | 6/2002 | Kargman | |
| 2002/0082917 A1 | 6/2002 | Takano | |
| 2002/0087334 A1 | 7/2002 | Yamaguchi et al. | |
| 2002/0096562 A1 | 7/2002 | Lewis | |
| 2002/0100632 A1 | 8/2002 | Smythe | |
| 2002/0107715 A1 | 8/2002 | Pace et al. | |
| 2002/0111868 A1 | 8/2002 | Silvestre | |
| 2002/0125313 A1 | 9/2002 | Broff | |
| 2002/0133269 A1 | 9/2002 | Anselmi | |
| 2002/0133418 A1 | 9/2002 | Hammond et al. | |
| 2002/0138350 A1 | 9/2002 | Cogen | |
| 2002/0143638 A1 | 10/2002 | August et al. | |
| 2002/0143655 A1 * | 10/2002 | Elston | G06Q 20/02 |
| | | | 705/26.81 |
| 2002/0147647 A1 | 10/2002 | Ragsdale-Elliott et al. | |
| 2002/0152123 A1 | 10/2002 | Giordano et al. | |
| 2002/0156682 A1 | 10/2002 | Dipietro | |
| 2002/0161475 A1 | 10/2002 | Varga et al. | |
| 2002/0165754 A1 | 11/2002 | Tang et al. | |
| 2002/0174014 A1 | 11/2002 | Wittrup | |
| 2002/0195497 A1 | 12/2002 | Kumagai et al. | |
| 2002/0198790 A1 | 12/2002 | Paulo et al. | |
| 2003/0001014 A1 | 1/2003 | Kumagai et al. | |
| 2003/0015248 A1 | 1/2003 | Itoh | |
| 2003/0033054 A1 | 2/2003 | Yamazaki | |
| 2003/0033184 A1 | 2/2003 | Benbassat et al. | |
| 2003/0046166 A1 | 3/2003 | Liebman | |
| 2003/0048841 A1 | 3/2003 | Yurt et al. | |
| 2003/0059747 A1 | 3/2003 | Yoshida et al. | |
| 2003/0065565 A1 | 4/2003 | Wagner et al. | |
| 2003/0074239 A1 | 4/2003 | Hoffman et al. | |
| 2003/0078793 A1 | 4/2003 | Toth | |
| 2003/0083936 A1 | 5/2003 | Mueller et al. | |
| 2003/0088469 A1 | 5/2003 | Leifer | |
| 2003/0110069 A1 | 6/2003 | Nishizono | |
| 2003/0115248 A1 | 6/2003 | Kitada et al. | |
| 2003/0126016 A1 | 7/2003 | Asano | |
| 2003/0135608 A1 | 7/2003 | Bodin et al. | |
| 2003/0149633 A1 | 8/2003 | McConnell | |
| 2003/0155418 A1 | 8/2003 | Daugs et al. | |
| 2003/0158796 A1 | 8/2003 | Balent | |
| 2003/0163354 A1 | 8/2003 | Shamoun | |
| 2003/0163388 A1 | 8/2003 | Beane | |
| 2003/0165799 A1 | 9/2003 | Bisogno et al. | |
| 2003/0171944 A1 | 9/2003 | Fine et al. | |
| 2003/0182209 A1 | 9/2003 | Ge et al. | |
| 2003/0195821 A1 | 10/2003 | Kennamer | |
| 2003/0204444 A1 | 10/2003 | Van Luchene et al. | |
| 2003/0208409 A1 | 11/2003 | Mault | |
| 2003/0212590 A1 | 11/2003 | Klingler | |
| 2003/0225622 A1 | 12/2003 | Doan | |
| 2004/0015403 A1 | 1/2004 | Moskowitz et al. | |
| 2004/0016620 A1 | 1/2004 | Davis | |

(56) References Cited

U.S. PATENT DOCUMENTS

| | | |
|---|---|---|
| 2004/0018908 A1 | 1/2004 | Gazyakan et al. |
| 2004/0019526 A1 | 1/2004 | Takeuchi |
| 2004/0035643 A1 | 2/2004 | Dev et al. |
| 2004/0049792 A1 | 3/2004 | Yurt et al. |
| 2004/0054592 A1 | 3/2004 | Hernblad |
| 2004/0069313 A1 | 4/2004 | Delaquil |
| 2004/0118908 A1 | 6/2004 | Ando et al. |
| 2004/0138953 A1 | 7/2004 | Van Luchene et al. |
| 2004/0138954 A1 | 7/2004 | Norton et al. |
| 2004/0143503 A1 | 7/2004 | Suthar |
| 2004/0143512 A1 | 7/2004 | Sturr |
| 2004/0158494 A1 | 8/2004 | Suthar |
| 2004/0158499 A1 | 8/2004 | Dev et al. |
| 2004/0158871 A1 | 8/2004 | Jacobson |
| 2004/0177004 A1 | 9/2004 | Mueller et al. |
| 2004/0199425 A1 | 10/2004 | Van Luchene et al. |
| 2004/0203898 A1 | 10/2004 | Bodin et al. |
| 2004/0203944 A1 | 10/2004 | Huomo et al. |
| 2004/0210474 A1 | 10/2004 | Hart et al. |
| 2004/0230496 A1 | 11/2004 | Neuman et al. |
| 2004/0243471 A1 | 12/2004 | Salmen et al. |
| 2004/0249497 A1 | 12/2004 | Saigh et al. |
| 2004/0254676 A1 | 12/2004 | Blust et al. |
| 2004/0254861 A1* | 12/2004 | Pentel ............... G06Q 20/1085 235/384 |
| 2004/0260513 A1 | 12/2004 | Fitzpatrick et al. |
| 2004/0260607 A1 | 12/2004 | Robbins et al. |
| 2005/0015301 A1 | 1/2005 | Johnson |
| 2005/0021407 A1 | 1/2005 | Kargman |
| 2005/0029354 A1 | 2/2005 | Frantz et al. |
| 2005/0049921 A1 | 3/2005 | Tengler et al. |
| 2005/0049922 A1 | 3/2005 | Kargman |
| 2005/0049940 A1 | 3/2005 | Tengler et al. |
| 2005/0052790 A1 | 3/2005 | Hayakawa |
| 2005/0059414 A1 | 3/2005 | Mahmoodi et al. |
| 2005/0075934 A1 | 4/2005 | Knight et al. |
| 2005/0080681 A1 | 4/2005 | Ohnishi |
| 2005/0114149 A1 | 5/2005 | Rodriguez et al. |
| 2005/0137925 A1 | 6/2005 | Lakritz et al. |
| 2005/0160005 A1 | 7/2005 | Roth et al. |
| 2005/0171800 A1 | 8/2005 | Yamaguchi |
| 2005/0171850 A1 | 8/2005 | Yueh |
| 2005/0182680 A1 | 8/2005 | Jones, III et al. |
| 2005/0236470 A1 | 10/2005 | Hirayma et al. |
| 2005/0236476 A1 | 10/2005 | Murray et al. |
| 2005/0240480 A1 | 10/2005 | Ito |
| 2005/0246223 A1 | 11/2005 | Roth et al. |
| 2005/0247781 A1 | 11/2005 | Minowa et al. |
| 2005/0251331 A1 | 11/2005 | Kreft |
| 2005/0257133 A1 | 11/2005 | Chan et al. |
| 2005/0261971 A1 | 11/2005 | Iguchi et al. |
| 2005/0273345 A1 | 12/2005 | Castillejo |
| 2006/0006025 A1 | 1/2006 | Dev et al. |
| 2006/0076397 A1 | 4/2006 | Langos |
| 2006/0085264 A1 | 4/2006 | Forehand |
| 2006/0085265 A1 | 4/2006 | Dietz et al. |
| 2006/0085266 A1 | 4/2006 | Wei et al. |
| 2006/0095342 A1 | 5/2006 | Pilu et al. |
| 2006/0143087 A1 | 6/2006 | Tripp et al. |
| 2006/0178943 A1 | 8/2006 | Rollinson et al. |
| 2006/0178986 A1 | 8/2006 | Giordano et al. |
| 2006/0186197 A1 | 8/2006 | Rosenberg |
| 2006/0218039 A1 | 9/2006 | Johnson |
| 2006/0218040 A1 | 9/2006 | Sabapathypillai |
| 2006/0218041 A1 | 9/2006 | Mamedrzaev |
| 2006/0218043 A1 | 9/2006 | Rosenzweig et al. |
| 2006/0218058 A1 | 9/2006 | Wojcik et al. |
| 2006/0235755 A1 | 10/2006 | Mueller et al. |
| 2006/0247973 A1 | 11/2006 | Mueller et al. |
| 2006/0255128 A1 | 11/2006 | Johnson et al. |
| 2006/0270421 A1 | 11/2006 | Phillips et al. |
| 2006/0271441 A1 | 11/2006 | Mueller et al. |
| 2006/0271442 A1 | 11/2006 | Pfleging et al. |
| 2006/0282398 A1 | 12/2006 | Mueller et al. |
| 2006/0287923 A1 | 12/2006 | Watson et al. |
| 2007/0005185 A1 | 1/2007 | Roth et al. |
| 2007/0005434 A1 | 1/2007 | Roth et al. |
| 2007/0022016 A1 | 1/2007 | Steres et al. |
| 2007/0022018 A1 | 1/2007 | Suryanarayana et al. |
| 2007/0040026 A1 | 2/2007 | Vleet et al. |
| 2007/0043620 A1 | 2/2007 | Leason et al. |
| 2007/0055575 A1 | 3/2007 | McDonald et al. |
| 2007/0061209 A1 | 3/2007 | Jackson |
| 2007/0061225 A1 | 3/2007 | Havas |
| 2007/0073586 A1 | 3/2007 | Dev et al. |
| 2007/0088620 A1 | 4/2007 | Tengler et al. |
| 2007/0088624 A1 | 4/2007 | Vaughn et al. |
| 2007/0185776 A1 | 8/2007 | Nguyen et al. |
| 2007/0194123 A1 | 8/2007 | Frantz et al. |
| 2007/0205278 A1 | 9/2007 | Lovett |
| 2007/0214053 A1 | 9/2007 | Salerno |
| 2007/0219842 A1 | 9/2007 | Bansal et al. |
| 2007/0239565 A1 | 10/2007 | Pentel |
| 2007/0265935 A1 | 11/2007 | Woycik et al. |
| 2007/0265937 A1 | 11/2007 | Aitkins et al. |
| 2008/0004985 A1 | 1/2008 | Kang |
| 2008/0039019 A1 | 2/2008 | Eskin |
| 2008/0039020 A1 | 2/2008 | Eskin |
| 2008/0040272 A1 | 2/2008 | Eskin |
| 2008/0052174 A1 | 2/2008 | Miyazaki et al. |
| 2008/0082391 A1 | 4/2008 | Gomez |
| 2008/0086414 A1 | 4/2008 | Ching |
| 2008/0086500 A1 | 4/2008 | Garcia et al. |
| 2008/0107304 A1 | 5/2008 | Coulter et al. |
| 2008/0126985 A1 | 5/2008 | Baril et al. |
| 2008/0189185 A1 | 8/2008 | Matsuo et al. |
| 2008/0195505 A1 | 8/2008 | Kirkpatrick |
| 2008/0262894 A1 | 10/2008 | Podrazhansky |
| 2008/0270324 A1 | 10/2008 | Allard et al. |
| 2008/0288357 A1 | 11/2008 | Stambaugh et al. |
| 2008/0300954 A1 | 12/2008 | Cameron et al. |
| 2008/0313057 A1 | 12/2008 | Gooch et al. |
| 2009/0006164 A1 | 1/2009 | Kaiser et al. |
| 2009/0012856 A1 | 1/2009 | Sweeney |
| 2009/0024433 A1 | 1/2009 | Guardascione et al. |
| 2009/0037283 A1 | 2/2009 | Anderson |
| 2009/0043635 A1 | 2/2009 | Mori |
| 2009/0076920 A1 | 3/2009 | Feldman et al. |
| 2009/0106124 A1 | 4/2009 | Yang |
| 2009/0164466 A1 | 6/2009 | Badyal |
| 2009/0182611 A1 | 7/2009 | Iknoian |
| 2009/0192898 A1 | 7/2009 | Baril |
| 2009/0204492 A1 | 8/2009 | Scifo et al. |
| 2009/0228336 A1 | 9/2009 | Giordano et al. |
| 2009/0234699 A1 | 9/2009 | Steinglass et al. |
| 2009/0240598 A1 | 9/2009 | Kargman |
| 2009/0024148 A1 | 10/2009 | Sus |
| 2009/0248552 A1 | 10/2009 | Taylor et al. |
| 2009/0255195 A1 | 10/2009 | Bridgman et al. |
| 2009/0259553 A1 | 10/2009 | Carroll et al. |
| 2009/0259554 A1 | 10/2009 | Carroll et al. |
| 2009/0259555 A1 | 10/2009 | Carroll et al. |
| 2009/0259556 A1 | 10/2009 | Carroll et al. |
| 2009/0259557 A1 | 10/2009 | Carroll et al. |
| 2009/0259558 A1 | 10/2009 | Carroll et al. |
| 2009/0259559 A1 | 10/2009 | Carroll et al. |
| 2009/0265216 A1 | 10/2009 | Flynn et al. |
| 2009/0265247 A1 | 10/2009 | Carroll et al. |
| 2009/0276326 A1 | 11/2009 | Fein et al. |
| 2009/0281903 A1 | 11/2009 | Blatstein |
| 2010/0023410 A1 | 1/2010 | Doan |
| 2010/0057523 A1 | 3/2010 | Weiss et al. |
| 2010/0121722 A1 | 5/2010 | Vawter |
| 2010/0138344 A1 | 6/2010 | Wong et al. |
| 2010/0153161 A1 | 6/2010 | Kiran et al. |
| 2010/0191653 A1 | 7/2010 | Johnson et al. |
| 2010/0198704 A1 | 8/2010 | Fadell |
| 2010/0257013 A1 | 10/2010 | Beauregard |
| 2011/0139545 A1 | 6/2011 | Bridgman et al. |
| 2011/0231266 A1 | 9/2011 | Baril |
| 2011/0258011 A1 | 10/2011 | Burns et al. |
| 2011/0258058 A1* | 10/2011 | Carroll ............... G06Q 30/06 705/15 |
| 2012/0012653 A1 | 1/2012 | Johnson et al. |

(56) References Cited

U.S. PATENT DOCUMENTS

| | | | |
|---|---|---|---|
| 2012/0071100 A1 | 3/2012 | Fadell | |
| 2012/0088487 A1* | 4/2012 | Khan | H04W 4/001 455/418 |
| 2012/0129533 A1 | 5/2012 | Phillips et al. | |
| 2012/0129553 A1 | 5/2012 | Phillips et al. | |
| 2012/0209730 A1 | 8/2012 | Garrett | |
| 2012/0233237 A1 | 9/2012 | Roa et al. | |
| 2013/0027561 A1* | 1/2013 | Lee | G06Q 30/02 348/150 |
| 2013/0124314 A1 | 5/2013 | Navar | |
| 2013/0317949 A1* | 11/2013 | Gu | G06Q 30/06 705/26.81 |
| 2015/0133170 A1 | 5/2015 | Buchheim et al. | |
| 2016/0063606 A1 | 3/2016 | Fedak | |

FOREIGN PATENT DOCUMENTS

| | | |
|---|---|---|
| CA | 2219172 A1 | 4/1999 |
| CA | 2302753 A1 | 5/1999 |
| FR | 2818412 A1 | 6/2002 |
| GB | 206222 A | 11/1923 |
| GB | 203320 A | 11/1924 |
| GB | 385448 A | 12/1932 |
| JP | S58108337 A | 6/1983 |
| JP | H0256889 A | 2/1990 |
| JP | H06259662 A | 9/1994 |
| JP | H07296071 A | 11/1995 |
| JP | H08305961 A | 11/1996 |
| JP | H10320422 A | 12/1998 |
| JP | 2001325300 A | 11/2001 |
| JP | 2002140479 A | 5/2002 |
| JP | 2002197542 A | 7/2002 |
| JP | 2003178124 A | 6/2003 |
| JP | 2003248869 A | 9/2003 |
| JP | 2004164176 A | 6/2004 |
| JP | 2004164210 A | 6/2004 |
| JP | 2004164211 A | 6/2004 |
| JP | 2007102525 A | 4/2007 |
| JP | 2007299090 A | 11/2007 |
| KR | 20010104047 A | 11/2001 |
| KR | 20050055972 A | 6/2005 |
| KR | 20060098983 A | 9/2006 |
| KR | 20070117116 A | 12/2007 |
| KR | 20070118112 A | 12/2007 |
| KR | 20080041000 A | 5/2008 |
| KR | 20090001704 A | 1/2009 |
| KR | 20100031436 A | 3/2010 |
| KR | 20110121113 A | 11/2011 |
| KR | 20120043565 A | 5/2012 |
| WO | 8705425 A1 | 9/1987 |
| WO | 9924902 A1 | 5/1999 |
| WO | 0135716 A2 | 5/2001 |
| WO | 0229708 A1 | 4/2002 |
| WO | 03034295 A2 | 4/2003 |
| WO | 2007114906 A2 | 10/2007 |
| WO | 2009126749 A2 | 10/2009 |
| WO | 2009126750 A2 | 10/2009 |
| WO | 2009126751 A2 | 10/2009 |
| WO | 2009126752 A2 | 10/2009 |
| WO | 2009126753 A2 | 10/2009 |
| WO | 2009126754 A2 | 10/2009 |
| WO | 2009126755 A2 | 10/2009 |
| WO | 2009126756 A2 | 10/2009 |
| WO | 2012135896 A1 | 10/2012 |
| WO | 2014206627 A1 | 12/2014 |

OTHER PUBLICATIONS

Art's. Two-Lane Drive thru—Burgers, Dogs, Pastrami & Breakfast http/chowhound.chow.com/topics/7492.
Article 34 Amendment filed Mar. 27, 2012 for corresponding PCT Application No. PCT/US2011/032574.
Chicago Tribune, May 23, 2012 McDonald's new downtown site gets ready for party http://www.chicagotribune.com/chi-0504090328a r10 0 3188705.story.
Data Mining on Time Series: An Illustration using Fast-Food Restaurant Franchise Data, Jan. 2001, Lon-Mu Liu et al.
DestinationCRM.com: Delivering the Goods by Jason Compton, Jan. 28, 2001.
Double drive-thru: 2 lanes are more efficient than one by Rick Van Warner; Nation's Restaurant News, Feb. 15, 1988 Art's. Two-Lane Drive thru—Burgers, Dogs, Pastrami & Breakfast http://chowhound.chow.com/topics/74924.
Finite Queuing Systems with Gamma Distributions, Dr. Wade C. Driscoll, Computers and Industrial Engineering, vol. 23, Nos. 1-4, pp. 493-497, 1992.
Focus on Outcomes Management—Predictive Solutions Bring More Power to Decision Makers, Nov. 1999 by Steve Biafore.
Food Cost Controls for Hotels. Part I. Current State and Needs of the Industry by Albert L. Wrisley, Journal of Foodservice Systems 2 (1982) pp. 59-69.
Forecasting Menu-item demand in foodservice operations, Judy L. Miller, Ph.D., R.D., and Carol W. Shanklin, Ph.D., R.D., L.D., pp. 443-449, Apr. 1998, vol. 88 No. 4.
International Preliminary Report on Patentability Chapter II for corresponding PCT Application No. PCT/US2011/032574.
International Preliminary Report on Patentability Chapter II for corresponding PCT Application No. PCT/US2012/060693 dated Feb. 13, 2014.
International Preliminary Report on Patentability Chapter II for corresponding PCT Application No. PCT/US2012/060695 dated Feb. 13, 2014.
International Preliminary Report on Patentability for PCT/US2009/039970 dated Oct. 12, 2010.
International Preliminary Report on Patentability for PCT/US2009/039971 dated Oct. 12, 2010.
International Preliminary Report on Patentability for PCT/US2009/039972 dated Aug. 20, 2010.
International Preliminary Report on Patentability for PCT/US2009/039973 dated Aug. 20, 2010.
International Preliminary Report on Patentability for PCT/US2009/039974 dated Aug. 20, 2010.
International Preliminary Report on Patentability for PCT/US2009/039975 dated Aug. 20, 2010.
International Preliminary Report on Patentability for PCT/US2009/039976 dated Oct. 12, 2010.
International Preliminary Report on Patentability for PCT/US2009/039977 dated Oct. 12, 2010.
International Search Report and Written Opinion for PCT Application No. PCT/US2012/060693 dated Mar. 29, 2013.
International Search Report and Written Opinion for PCT Application No. PCT/US2012/060695 dated Mar. 29, 2013.
International Search Report for PCT Application No. PCT/US2013/069734 dated Feb. 26, 2014.
Matt Richtel. The long distance journey of a fast food order. Apr. 11, 2006. The New York Times, p. AI.
Office Action dated Sep. 3, 2010 for corresponding U.S. Appl. No. 12/420,766.
Office Action dated Sep. 3, 2010 for corresponding U.S. Appl. No. 12/420,794.
Organizational Buyer Behaviour: a study of UK Restaurant Chains, British Food Journal, 1997 pp. 239-243 by Elizabeth Mawson and Andrew Fearne.
"Pizzahut.com WebPages", as retrieved from the Wayback Machine on Jan. 14, 2008.
Search Report and Written Opinion dated Dec. 28, 2011 for corresponding PCT Application No. PCT/US2011/032574.
Search Report and Written Opinion for PCT/US2009/039970 dated Sep. 29, 2009.
Search Report and Written Opinion for PCT/US2009/039971 dated Nov. 12, 2009.
Search Report and Written Opinion for PCT/US2009/039972 dated Dec. 1, 2009.
Search Report and Written Opinion for PCT/US2009/039973 dated Dec. 1, 2009.

(56) References Cited

OTHER PUBLICATIONS

Search Report and Written Opinion for PCT/US2009/039974 dated Dec. 1, 2009.
Search Report and Written Opinion for PCT/US2009/039975 dated Dec. 1, 2009.
Search Report and Written Opinion for PCT/US2009/039976 dated Nov. 20, 2009.
Search Report and Written Opinion for PCT/US2009/039977 dated Nov. 26, 2009.
Trends & Controversies, Social Networks Applied, IEE Computer Society, pp. 1541-1672.
Wikipedia, Rock N Roll McDonald's http://en.wikipedia.org/wiki/Rock N Roll McDonald's.
Amazon.com: *Pager Genius USA* 20 Digital Restaurant Coaster Red Pagers / Guest Table Waiting Paging System : Electronics (6 pages).
Cal-Mil 271-1 Red Replacement Engraved Number Tent Sign : http://www.gotowebstore.com/2112711 (3 pages).
International Search Report and Written Opinion for PCT Application No. PCT/US2017/026820 dated Jun. 19, 2017.
International Search Report and Written Opinion of the International Searching Authority in PCT/US2017/026820 dated Jun. 19, 2017.

\* cited by examiner

SYSTEM AND METHOD FOR RECEIVING AND MANAGING REMOTELY PLACED ORDERS

CROSS REFERENCE

This application is a continuation application of U.S. Non-Provisional patent application Ser. No. 14/078,396 which was filed on Nov. 12, 2013, which claims priority from U.S. Provisional Patent Application No. 61/725,379, filed on Nov. 12, 2012 both of which are incorporated by reference herein in their entirety.

TECHNICAL FIELD

This invention relates generally to systems and methods for receiving and managing remotely placed orders, particularly orders for goods that must be prepared within a short time of being received. In the primary example, the present invention relates to a system (and its associated apparatuses and methods of use) that enables remote entry and processing of an order for time-sensitive goods (such as food from a quick service restaurant) at a particular venue (e.g., a restaurant) in a manner such that the order is verified and submitted for processing upon arrival at the venue.

BACKGROUND OF THE INVENTION

With the increased availability and functionality of handheld mobile devices in recent years, there has also been much development centered around applications and systems to enable remote ordering of goods and services. For example, several systems have been developed specifically to facilitate the remote entry of food orders from quick service restaurants through use of such handheld devices. Yet all of these inventions fail to account for the flexibility required by larger organizations that operate multiple venues having different available offerings.

For example, U.S. Pat. No. 6,435,406 to Pentel discloses a remote ordering device, which is essentially a cell phone equipped with a remote ordering capability. The device is used to enter "item codes" along with information to identify the user. This information is sent to a restaurant or venue where it is received by a special decoder and transmitted into an order for entry and preparation. Alternatively, Pentel envisions entry of the order upon arrival at the location by using the device to alert the venue of the user's proximity. However, Pentel makes no allowance for item availability, or whether that availability may have changed from the time of order creation to the time of arrival at the venue. It also is not equipped to handle an order submitted to an organization with multiple locations that may have different menus, or that have menus that change throughout the day. Finally, it requires that each venue purchase and install the special decoder hardware.

Similarly, U.S. Pat. No. 6,959,283 to White teaches a remote food ordering system where a user enters an order remotely through a personal digital assistant ("PDA"). White's system allows a person to enter a time when the order should be ready. But there is no way of accounting for changes in this schedule. What if the user is delayed and the food becomes cold? What if the items ordered are no longer available when it comes time to begin preparation of the order?

U.S. patent application Ser. No. 12/760,534 to Carroll, et. al., discloses a more advanced system that is adapted to overcome some of these deficiencies. Unlike Pentel and White, Carroll provides for use with a larger chain of venues where a particular venue is selected. It also provides for an order check-in process once the user has arrived at the location. However, this check-in process requires the installation of system-specific hardware that is expensive, takes up space, and requires maintenance. In addition, there is no specific method for correcting or updating menus as they change from store to store and throughout the day. Carroll shares common ownership with, and is a predecessor of, the present invention, and its contents and teachings are fully incorporated herein by reference.

SUMMARY OF THE INVENTION

The present invention provides valuable improvements over the prior art, which are particularly useful to an organization operating a multi-venue chain of stores that may have revolving or disparate inventory and menu item availability. The invention provides an order management system, or OMS, that features a two phase process through which orders are first generated and submitted, and then subsequently checked in (released) and received. The system accounts for issues such as revolving or changing menus, price disparity between venues, user edits to orders after submission and other complexities common in real-world, large scale operations that were not foreseen or discussed (let alone accounted for) by the prior art.

In a particular embodiment, the present invention provides a system for managing dynamic menus across a multi-venue organization comprising a menu management server for generating a main menu comprising a description of products available across a plurality of venues within the organization. In this embodiment, the system also comprises a plurality of venue servers, each associated with a separate one of the plurality of venues, and each in communication with the menu management server, wherein each venue server generates a venue specific menu comprising a description of products and product pricing specific to the venue where the venue server that generated the venue specific menu is located. It further comprises an order management system server in communication with each of the plurality of venue servers and with at least one mobile device wherein, upon receiving from the at least one mobile device a request to order products from a first venue from among the plurality of venues, the order management system server provides to the at least one mobile device the venue specific menu associated with the first venue. In this embodiment, the order management server receives an order for products from the venue specific menu from the at least one mobile device and, upon subsequently receiving a request to receive the order, contacts the venue server associated with the first venue to verify the continued availability and pricing of the products ordered.

In another embodiment, the present invention provides a system for managing dynamic menus across a multi-venue organization comprising a menu management server for generating a main menu comprising a description of products available across a plurality of venues within the organization. It also comprises a plurality of venue servers, each associated with a separate one of the plurality of venues, and each in communication with the menu management server, wherein each venue server generates a venue specific menu comprising a description of products and product pricing specific to the venue where the venue server that generated the venue specific menu is located. It further comprises an order management system server in communication with each of the plurality of venue servers and with at least one mobile device wherein, upon receiving from the at least one mobile device a request to order products from a first venue from among the plurality of venues, the order management system server provides to the at least one mobile device the venue specific menu associated with the first venue. In this embodiment, the order management server receives an order for products from the venue specific menu from the at least one mobile device and, upon subsequently receiving a request to receive the order, contacts the venue server associated with the first venue to verify the continued availability and pricing of the products ordered.

In yet another embodiment, the invention teaches a method for processing a remotely-placed order for time-sensitive goods received from a first location at a first time, the goods to be received at a second location at a second time, the steps of the method comprising receiving to an order management system server order data from a mobile device located at a first location, wherein the order data represents a request that at least one time-sensitive good be produced by a first venue remote from the first location. The method further comprises the steps of associating the order data with a user account at the order management system server and subsequently receiving to the order management system server location verification data from the mobile device, wherein the location verification data corresponds to the first venue and identifies that the mobile device is located at the first venue. The method further comprises the step of, after receiving location verification data corresponding to the first venue, directing staff at the first venue to produce the at least one time-sensitive good.

In still another embodiment, the invention teaches a method for managing remotely placed orders comprising the steps of receiving to an order management server a venue selection from a mobile device at a first location, the venue selection identifying a first venue from among a plurality of venues, the first venue located at a second location. The method further comprises the steps of requesting venue specific menu data from a venue server at the second location, wherein the venue specific menu data identifies a plurality of goods then available for production by the first venue and receiving to the order management server order data from the mobile device, the order data indicative of a current order for one or more goods from the plurality of goods then available from the first venue. The method still further comprises the steps of storing the order data at the order management server and, at a later time, receiving to the order management server location verification data from the mobile device, the location verification data identifying that the mobile device is now at the second location. Finally, the method further comprises the steps of in response to receipt of the location verification data, transmitting the order data from the order management server to the venue server to verify that the one or more goods identified in the order data are still available, and releasing the order data to the first venue for production.

While certain embodiments are mentioned above, numerous other embodiments, systems, methods, features, and advantages of the present invention will be, or will become, apparent to one having ordinary skill in the art upon examination of the following drawings and detailed description. All such additional systems, methods, features, and advantages included within this description, are within the scope of the present invention, and may be included in one or more of the accompanying claims. Though a quick service restaurant is used as the primary example throughout much of the figures and written description below, one of skill in the art will recognize that the order management system described herein could be adapted by those of ordinary skill in the art for use with various other types of venues without undue experimentation, and that the invention described herein is not limited in any way to use with one particular venue type. In addition, though the screen samples are arranged and shaped for display on presently-available handheld smart phones such as an Apple iPhone, one of skill in the art will recognize that the user device could also be a tablet or other mobile device capable of generating a screen for viewing and remotely interacting with the order management server, and that the screens could be modified to accommodate such devices by one of ordinary skill without undue experimentation.

BRIEF DESCRIPTION OF THE FIGURES

The invention can be better understood with reference to the following figures. The components in the figures are not necessarily to scale, emphasis instead being placed upon clearly illustrating the principles of the present invention. In the figures, like reference numerals designate corresponding parts throughout the several views.

Figure 1:
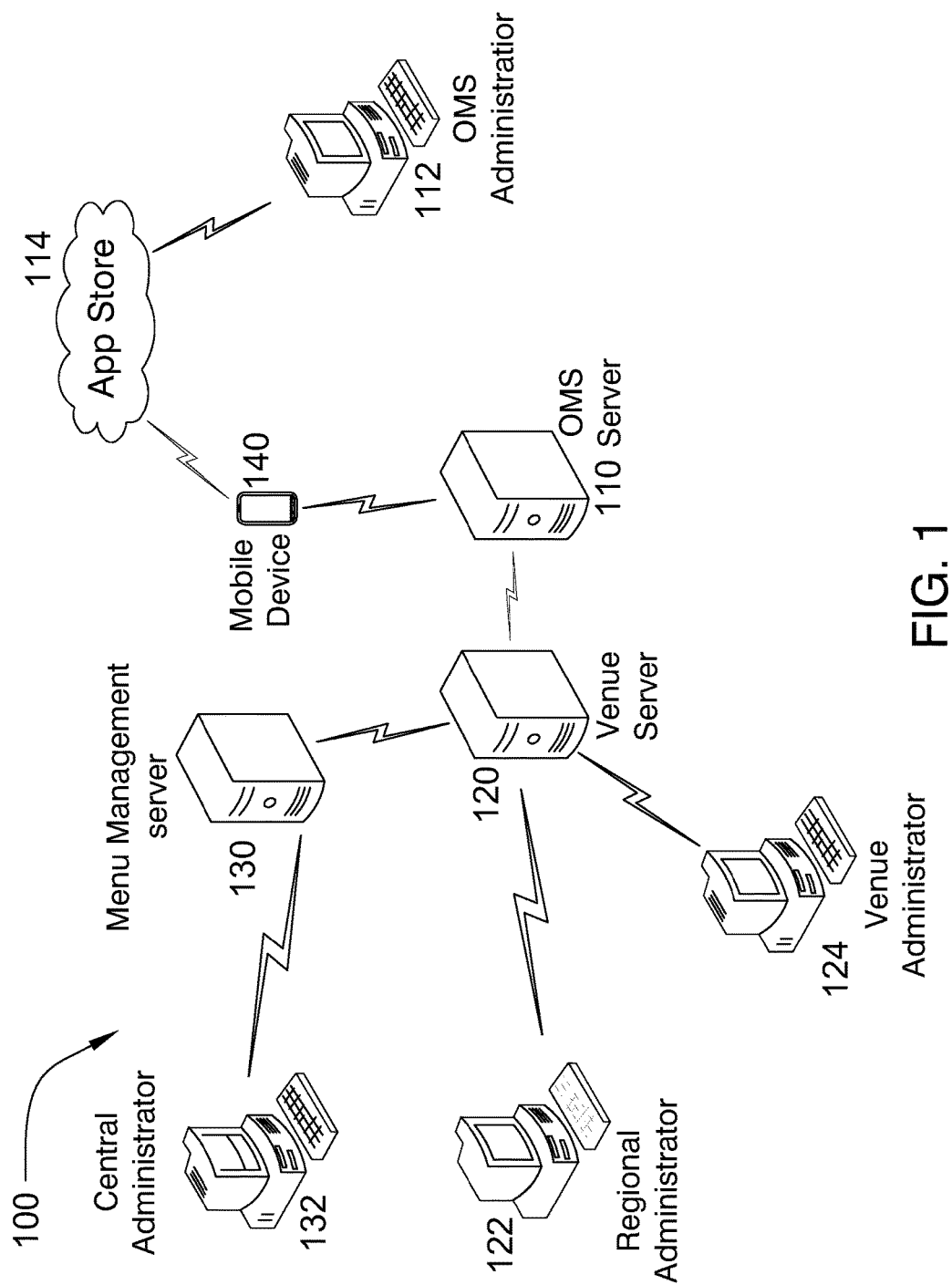
FIG. 1 is a system diagram illustrating an embodiment of a computer-networked order management system in accordance with the invention.

Illustrative and exemplary embodiments of the invention are described in further detail below with reference to and in conjunction with the figures.

DETAILED DESCRIPTION

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood to one of ordinary skill in the art.

Referring to FIG. 1, a system diagram illustrates an embodiment of a computer networked order management system 100 in accordance with the illustrated embodiment of the present invention. The term "order management system" is abbreviated as "OMS" throughout this description of the invention. As depicted, the OMS 100 comprises a variety of networked servers, including OMS server 110, venue server 120, and menu management server 130. These servers may be of various known constructions, such as, for example, an IBM System x3650 M3 rack server. The actual server size and capability will vary depending on the size of the implemented embodiment of the OMS. Typically, there will be only one OMS server 110 and one menu management server 130 within the OMS. In some embodiments, these servers may be combined into one. Alternatively, there will typically be a venue server 120 associated with each venue location (facility) that accepts orders via the OMS. These individual venue servers 120 see much less traffic than the centralized OMS server 110 and menu management server 130, and, accordingly, may be scaled down in size and functionality as appropriate. Though FIG. 1 illustrates a single venue server 120, it will be understood that a large number (even many thousands) of such venue servers 120, each at different venues, may be associated with a single OMS.

Also illustrated in FIG. 1 are a number of administrator computers for use in accessing back-end programming on the respective servers, such as central administrator computer 132, regional administrator computer 122, venue administrator computer 124, and OMS administrator computer 112. As will be seen, these desktop computers are used by system operators to update information on the various system servers. Each administrator computer is capable of accessing its respective server through known means such as the Internet, or a dedicated connection. Administrator computers may be desktops, laptops, or other personal computers of standard size and variety, such as a Dell Inspiron 660.

FIG. 1 also depicts a mobile user device 140, which may be any standard available smart phone, such as an Apple iPhone 5, or other mobile transceiver devices as discussed below. As with the venue server 120, it will be understood that the OMS 100 can incorporate many mobile user devices 140 (even millions) despite only one being shown. Collectively, all of the servers, desktops, and smart phones are understood to be general purpose computers; however, each is equipped with special applications or software to perform its function as a component of the OMS 100, thus converting them to special purpose machines. For example, to operate within the system, a mobile user device 140 must obtain special OMS application software, such as from the internet application store 114 as shown in FIG. 1. Here, the OMS administrator computer 112 makes the OMS application software component 318 available in the application store ("app store") 114, and updates the software available for download when changes are necessary. The OMS application software component 318 could also be made available to a mobile user device 140 in other ways, such as by download from an internet website, by infrared scan from another computing device or memory, or by other known means.

The connectors of FIG. 1 illustrate how information flows between the various hardware devices that make up the OMS 100 according to the illustrated embodiment. For example, while in some embodiments a mobile user device 140 may exchange data directly with a venue server 120, it is preferred that traffic between any two such components be routed through the OMS server 110. This allows for a common user interface at the OMS server 110 for handling all OMS traffic from mobile user devices 140, prevents unnecessary traffic from encumbering venue servers 120, and enhances overall data security to backend systems such as menu management server 130. More will be explained as to the interaction between these various system components in association with FIG. 8 and other figures below.

For transmitting information and data, the OMS 100 utilizes both a wired data network 108 and a wireless data network 106. The wired data network 108 can be part of a global network, a wide area network or a local area network. The wireless data network 106, which can couple to the wired data network 108, can include one of more wireless data networks, such as cellular networks, WiFi networks, Bluetooth networks, etc. The OMS server 110, the venue servers 120, and the menu management server 130 are coupled to the wired data network 108. At least the OMS server 110 can also couple to the wireless data network 106. The mobile user devices 140 can couple to the wireless data network 106 through which they can access the OMS server 110. The wired data network 108 and the wireless data network 106 pertain to some portions of the World Wide Web (WWW, hereafter referred to as Web) and the Internet. Though not always specified in such terms herein, it will be understood that when one system element is said to "communicate," "transfer," "send" (or the like) something to another system element, it is, in fact, data indicative of that thing that is being transferred, such as, for example, menu data (indicative of elements of a menu) or order data (indicative of elements of an order).

Figure 2:
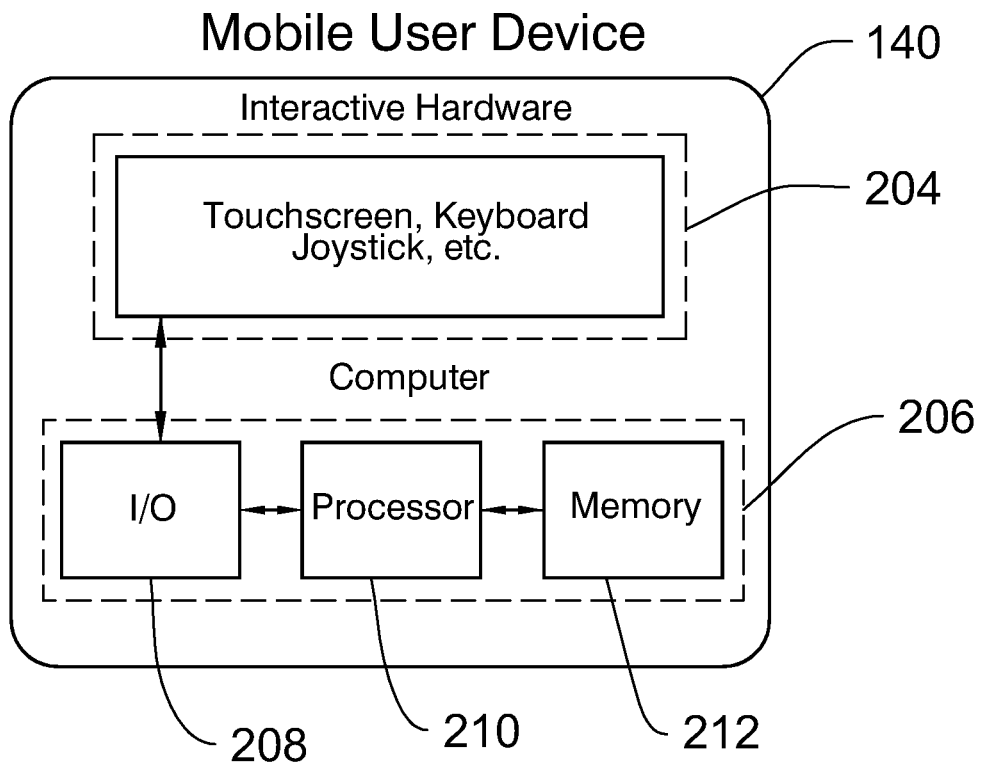
FIG. 2 is a schematic diagram of certain aspects of a mobile user device.

Now referring to FIG. 2, a schematic diagram of certain aspects of a mobile user device 140 is provided. The illustrated mobile user device 140 is, for example, a handheld digital device, such as a personal digital assistant (PDA), a cellular phone, a smart phone such as an iPhone or Android device, a tablet, or any other handheld electronic device having a display screen and two-way remote communication capability. The mobile user device 140 includes an interactive hardware portion 204 and a computer portion 206. The interactive hardware portion 204 can include one or more of a touch screen, a keyboard, a stylus, a joystick, and the like, which can be arranged in various manners and have different shapes without changing the spirit of the interaction of the hardware portion 204 with the computer portion 206. The touch screen can be a liquid display crystal (LCD), display screen, a plasma screen, a light emitting diode (LED), or any other screen capable of displaying text and images. The computer portion 206 includes an input/output (I/O) portion 208, a central processing unit (CPU) portion 210 (i.e., a microprocessor), and a memory 212.

The CPU portion 210 can be any computer-processing unit from a singular microchip to extensive microchip configurations. The memory portion 212 can include, without limitation, any one or a combination of volatile memory elements (e.g., random access memory (RAM, such as DRAM, SRAM, SDRAM, etc.)) and nonvolatile memory elements (e.g., ROM, hard drive, tape, CDROM, etc.).

Moreover, the memory portion 212 may incorporate electronic, magnetic, optical, and/or other types of storage media, and can have a distributed architecture where various components are situated remote from one another, but are still accessed by CPU portion 210. The interactive hardware portion 204 is coupled to the I/O portion 208 such that a command entered by a user or customer through the interactive hardware portion 204 will be forwarded to the I/O portion 208, to the processor portion 210 and then to memory portion 212.

Figure 3:
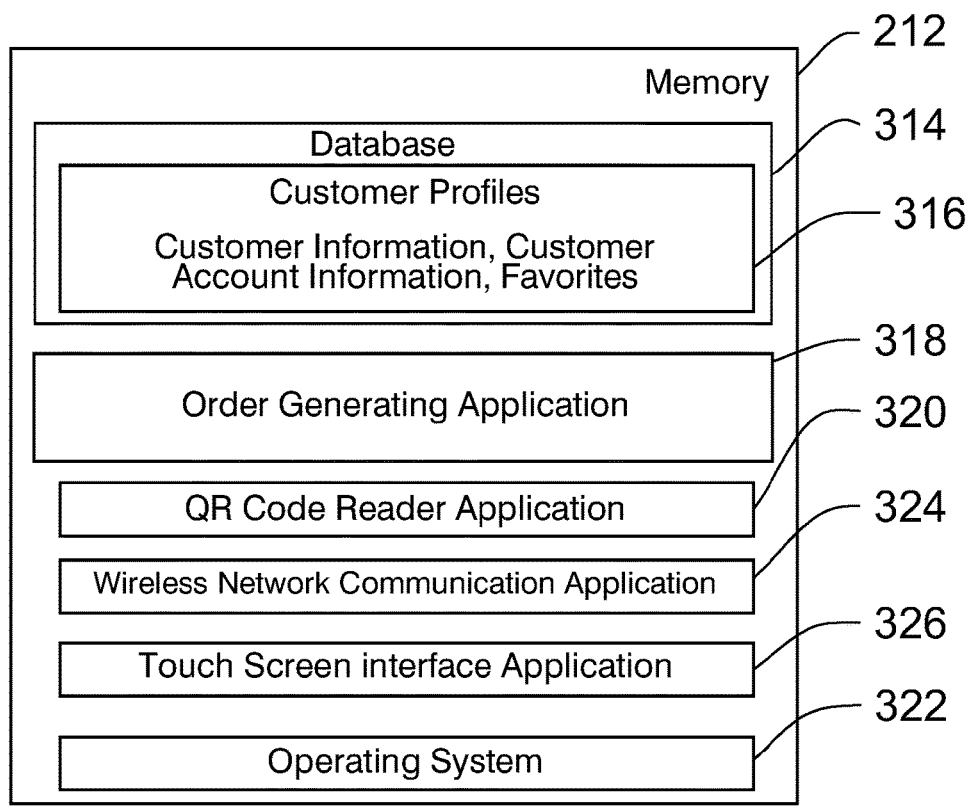
FIG. 3 is a schematic diagram of a memory portion of the mobile user device of FIG. 2.

As illustrated in FIG. 3, a schematic diagram of the memory portion 212 of FIG. 2 is shown. The memory portion 212 can include or store a database 314, executable programs 318, 320, 326, and 324, and an operating system 322. The database 314 can store data related to prior use of the OMS system 100 by a user, such as, for example, the user's username, password, order history, favorite restaurant locations, or other data as discussed below. In other embodiments, this data may be stored at the OMS server or at a third server not associated specifically with the OMS 100 (e.g., in the cloud). The executable programs include an OMS application component 318 for use in generating restaurant orders, a verification data reader application 320, a touch screen interface application 326, and a wireless network communication software application 324 such as a common browser like Internet Explorer. Verification data reader application 320 may be a sub-code segment or part of the OMS application component 318, or may be a separate, callable application residing independently in memory 212.

The executable programs 318 can be implemented in software, firmware, hardware, or a combination thereof. An example of a suitable commercially available operating system 322 is an appliance-based operating system, such as that implemented in handheld computers or personal digital assistants (PDAs) (e.g., PalmOS available from Palm Computing, Inc., iPhone/iPod OS available from Apple, and Windows CE available from Microsoft Corporation). The operating system 322 essentially controls the execution of other computer programs, such as the OMS application component 318, and provides scheduling, input-output control, file and data management, memory management, and communication control and related services.

When the mobile user device 140 is in operation, the CPU portion 210 is configured to execute software stored within the memory 212 to communicate data to and from memory 212 and to generally control operations of mobile user device 140 pursuant to the software. The OMS application component 318 and the operating system 322, in whole or in part but typically the latter, are read by the CPU portion 210, perhaps buffered within the CPU portion 210, and then executed. When the OMS application component 318 is implemented in software, it can be stored on any computer readable medium for use by or in connection with any computer related system or method. The OMS application component 318 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). In another embodiment, where the OMS application component 318 is implemented in hardware, it can be implemented with any, or a combination of, the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

While the memory and CPU descriptions above were described in reference to the mobile user device 140, it will be understood that the other hardware elements depicted in FIG. 1 will also have similar processors and memories that operate along similar parameters and in similar or identical ways. Each hardware memory will have some component of OMS application 318 stored therein, though the components may not be (and typically will not be) identical, and may only be sufficient to allow interoperability with the other hardware elements in the OMS 100. Collectively, it will be understood that the OMS application 318 is the software existing on the various hardware devices that is specially programmed and uniquely tailored to convert the general purpose computers 400 to special purpose computers fit to operate within the OMS 100.

Figure 4:
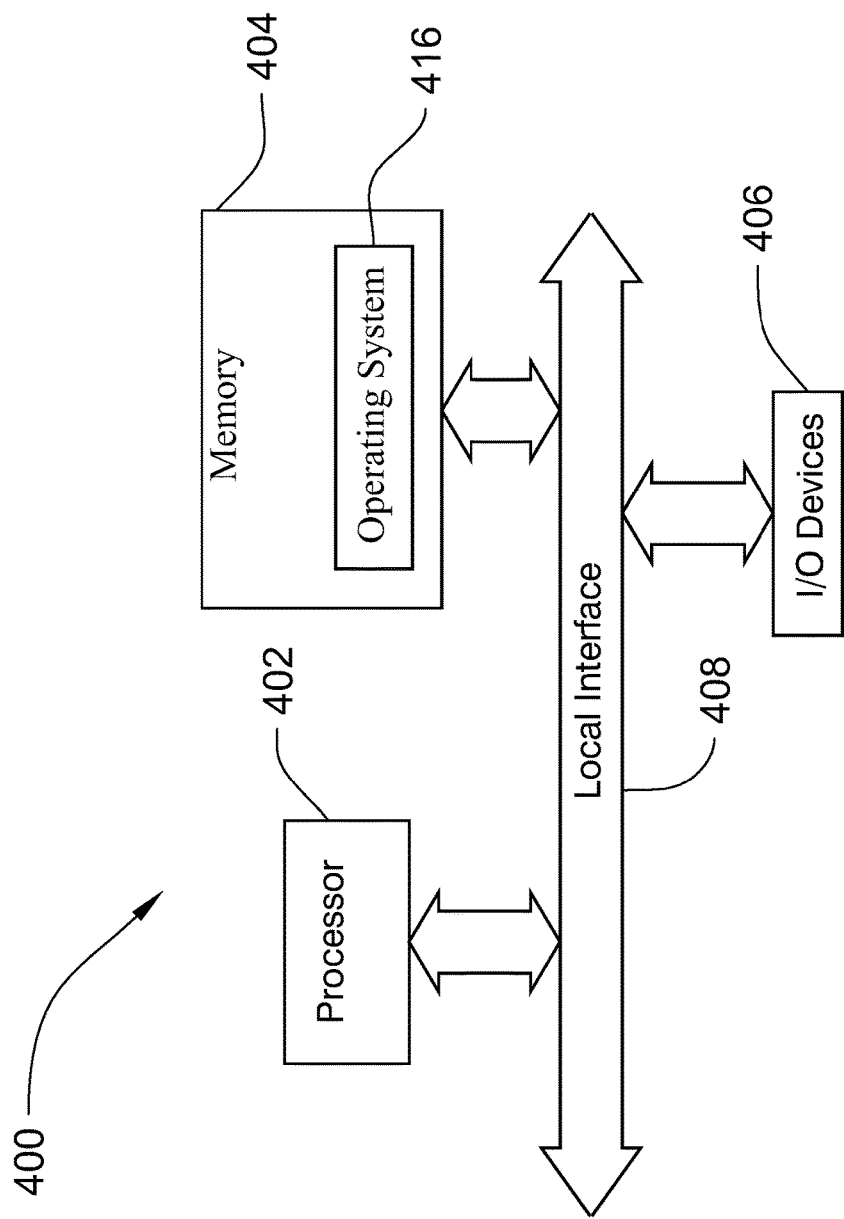
FIG. 4 is a block diagram of one form of a computing device, such as those of FIG. 1, having a memory element with a computer readable medium for implementing the activities proscribed by the order management system.

More specifically, each hardware element of FIG. 1 will have the basic elements set forth in FIG. 4. FIG. 4 is a block diagram that illustrates a general purpose computer 400, which could be any of the hardware elements of FIG. 1. Generally, in terms of hardware architecture, the general purpose computer 400 includes a processor 402, a memory 404, one or more input and/or output (I/O) devices 406 (or peripherals) that are communicatively coupled via a local interface 408. The local interface 408 can be, for example, but not limited to, one or more buses or other wired or wireless connections, as is known in the art. The local interface 408 may have additional elements, which are omitted for simplicity, such as controllers, buffers (caches), drivers, repeaters, and receivers, to enable communications. Further, the local interface 408 may include address, control, and/or data connections to enable appropriate communications among the other computer components.

The processor 402 is a hardware device for executing software, particularly software stored in memory 404. The processor 402 can be any custom made or commercially available processor, a central processing unit (CPU), an auxiliary processor among several processors associated with the general purpose computer 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. The processor 402 may also represent a distributed processing architecture such as, but not limited to, SQL, Smalltalk, APL, KLisp, Snobol, Developer 200, MUMPS/Magic.

The memory 404 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 404 may incorporate electronic, magnetic, optical, and/or other types of storage media. Memory 404 can have a distributed architecture where various components are situated remote from one another, but are still accessed by the processor 402.

The software in memory 404 may include one or more separate programs. The separate programs comprise ordered listings of executable instructions for implementing logical functions. In the example of FIG. 4, the software in memory 404 includes a suitable operating system (O/S) 416. A non-exhaustive list of examples of suitable commercially available operating systems 416 is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 416 essentially controls the execution of other computer programs stored in memory 404 and provides scheduling, input-output control, file and data management, memory management, and communication control and related services.

Applications stored in memory 404 may be a source program, executable program (object code), script, or any other entity comprising a set of instructions to be performed. When a source program, the program needs to be translated via a compiler, assembler, interpreter, or the like, which may or may not be included within the memory 404, so as to operate properly in connection with the O/S 416. Furthermore, each application can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices 406 may include input devices, for example but not limited to, credit card readers, input modules for PLCs, a keyboard, mouse, microphone, touch screens, interfaces for various devices, barcode readers, stylus, laser readers, radio-frequency readers, etc. Furthermore, the I/O devices 406 may also include output devices, including, but not limited to, receipt dispensers, output modules for PLCs, a printer, barcode printers, displays such as touch screen displays, etc. Finally, the I/O devices 406 may further include devices that communicate both inputs and outputs, for instance but not limited to, a modulator/demodulator (modem; for accessing another device, system, or network), a radio frequency (RF) or other transceiver, a telephonic interface, a bridge, and a router.

As discussed above, each mobile user device 140 may include a touch screen interface application 326. In one embodiment, the touch screen interface application 326 is provided for displaying a plurality of customer ordering interface screens of the present invention and receiving customer selections in response thereto, as will be described in greater detail below. In the embodiment shown in FIG. 2, the CPU portion 210 of the mobile user device 140, at least in part, generates, launches, communicates, and/or implements the customer order generating interface screens for allowing and causing the touch screen interface application 326 to display the customer order generating interface screens on the interactive hardware portion 204 (for simplicity hereafter referred to as a touch screen display). As shown in FIGS. 2 and 3, the CPU portion 210 can include in memory 212 an OMS application component 318 for launching, communicating, and/or implementing the customer order generating interface screens of the present invention.

The customer can view the customer order generating interface screens as displayed on the touch screen display 204 by launching the OMS application component 318, and the customer can utilize these customer order generating interface screens to select menu items, select a payment option, select a venue location, and other various actions in association with utilization of the OMS 100. In one embodiment, the presentation on the touch screen display 204 is created and controlled by software, such as the OMS application component 318 and information received from the CPU portion 210.

Figure 5:
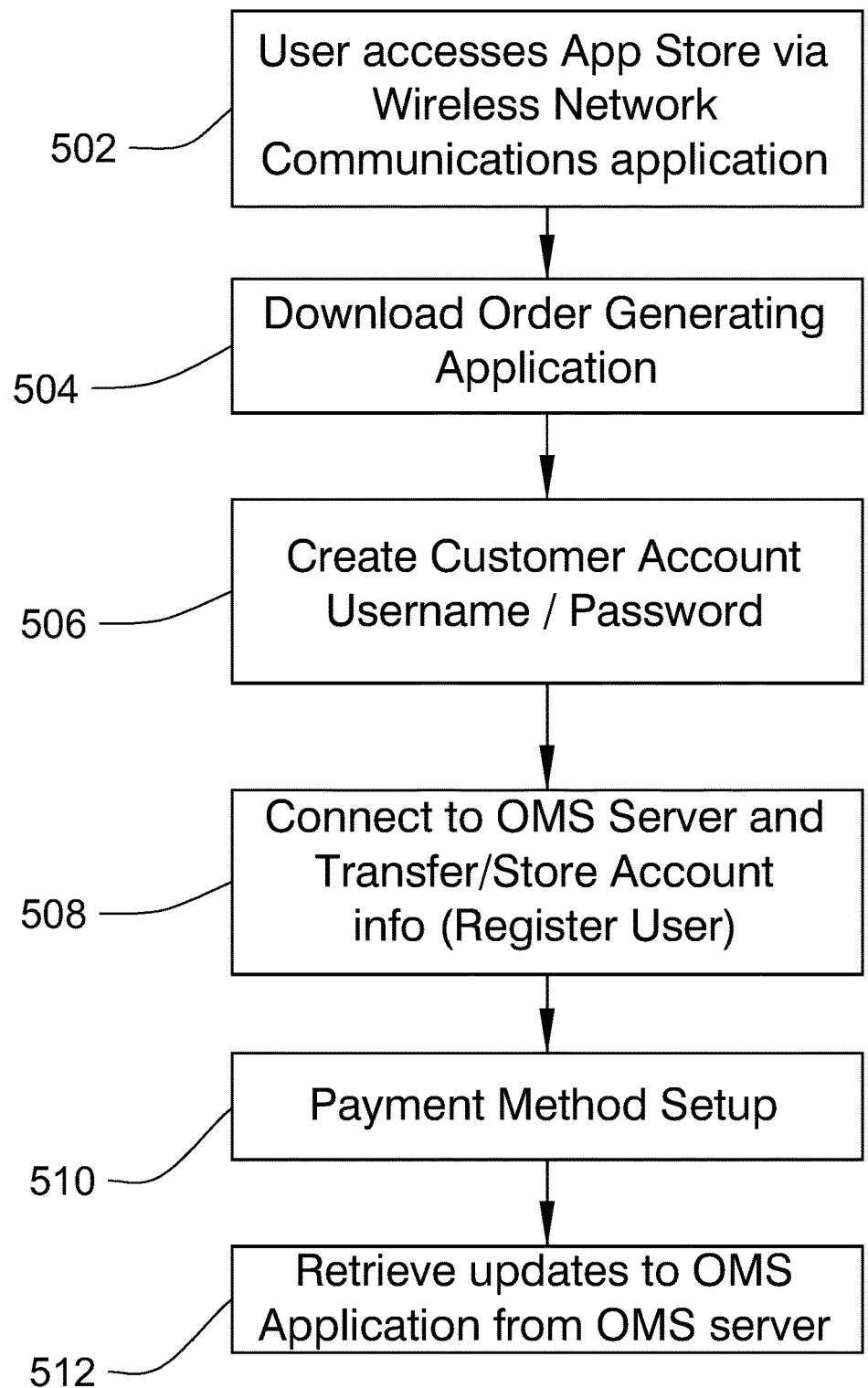
FIG. 5 is a flow chart illustrating an embodiment of a process for establishing a customer account in accordance with the invention.

Now referring to FIG. 5, a flow chart illustrating an embodiment of a process for establishing a customer account with a food vendor is provided. According to the illustrated embodiment, the customer (or "user") must establish an account with the food vendor in order to receive and store the OMS application component 318 necessary to interface with the OMS 100 on their mobile user device 140. Though an account is not required in all embodiments, it is necessary to enable the OMS 100 to recognize the user, and, thereby, to provide certain tailored services, improve security, and allow the system to function at its full scope and intent.

The customer account is opened or set up as follows. To initiate the process, at step 502, a user connects their mobile user device 140 to an application repository such as the app store 114 of FIG. 1 (which could be provided by Apple, Google or other content providers), locates the OMS application component 318 (also referred to herein as the Easy Thru Application), and downloads the application component. Alternatively, the user could connect mobile user device 140 to a website where the application component 318 could be directly downloaded and installed. Once the application component 318 is downloaded at step 504, the user launches the OMS application component 318 on the mobile device 140 and is prompted by the application to create a customer account, at step 506. This involves establishing a username and password that will be used by the OMS 100 to recognize the user. Typically the username will be in the form of an email, such that the OMS 100 has a means to communicate messages to the user when the user is not using the OMS application component 318. In some embodiments, an additional account verification step (not shown) involves sending an email to the email account provided by the user as a username and requiring a response to verify that the user has access to and control of the email account, and that the email account is legitimate.

Figure 6:
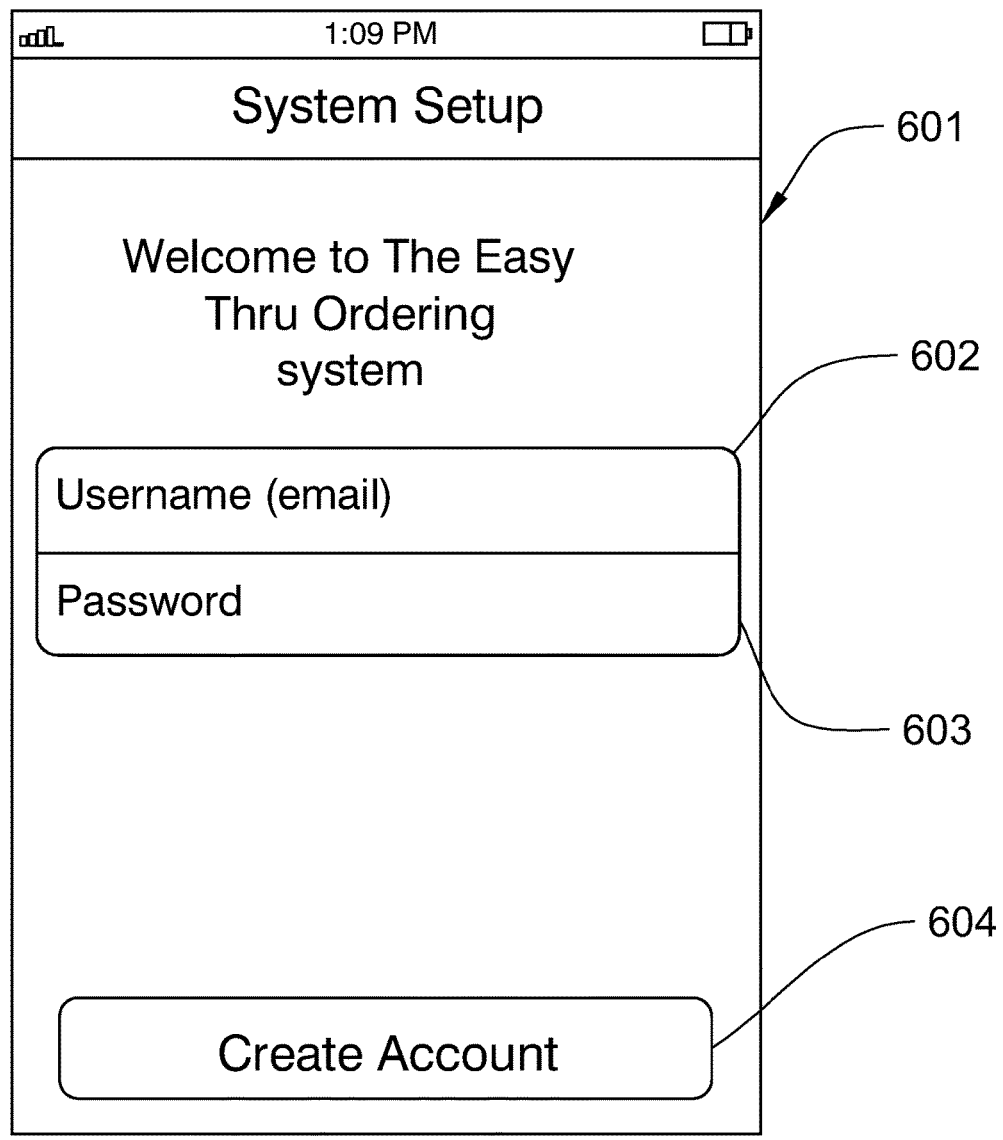
FIG. 6 illustrates an example of a system setup screen used by the order management system in accordance with a particular embodiment.

A system setup screen 601 is illustrated, for example, in FIG. 6, and provides a first example of how the touch screen display 204 of the user device 140 interacts with the user to obtain input and instructions. The user is prompted to enter a username (email) 602 and password 603, which may be stored in the memory associated with the mobile user device 140, but will also typically be stored in a memory (or a database connected to a memory) component of OMS Server 110, thus allowing the OMS Server 110 to recognize the user. In the preferred embodiment, the username and password are associated with the user, not necessarily with the user's mobile device 140. In the latter case, where the username and password are "remembered" by the mobile user device 140, the OMS server 110 would not necessarily be able to discern one user using the device 140 from another user using the same device. Thus, in the illustrated embodiment, the username and password is submitted to the OMS server 110 and stored on a remote database associated with the OMS server 110.

Once a username and password are entered, the user proceeds to select "create account" 604 on the screen of FIG. 6. This action launches step 508 of FIG. 5, which is to connect the mobile device 140 to the OMS server 110 for the first time. This connection is managed by the OMS application component 318, but may harness separate connectivity software such as, for example, wireless network communication application 324. Once connected, the application component 318 transfers the newly generated username and password to the OMS server 110. It is as this time that the OMS server 110 would conduct a verification step, such as by sending a test email to the email address identified in the username 602. The OMS server 110 executes a component of the OMS application 318 to register the user in the OMS 100 and create an account for the user on the OMS server 110 (or its associated database).

This process may include asking a variety of user questions to populate the database. For example, as shown in step 510 of FIG. 5 and illustrated in the link card screen 611 of FIG. 7, the user might be prompted to provide method of payment. Linking a payment means (such as a credit card, debit card, stored value card, PayPal account, or other such account) to the OMS 100 allows for easy and quick order payment. If no method of payment is linked, the user will have to enter a means of payment each time an order is submitted or checked in. In some embodiments, orders may be submitted with a commitment to pay upon receipt. However, it is preferable that an order not be prepared prior to payment being received. It should also be noted that it is not necessary for a user's sensitive financial information to be stored on the OMS server 110, or any other component of OMS 100. Rather, the verification of a method of payment may be performed by a financial intermediary system (not shown) to authenticate the method of payment. Once that is complete, the OMS server 110 need only have enough information to identify the method of payment of choice and submit a request for payment. For example, the payment specifics could be maintained in encrypted form on the memory of the mobile device, and only a decryption key stored at the financial intermediary.

Figure 7:
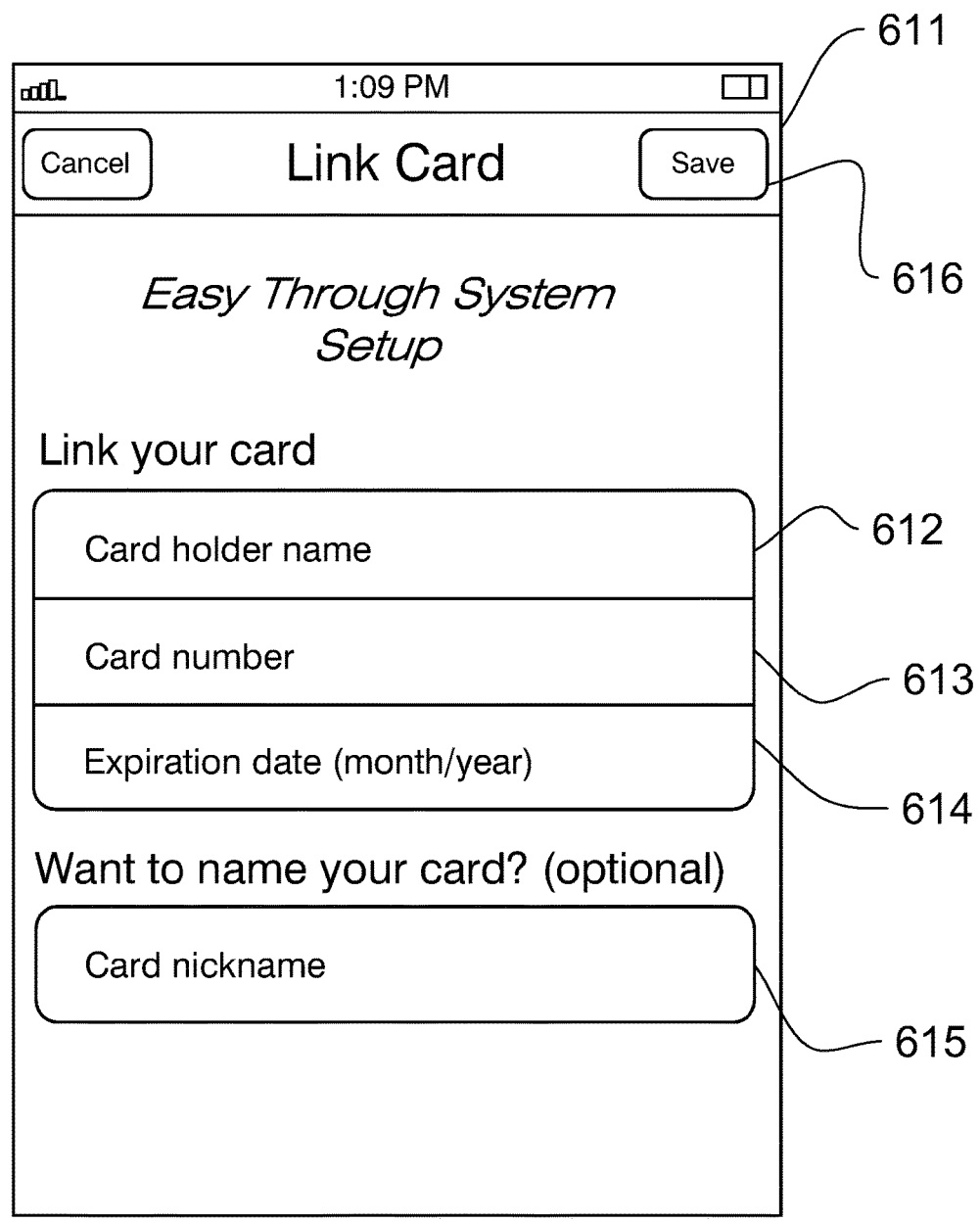
FIG. 7 illustrates an example of a payment setup screen used by the order management system in accordance with a particular embodiment.

As shown in FIG. 7, to create a method of payment, a user simply enters information about a payment source, such as the card holder name 612, the card number 613 and the expiration date 614. For convenience, the user may also enter a card nickname 615, such as "Corporate Card." Finally, the user selects save 616 to store the information in the OMS Server 110 or associated database. Alternatively, this information could be stored locally on the mobile user device 140. Though part of the setup is illustrated here, it will be understood that new cards or payment sources could be linked at any time after setup is complete.

Once the user is registered and all of the information needed for account setup has been entered, the OMS Server 110 transmits any updates to the OMS application component 318 that is to reside on the mobile user device 140. Though shown as step 512, and following the other account setup steps, this step may take place at any point after connection to the OMS server 110 are established. This step is helpful to ensure that the mobile user device 140 has the latest version of the OMS application component 318, including any patches or additional data that may not be in the version stored in the app store 114. As will be seen, the OMS server 110 is updated with new OMS data all the time, while the version on the app store may be more static and updated less frequently. OMS data may include application data used to modify or enhance the operability and functionality of the OMS application component 318 on the mobile user device 140, menu data used to generate menus within the application, order data used to convey information about orders, promotional data relating to use of the OMS 100, system availability data, such as information conveying the available venue locations and the facilities offered at those venues, or other any data for use by the OMS application 318.

Menu data, as referred to herein, may be any data used by the OMS application 318 to generate one or more menu screens on a mobile user device 140, or to communicate and define menu options or selections to the various other OMS 100 elements shown in FIG. 1. This data may include, but is not limited to, product item names, item codes, images associated with product items, item pricing, descriptive information about items, menu commands, menu hierarchy information, and item availability. Regarding menus, it will be understood that a menu is simply a list of products or services that is available from a vendor. While this invention is primarily described herein in the context of a menu for a quick service restaurant, it is equally applicable to the ordering of goods or services other than food and beverages from other types of vendors—particularly where the vendors offer their goods and services at several different locations, and where the availability and pricing of those goods and services vary to some degree from one location to another, or where the goods or services are time sensitive, such that it is optimal for an order not to be released for preparation until near to the time when the goods or services are to be received. Accordingly, where the claims are not specifically limited to food or beverage menus for use in ordering from quick service restaurants, such limitations should not be read into the claims.

For explanation purposes, menu data may be classified herein as main menu data and venue specific menu data. In a multiple venue system where a user may place an order for goods or services from a variety of like venues, such as restaurants within the same restaurant chain, the menus or availability from one venue to the next may vary. Thus, each venue may have a unique venue specific menu, with a unique set of venue specific menu data. Pricing for like items may also vary among venues, based on, for example, the cost of living in the area where the venue is located, the supply and demand factors for particular items in that area, etc. However, there is in the illustrated embodiment at least some commonality across the item offerings at all of the venues within the chain such that there is also a main (or base) menu of these common offerings that is comprised of main menu data. The more common the menus are between the various venues in the system, the more detail and information may be consolidated within the main menu data and the less detailed the information needs to be in the venue specific menu data. Preferably, the menus within the OMS 100 will have a common structure, background colors, command structure, etc., such that the "shell" of the menu is contained within the main menu data, as well as the various stable and common menu offerings. Only those items that are unique to a venue, such as unavailability of basic menu items or availability of unique items, item pricing, etc., will typically be contained within the venue specific menu data.

Returning again to FIG. 5, one important update that occurs at step 512 is to load the latest main menu data into storage on the mobile user device 140. While menu data is always available through the OMS server 110, having certain data available on the mobile user device 140 increases processing speed and allows some steps of the ordering process to be made without connection to the OMS server 110. For example, if wireless service were unavailable, in some embodiments a user could still browse the main menu (or the latest venue specific menu resident on the mobile user device 140) and set up an order to be submitted once connectivity is established. To the extent that the menu on the device is no longer current, as will be seen, the OMS 100 has features to handle this problem, while still allowing an order to be set up.

Figure 8:
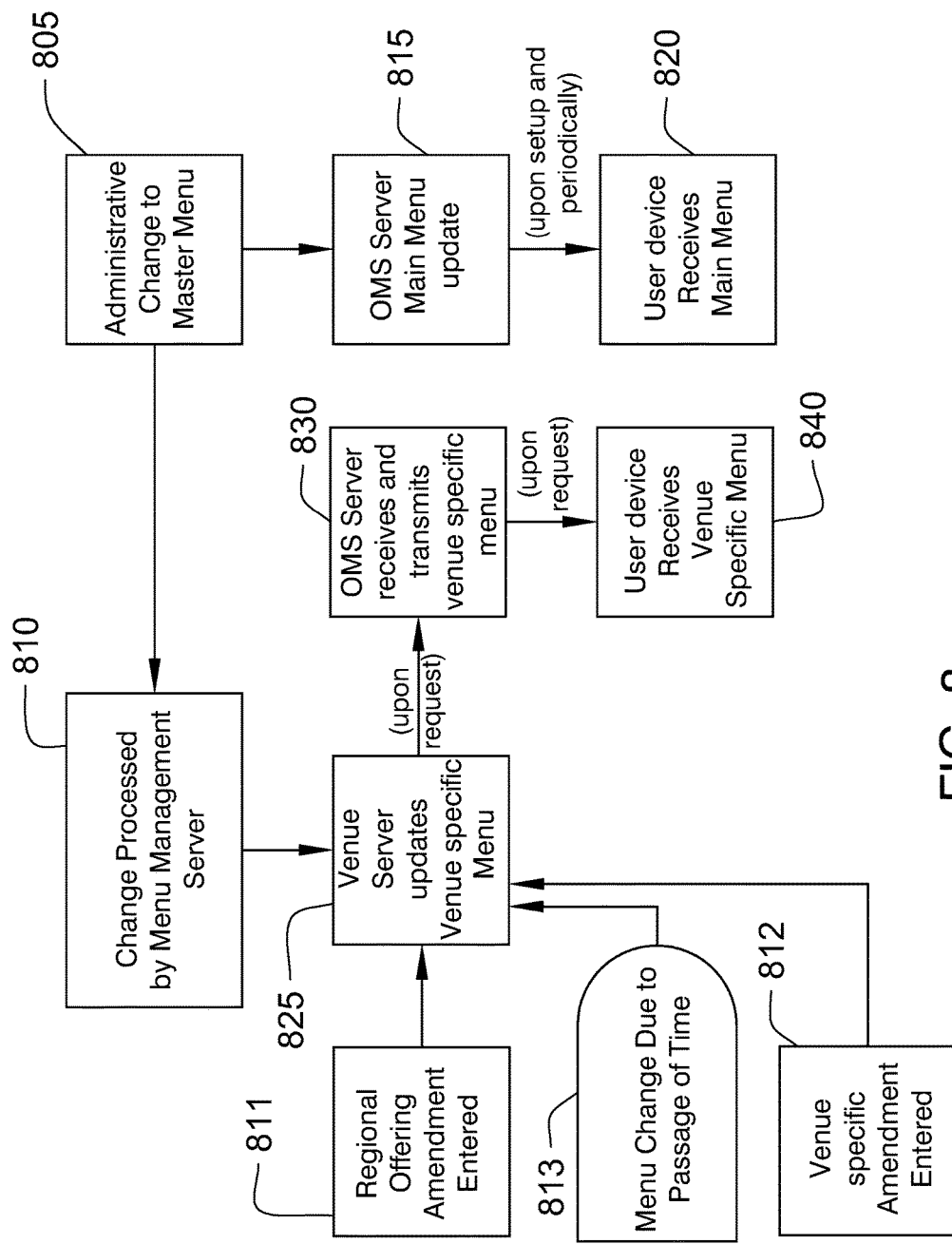
FIG. 8 is a block diagram showing the flow of menu changes through various system components according to certain embodiments.

As mentioned previously, and unlike in the case of Pentel, White and the other prior art references, the present invention is well equipped to manage dynamic, ever-changing menus. FIG. 8 provides a block diagram showing the flow of menu changes through various OMS 100 components according to certain embodiments. It may be helpful to review FIG. 8 in association with FIG. 1. The process of menu creation/change begins at step 805 with an administrative change to the main menu. This change would be made by a system administrator, such as on central administrator computer 132, using a backend application interface of the OMS 100, or a related menu management system. Such a change might include, for example, the addition of a newly created, system wide menu item, which would require supplemental menu data relative to that item. The supplemental menu data would be sent from the central administrator computer 132 to the menu management server 130 where, at step 810, the new data would be incorporated to update the main menu at the system level. In accordance with the illustrated embodiment, changes to the main menu are also communicated to the OMS server 110 so that its resident copy of the main menu is also updated at step 815.

As shown in FIG. 1, updates to the main menu would be passed to the OMS server 110 from the menu management server 130. As mentioned above, in some embodiments, the OMS server 110 and the menu management server 130 may be the same machine. However, keeping them separate is preferred as a means to further specialize the devices and enhance security. For example, the OMS server 110 focuses on providing a portal for outside user interaction while the menu management server is a back end device that may provide other functions not related to customer interaction. It is not necessary that every change to the main menu on menu management server 130 be communicated to the OMS server 110. However, the more current the main menu is on OMS server 110, the more efficient the system will operate because the less likely it will be that significant changes will be needed at check-in time, as explained below. Also, there will be less venue specific menu data that must be passed to the mobile user devices 140 when setting up an order.

As explained above in association with FIG. 5 (step 512), at the time a mobile user device 140 is used to initially establish an account, the main menu data resident on the OMS server 110 is transferred to that mobile user device 140 for local use on the device. This is shown at step 820 of FIG. 8. Thus, not every change to the master menu initiating at step 805 is broadcast to every registered user device 140 in the illustrated embodiment. However, as indicated on FIG. 8, the OMS server 110 can be set to periodically send the latest main menu data patches to devices. For example, cookies could be used to identify the age of the last main menu data update that the mobile user device 140 received. In such a case, once the age of the cookie corresponding to the last main menu data update on a user device 140 reaches a pre-determined amount, the OMS server 110 sends main menu data to the mobile user device 140 the next time it connects to the server 110. A system administrator will have to determine the appropriate cookie age at which to refresh the main menu on a mobile user device 140 in order to achieve the most efficient system operation. This will depend on server capabilities, usage rates, menu data density, etc.

Finally, changes to the main menu data are transmitted to the venue server 120 from the menu management server 130 at step 825, where the venue server 120 incorporates them into the venue specific menu that resides locally at the venue. This may be set up as a "pull" or "upon request" data feed such that the venue server 120 must ask for the update, but, as disclosed, it is a "push" data feed where the update is broadcast automatically to all venue servers 120. This latter method helps to keep the menus at the various venue servers 120 similar in appearance and content. For example, though two restaurants might offer Item A at different prices, by "pushing" the main menu change to all venue servers 120 simultaneously, the image icon associated with Item A broadcast as part of the main menu will be common in the venue specific menus for those restaurants.

Step 825 is an iterative process occurring on the venue server 120 at a given restaurant (venue) in which the venue specific menu for that restaurant (venue) is revised. As indicated in FIG. 1 and FIG. 8, a given venue server 120 may receive menu updates (in the form of menu data) from various sources. In the illustrated embodiment, the venue server 120 not only receives main menu updates from the menu management server 130, it may also receive updates from a regional administrator computer 122 and from the venue administrator computer 124. In large systems, such as a national restaurant chain, there may be regional offices that cover a certain geographic area in which restaurants belonging to the chain are located. Because consumer tastes vary between geographic regions of the country (or the world), there may be a desire to provide different menu offerings from one region to another. For example, it may be desirable in the southwestern United States to add certain spicier menu items, while it might be desirable to offer a sweet tea beverage in the southeastern United States and a variety of warm soups in the northeastern United States. These regional offerings might be incremental to the main menu sent from the centralized menu management server 130. Alternatively, an administrator at the regional level may want to disable a particular menu item that is not desirable within a given region. In this manner, menu data could be sent from the regional administrator computer 122 to the venue servers 120 within that region (as shown in step 811 of FIG. 8) to affect that change.

Similarly, at the restaurant (venue) level, the restaurant manager may desire to alter the menu based on inventory or other factors. In many cases, pricing for individual items will be controlled at the individual restaurant (venue) level, so this would be a venue specific menu data input as well. Manager inputs would be entered into a user interface on the venue administrator computer 124 at step 812 of FIG. 8 and transmitted to the venue server 120 for that restaurant (venue). Though shown separately, the venue server 120 and venue administrator computer 124 may be a single machine depending on the computer requirements of the restaurant (venue). The user interface used by the restaurant manager (and, separately, by the regional manager using regional administrator computer 122) may be a component of the OMS application 318 or a component of a separate menu management system application.

Finally, there are time-based, or revolving changes to the venue specific menu. An example of this would be a breakfast menu, a lunch menu, a dinner menu, and a late night menu for a quick service restaurant. While these four menus may have common items at common prices, other items may be unique to one menu or another such that some items may only be offered at certain times of the day. In the case of a restaurant with revolving menus based on the periods of the day, it is desirable for any mobile ordering option to reflect the menu items currently being offered. The present invention not only provides for this, but, as will be seen, it also accounts for scenarios where the menu changes from the time an order is remotely submitted to the time the user (customer) arrives at the restaurant. Thus, at step 813, a menu change is triggered by the mere passage of time. Time-based menu changes could be controlled at the venue server 120 level, the regional level or the main menu management level, but, in any of these events, the update will be made automatically on the venue server 120 to change the venue specific menu for the restaurant at step 825. In another alternative, a user may enter a time at which they expect to receive the order and, based on the system 100 will use menu data associated with the venue specific menu expected to be available at that time. If the user shows up at a different time, the system 100 can make changes upon check in as described below.

Returning to FIG. 8, step 825 occurs at least periodically due to the passage of time. Changes from the regional administrator computer 132 or the menu management server 130 may be rolled in immediately upon arrival at the venue server 120, may be adopted at the time of a "passage of time" amendment, or may be adopted based on receipt of a command from the venue administrator computer 124. The purpose of this last option would be for the restaurant manager to have the opportunity to review the proposed changes. Depending on the structure of the organization utilizing the OMS 100, restaurant (venue) managers may have the authority to override some (or all) of the changes that come in from the regional or central offices. The level of authority of a restaurant (venue) manager may vary from organization to organization, or even within a particular organization. For example, in some cases, a restaurant manager may have the ability to offer completely unique menu items and add those menu items to the venue specific menu for that restaurant. In other cases, the authority may be more limited, but the manager may at least be able to remove items from the menu if the restaurant is no longer able to provide them, such as, for example, it is temporarily out of inventory. Any override instructions would be considered during step 825 when the venue specific menu is being updated by the venue server 120.

While the venue specific menus for each of the various restaurants (venues) in the system are updated frequently, they are not broadcast out to mobile user devices 140 or even to the OMS server 110 in the illustrated embodiment. While it may be feasible (and even preferable) to house a current copy of each venue specific menu on the OMS server 110 in smaller organizations where there are only a handful of different venues, this is less feasible or preferable when there are a great number of venues. For example, in a nationwide restaurant chain with thousands of venues, each having unique venue specific menu data being updated at different times, it would be very inefficient to constantly be sending updates to the OMS server 110, which does not necessarily need to maintain all of that data. Rather, when the OMS server 110 has a need for venue specific menu data from a particular venue, it sends a query to request that data at step 830, and passes it along to a mobile user device 140 as necessary. Thus, in the illustrated embodiment, the OMS server 110 serves as a gateway and conduit, but not a repository for venue specific menu data.

Each user device 140 that has installed the OMS application component 318 and registered with the OMS server 110 will have received and stored main menu data. This is sufficient to enable certain aspects of the system, but, as will be seen, a user must identify a specific venue (restaurant) in order to submit an order. When this is done, venue specific menu data is required. If the user has not placed an order with the selected venue recently (or in some embodiments, regardless of this), a request for the venue specific menu data will need to be routed through the OMS server 110 to the appropriate venue server 120. The venue specific menu data is then routed back through the OMS server 110 (step 830) to the requesting mobile user device 140 (step 840).

While it is not preferable to store venue specific menu data for all venues (restaurants) at the OMS server 110 when the OMS 100 is utilized by larger organizations for the reasons explained above, it may be desirable to store a limited amount of venue specific menu data at the mobile user device level. This is because, while the OMS server 110 must route OMS traffic among all of the various venues, it is unlikely that a user will frequent more than a few of them. Thus, depending on the specific embodiment and system setup, the OMS application component 318 on a mobile user device 140 may be set up to store the latest venue specific menu data that it has received for one or more venues (restaurants). Having this more detailed information available locally will allow a more accurate order setup to be prepared prior to any connection with the OMS server 110. This, in turn, improves system speed, efficiency, and overall user experience with the OMS 100. In one embodiment, the OMS application component 318 may be programmed to retain the latest received version of the venue specific menu data for the most recent five venues ordered from, in a last in, first out data management scheme. Thus, when a user orders from a sixth venue, the venue specific menu data for the sixth venue will replace that of the first, and so forth. Alternatively, a user could instruct the application component 318 to always retain the most recent venue specific menu data received for one or more particular "favorite" venues. Note that, in some embodiments, though a venue specific menu may be stored on a mobile user device 140 for a particular venue, the OMS server 110 still may check for updated venue specific menu data from that venue when the next order is placed by that device 140 from that venue.

Use of the OMS 100 by a user is best explained in terms of two separate, but related sub-processes. The first sub-process, which involves order setup and submission, typically occurs from a first location at a first time. The second, related sub-process, which involves order check-in and receipt, typically occurs from a second location at a second time. The first location may be literally anywhere, but is typically at a location remote from the restaurant (venue) where the order is to be prepared. The second location is at the restaurant (venue). The first time can be any time prior to the second time, where the second time is the time at which the order is checked-in at the restaurant (venue) and received. Because it is not desirable for orders to be submitted to the OMS Server 110 but never checked in, or not checked in within a reasonable time, an administrator may set limits such that the first location must be within a certain distance of the second location and/or orders submitted at a first time will expire within a certain period of time if they have not been checked in.

While these two separate sub-processes occur at different times and locations, it will be understood that they can also be considered components of a larger, single process, namely, use of the OMS to generate, submit, check-in and receive an order. Moreover, it will be understood that the order setup and submission sub-process could be performed at the venue just prior to checking in the order. In such a case, there would only be one location and essentially one time. However, for purposes of explanation below, we assume order setup and submission occur at a location different from the venue, and at least several minutes prior to check in.

Figure 9:
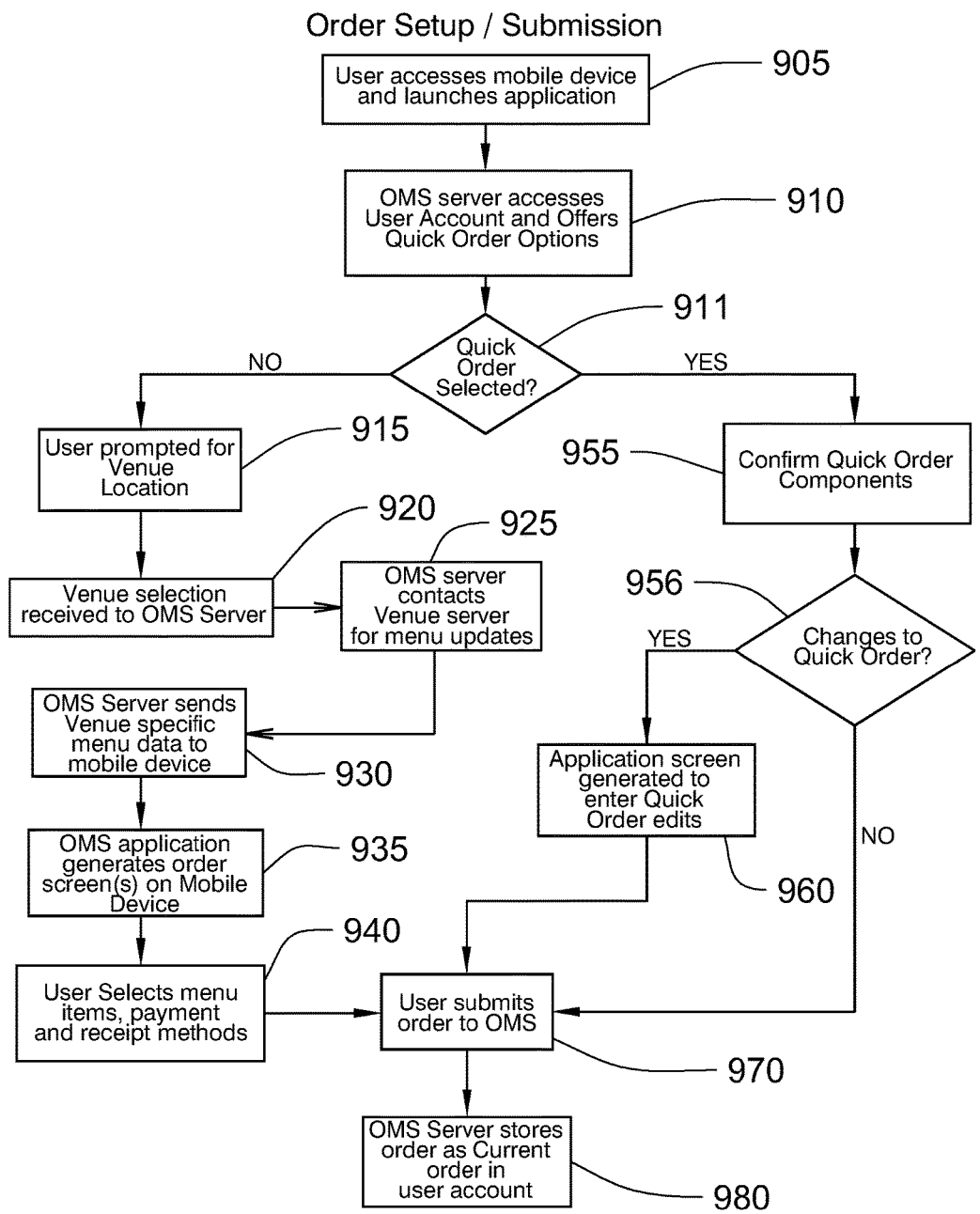
FIG. 9 is a flow chart illustrating an embodiment of a process for setting up and submitting an order in accordance with the invention.

Turning to FIG. 9, we will now walk through the steps of the first of these processes—order set up and submission. In the embodiment discussed here, user account information is stored at the OMS server 110. At step 905, a user accesses their mobile user device 140 and launches the OMS application component 318. In an embodiment where accounts are tied to users and not devices, the application 318 will ask the user to sign in so that they may be recognized by the OMS server 110. Using this information, which is caused to be transmitted by application component 318 from the mobile user device 140 to the OMS server 110, the OMS server 110 identifies the user and accesses the user's account at step 910. Based on this data, the OMS server 110 transmits certain user account data and Quick Order options (if available) stored in the user account at the OMS server 110 (or associated database) to the mobile user device 140, which, via its resident OMS application component 318, uses this information to construct a welcome screen 621 such as that shown in FIG. 11.

As shown in the display on a mobile user device in FIG. 11, this welcome screen 621 identifies the person's name associated with the account and offers options whether to (1) enter one of Quick Orders Q1, Q1, or Q3, (2) to create and submit an entirely new order, or (3) to check in a Current Order (discussed further below). If there is already items in the user's basket that have not been checked in and received, the system will perceive this as an existing order and prompt the user with the option to modify it. Other information may also be conveyed through the welcome screen, such as venue advertisements, special promotions, or offers to the user.

The term "quick order" is used herein to describe a pre-created order, ideally that has been submitted to the OMS server 110 by the user in the past and is stored in the user's account on the OMS server 110 (or associated database). Alternatively, a Quick Order could be set up on the user's mobile device 140 and retained there. A Quick Order may have all aspects necessary to submit an order, or may simply be a partial order such that other information is required before submission. For example, a user might always prefer to submit orders to a specific venue using a certain payment method, with receipt at the drive-thru window. However, the items the user selects to order may always vary. Thus, three of the four primary components could be set up as a partial Quick Order so that those components will not need to be re-entered each time. Any number of Quick Orders could be set up and retained by a user. Obviously if no Quick Orders are resident on the OMS server 110 for a given user, none will be sent to the user. From the welcome screen 621 shown in FIG. 11, a user may either select one of the three Quick Order icons 622, or may select to generate a new order via new order icon 623 that does not correspond to any of the Quick Orders. This decision step is reflected on FIG. 9 at decision point 911.

If a Quick Order icon 622 is selected, a screen illustrating that Quick Order is generated by the OMS application component 318 and displayed on the touch screen of the mobile user device 140. The purpose of displaying this information is for the user to confirm that they want to order the Quick Order (step 955 on FIG. 9), or use it as a template to create a derivative order. For example, FIG. 12 is an image of a Quick Order screen 631 that would result from selection of "Q2" in FIG. 11. As shown in FIG. 12, there are four primary order components in the illustrated embodiment: menu items selected 632, venue location 633, payment method 634, and receipt method 635. A complete Quick Order will have all of these components filled with data corresponding to a previously submitted order that was then designated as the Quick Order. An incomplete Quick Order (which still may be stored in the user account on OMS Server 110) will only have certain components filled. FIG. 12 depicts a complete Quick Order corresponding to a prior order of a large hamburger, fries and a chocolate milk from a restaurant at 801 N. Market Street to be paid for by the user's corporate card and picked up at the counter of the restaurant. Though the menu items here show an order that is most likely for a single individual, there need be no limit to the quantity or variety of items set forth in a Quick Order, and it could be displayed in scrolling fashion if necessary to fit on the screen.

From the Quick Order screen 631 shown in FIG. 12, a user may either go back to the welcome screen 621, choose to re-enter the Quick Order by selecting the submit icon 636, or can edit the contents of one or more of the four components of the Quick Order by selecting one of the edit icons 637. This choice is illustrated on FIG. 9 at decision point 956. If the user does not want any changes, they select the submit icon 636 and the order is submitted to the OMS server 110 (step 970 on FIG. 9). Once received, the submitted order becomes the Current Order for that user. The Current Order is a term used herein to describe the order most recently submitted to the OMS Server 110 by a particular user that has not been checked in. The check in process will be described below, but once a Current Order is checked in, the Current Order associated with a particular user account is erased on the OMS server 110 to make way for the next order from that user.

If a user launches OMS application component 318 and the OMS server 110 identifies a Current Order for the user upon sign-in, the system 100 will assume that the user is ready to check in the order. However, the user could also update and re-submit the Current Order in the same manner as described in accordance with updating or modifying a Quick Order. Note that, in some embodiments, even where a Quick Order is selected and no changes are requested, a call to the venue server 120 for the venue identified in the Quick Order may be made by the OMS server 110 (see step 925 of FIG. 9) in order to determine if the Quick Order includes any menu items that are no longer (or that are not presently) available.

If a user selects one or more edit icons 637 on a Quick Order screen 631, a new OMS application screen is generated by the OMS application component 318 to enter those edits at step 960 of FIG. 9. The screens used to edit components of a Quick Order are the same as or similar to the screens used in creating those components in a new order, so they will be covered in association with reviewing creation of a new order.

Figure 11:
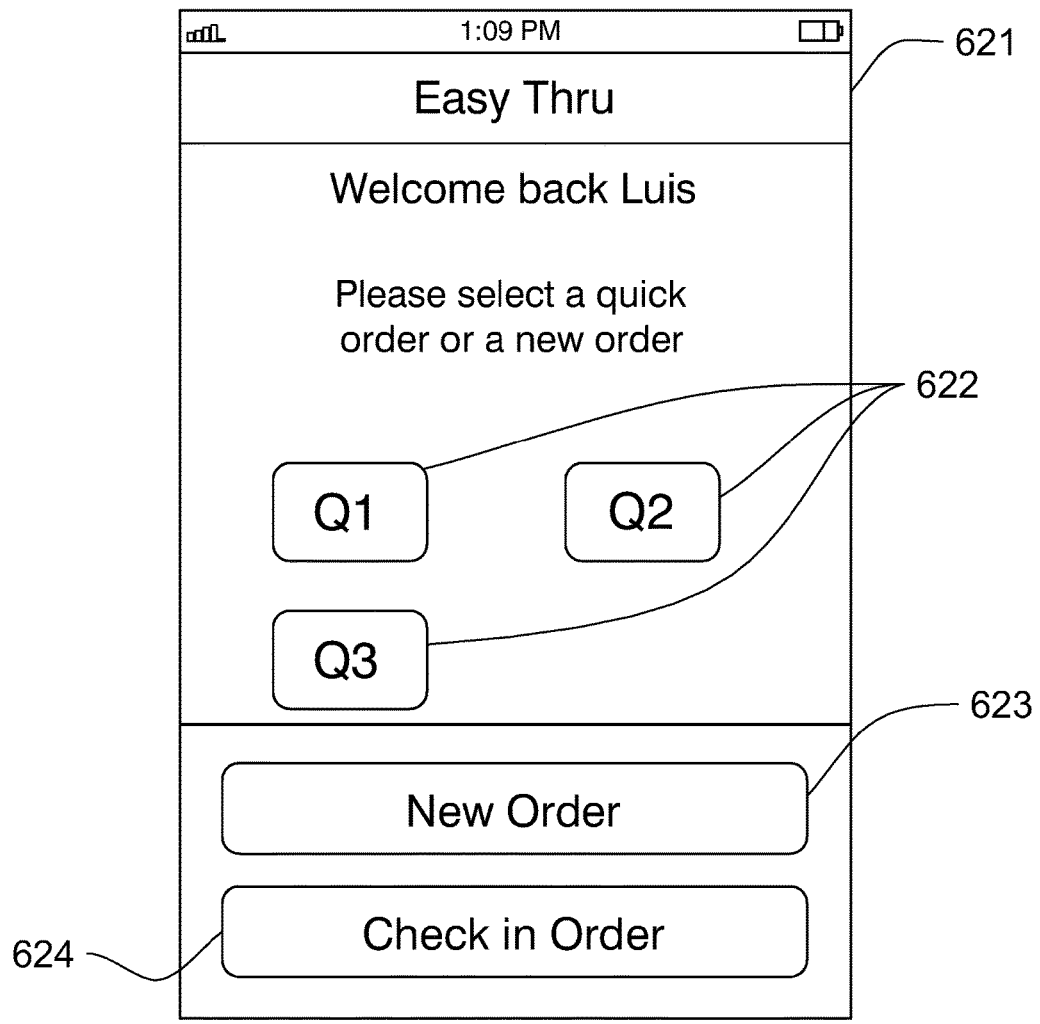
FIG. 11 illustrates an example of a welcome screen used by the order management system in accordance with a particular embodiment.
Figure 12:
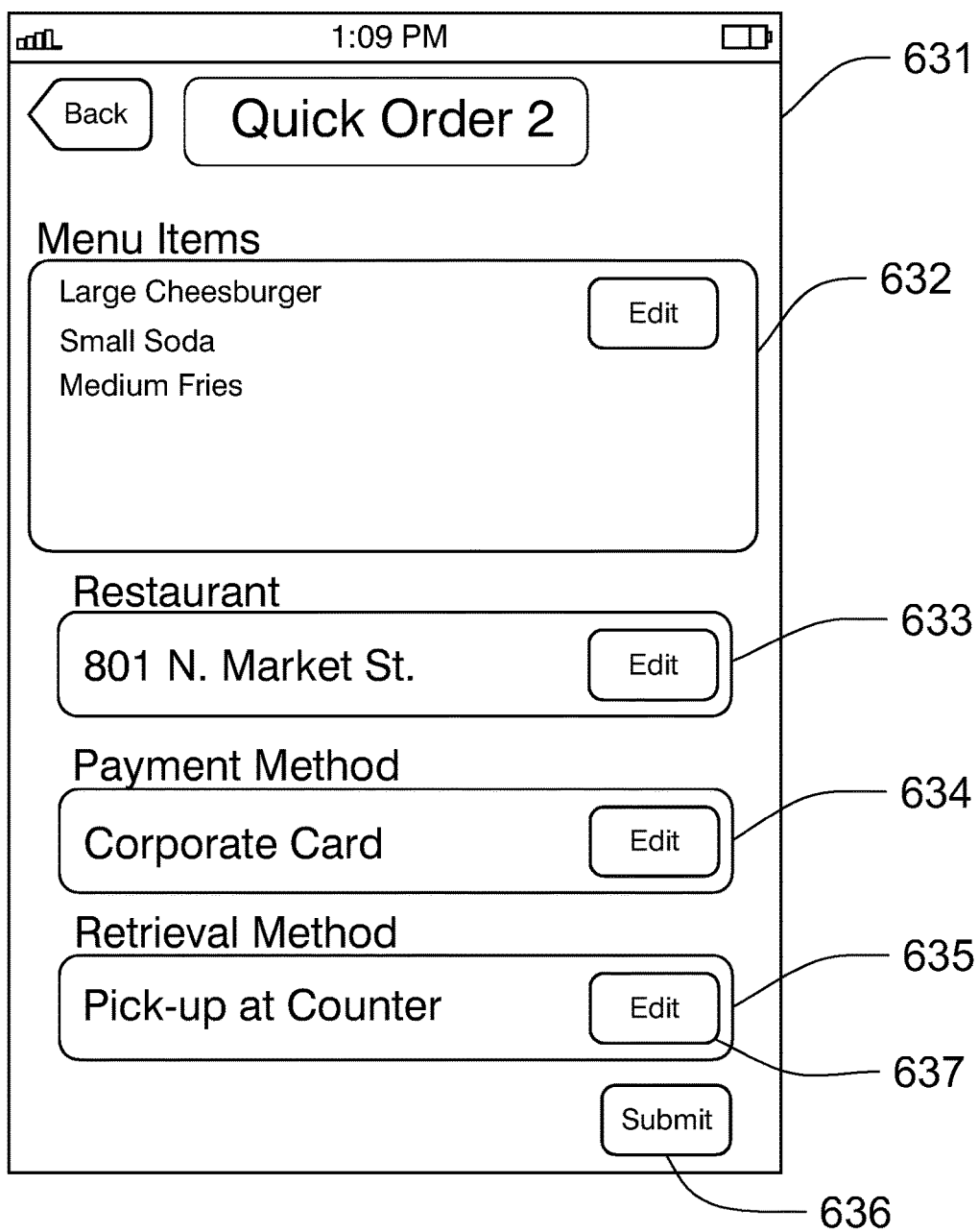
FIG. 12 illustrates an example of a Quick Order edit screen used by the order management system in accordance with a particular embodiment.
Figure 13:
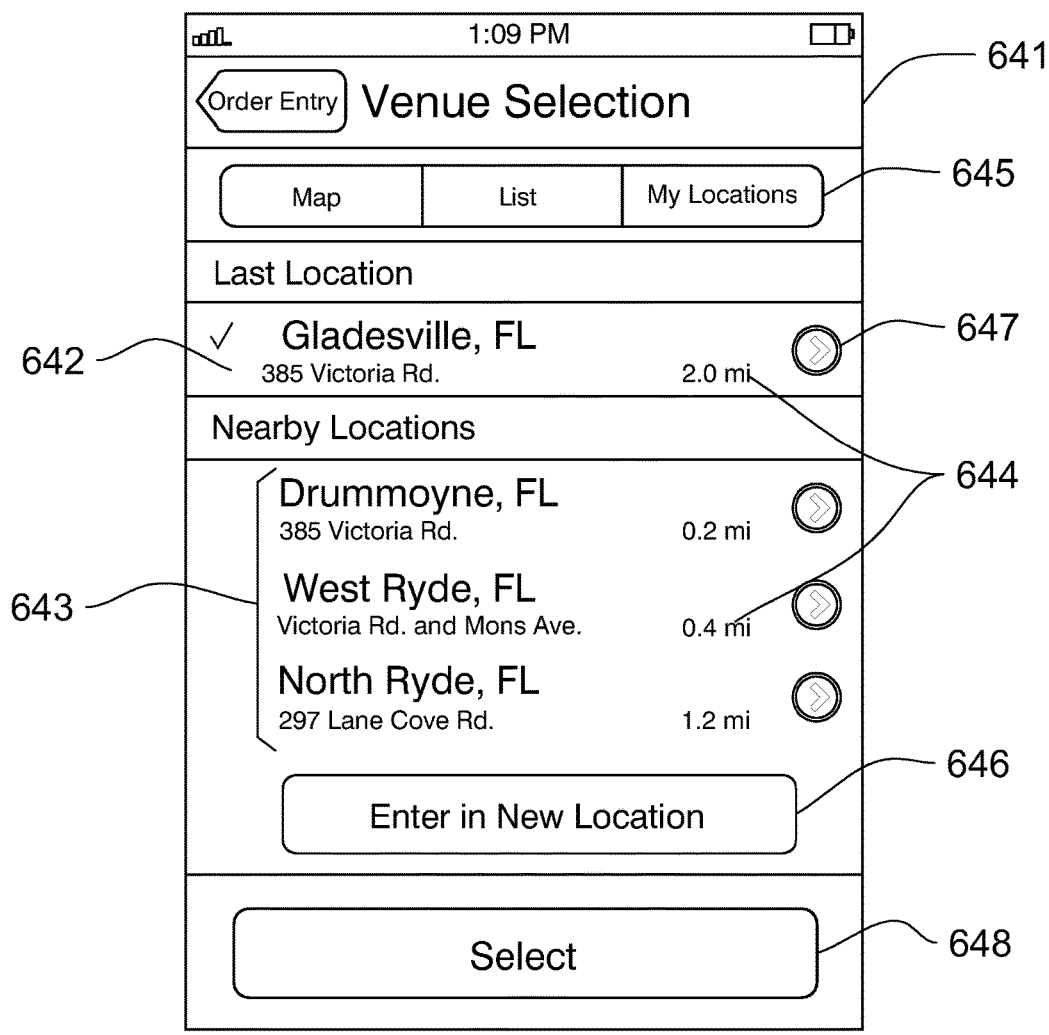
FIG. 13 illustrates an example of a venue selection screen used by the order management system in accordance with a particular embodiment.

When new order icon 623 of welcome screen 621 on FIG. 11 is selected, the user is prompted to select a restaurant (venue) location. This corresponds to step 915 of FIG. 9. The venue selection screen 641 of FIG. 13 provides an example of how a user may select a particular venue. In accordance with this embodiment, the user is provided with options including the last venue visited 642 and several venues near to the user's present position 643. The OMS application 318 is able to populate the last venue at which the user placed an order through the OMS 100 because that information will be stored in the user's account on the OMS server 110, or may also be stored on the mobile user device 140. The nearby locations 643 are based on the position of the mobile user device 140, and requires the device to have a GPS chip that is activated and enabled to transmit its position to the OMS Server 110. If GPS is not enabled, authorized, or available, the nearby locations feature will not operate. In addition, the OMS application 318 will not be able to provide the distance indicators 644 as shown on FIG. 13, which indicate the distance from the present location of the mobile user device 140 to the respective venues.

The user may also have stored favorite venues in the user profile on the OMS server 110. In this case, selection of the My Locations icon 645 will cause the OMS application component 318 to load a new screen listing those locations to select from. If a user is unsatisfied with any of these options, they may elect to enter a new location by selection of the new location icon 646. Here, the OMS application component 318 will load a screen enabling the user to type in a specific address or zip code (not shown). The address or zip code may correspond to a particular venue. If it does not, the OMS application will provide the available venues closest to the identified location.

Figure 14:
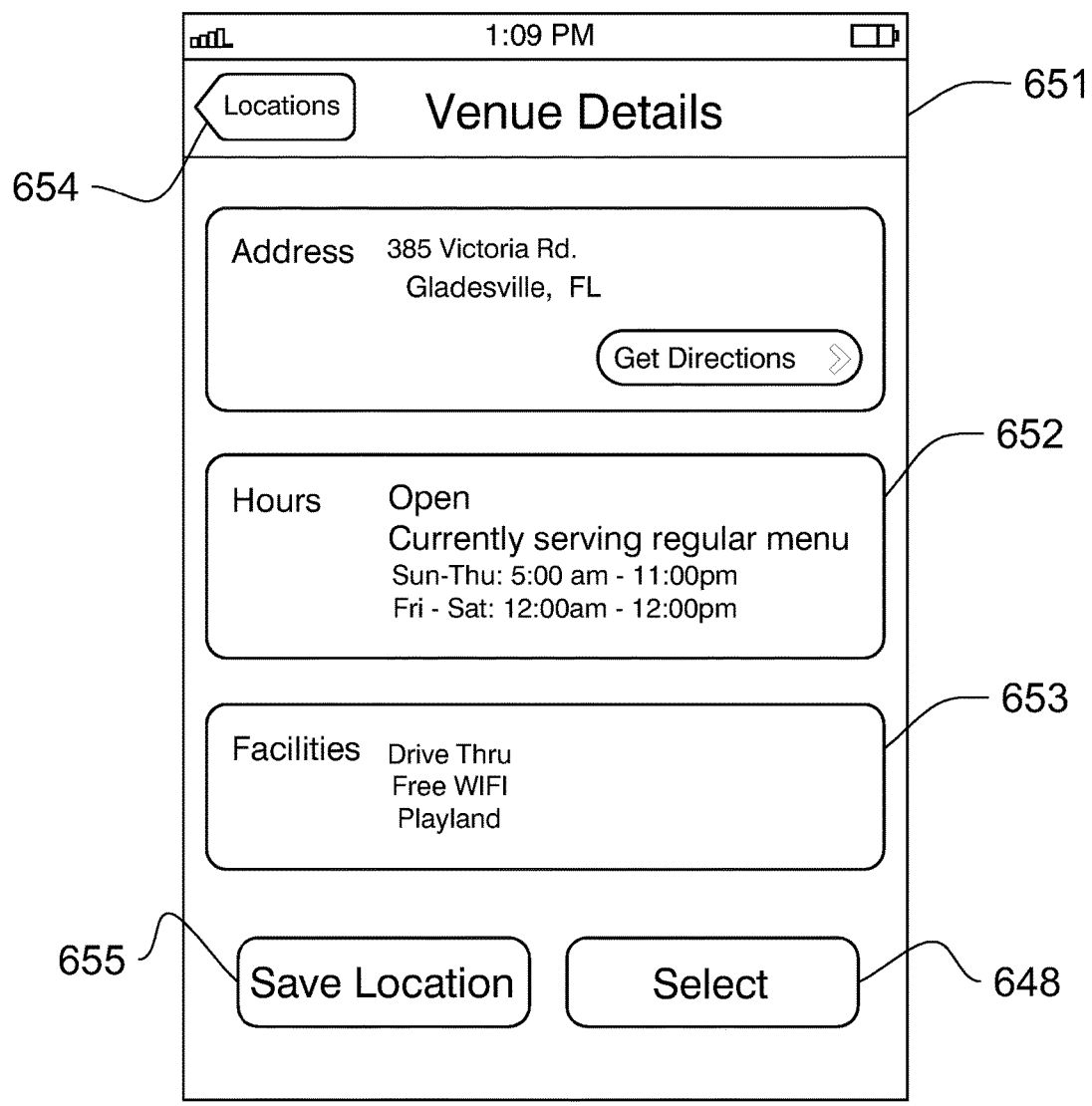
FIG. 14 illustrates an example of a venue details screen used by the order management system in accordance with a particular embodiment.

To the right of each identified location on venue selection screen 641 is a "more info" button 647. Selection of this button causes the OMS application component 318 to display a "venue details" screen 651, such as that shown in FIG. 14. This screen provides specific details about the particular venue selected, such as, for example, the hours of operation 652 and the facilities available at that venue 653. From here, the user may either return to the venue selection screen by selecting icon 654, choose this venue to order from by selecting icon 648, or choose to store this venue as a "favorite" venue in their user account on the OMS server 110 by selecting icon 655. A user may alternatively select a venue presented on the original venue selection screen 641 by pressing icon 648 without going to store details screen 651, if desired.

Returning to the order setup flowchart of FIG. 9, the OMS server 110 receives the venue selection at step 920. At step 925, depending on the system embodiment and administrative selections as described above, the OMS server 110 may contact the venue server 120 associated with the selected venue to receive the current venue specific menu data. At step 930, the OMS server 110 then transmits the venue specific menu data to the mobile user device 140. In certain embodiments, the OMS server 110 may submit prior venue specific menu data it has on hand for that venue without making a call to the venue server 120 (skipping step 925), or venue specific menu data on the mobile device 140 from a prior order from that venue may be used (skipping steps 925 and 930). Note that the latter case facilitates order setup using the application component 318 without an internet connection available. In any event, the OMS application component 318 on the mobile user device 140 will use the most current available menu data for the selected venue to generate various order screens at step 935.

FIGS. 15-20 show examples of various order screens. Step 940 of FIG. 9 involves a user making selections from these screens, namely, selecting menu items to be ordered, a payment method and a receipt method. It will be understood that the arrangement of the order screens depicted in FIGS. 15-20 is purely exemplary, and that they may be set up in a variety of ways without departing from the scope of the present invention. Furthermore, while the order screens are set up in an hierarchical fashion, that need not be the case. Order screens could be presented in an ordinal fashion, menu items could be listed all on a single screen simultaneously, and could be depicted textually or graphically, etc. For example, the order screens and arrangement used to arrive at an order could, in some regards, resemble those disclosed in U.S. Patent Publication Nos. 2009/0265247 and 2011/0258058, the contents of which are herein incorporated by reference. It will also be understood that all user interactions with the order screens described below result in inputs and outputs of the OMS application component 318 on the mobile user device 140. Typically, these interactions do not require a call to, or any processing by, the OMS server 110. Rather, the component of the OMS application 318 resident on the user device 140 is sufficient to interact with the user to develop the order.

Figure 15:
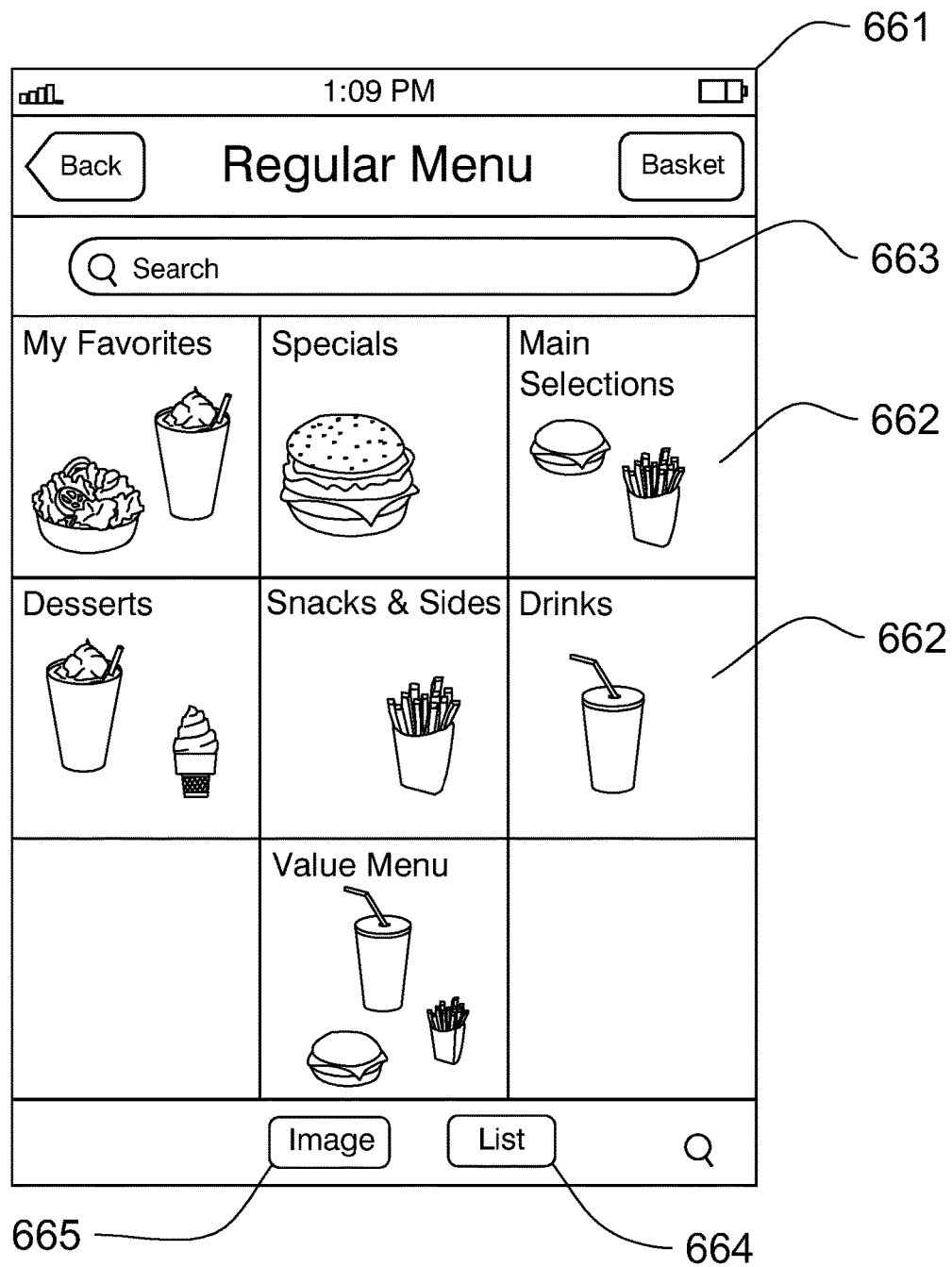
FIG. 15 illustrates an example of a main menu screen used by the order management system in accordance with a particular embodiment.

FIG. 15 shows a regular menu screen 661 featuring a variety of different menu category icons 662. Here, the user may either select a category icon 662, or may type in the name of a desired product in the search field 663. Conducting a search leads to a search results screen (not shown) that lists any products on the venue specific menu identified by the OMS application component 318 as having the characteristics of the search. Notably, if the user is searching for a product that is not available on the venue specific menu from the particular venue they have selected, the product will not be provided as an option for selection. Selecting a product from the search results list causes the OMS application component 318 to load a product detail screen 681, such as that shown in FIG. 17. Alternatively, the user may opt to simply list all menu items available on the venue specific menu textually or graphically by selecting either list icon 664 or image icon 665, respectively.

Figure 16:
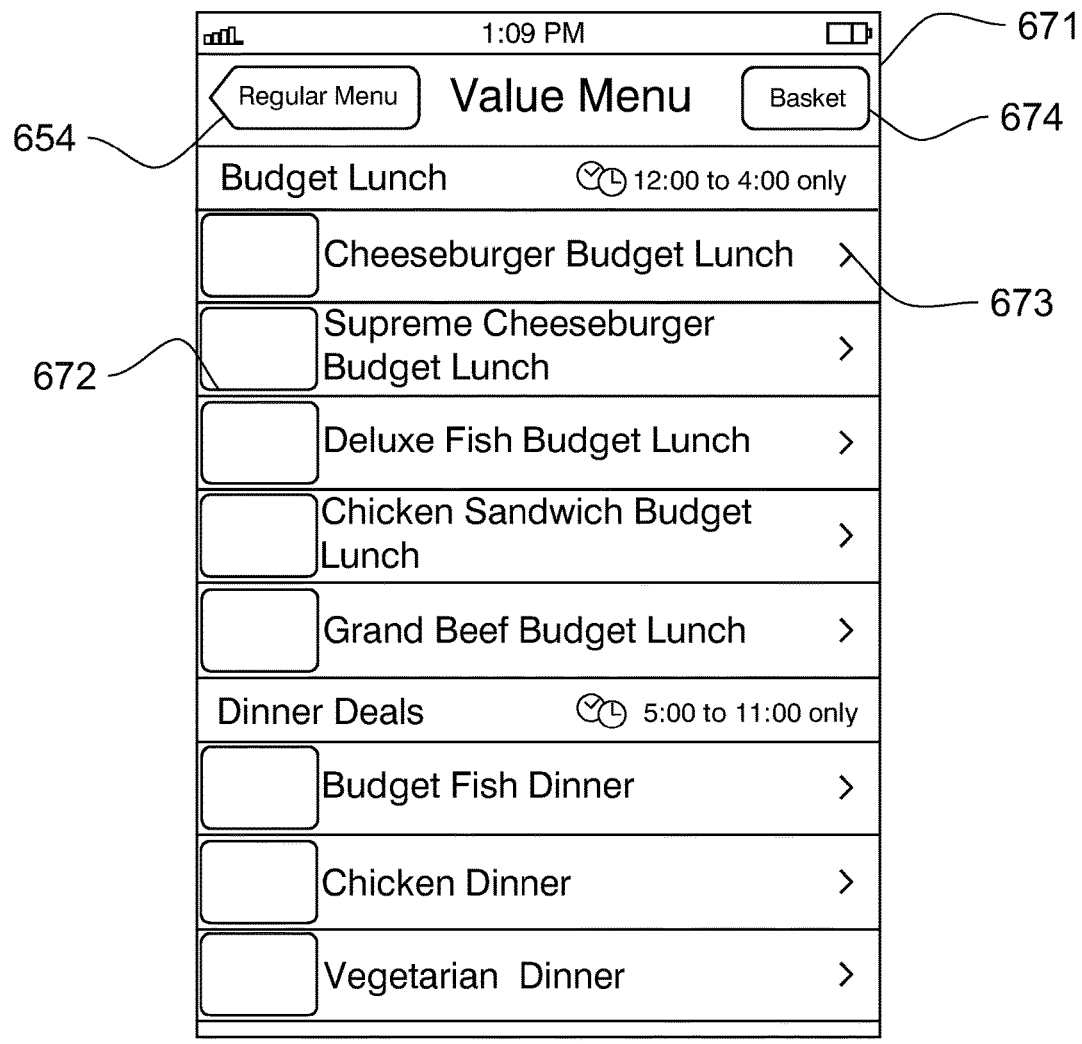
FIG. 16 illustrates an example of a sub-menu screen used by the order management system in accordance with a particular embodiment.

If the user selects a category icon 662 from the regular menu screen 661, the OMS application component will generate a category specific menu screen 671, such as that shown in FIG. 16. In this case, the user has selected the "Value Menu" from FIG. 15, and is now viewing the category specific menu screen 671 associated with the value menu. From here there are options to return to the regular menu using return icon 654, to select one or more specific products using selection icons 672, to learn more about a specific product by proceeding to that product's detail screen 681 by selecting the arrow 673, or to view the order basket by pressing the basket icon 674. In this case, the value menu is divided into lunch items and dinner items, and it is noted that the items are only available during certain windows of time.

In some embodiments, though all of these menu items may be listed on the venue specific menu, the ones not presently being offered may be grayed out or ineligible for selection. However, it is more important that the items be available at the time of receipt, which is typically later than the time of order. Thus, if it is 4 PM and someone wants to order the Budget Fish Dinner, it is preferable to allow them to do so because they may intend to receive the order after 5 PM when that item becomes available. Note that in some embodiments, a user can specify the time at which they intend to receive the order. In that case, the OMS system 100 will cause to be displayed the menu that the selected venue will be offering at that time.

Figure 17:
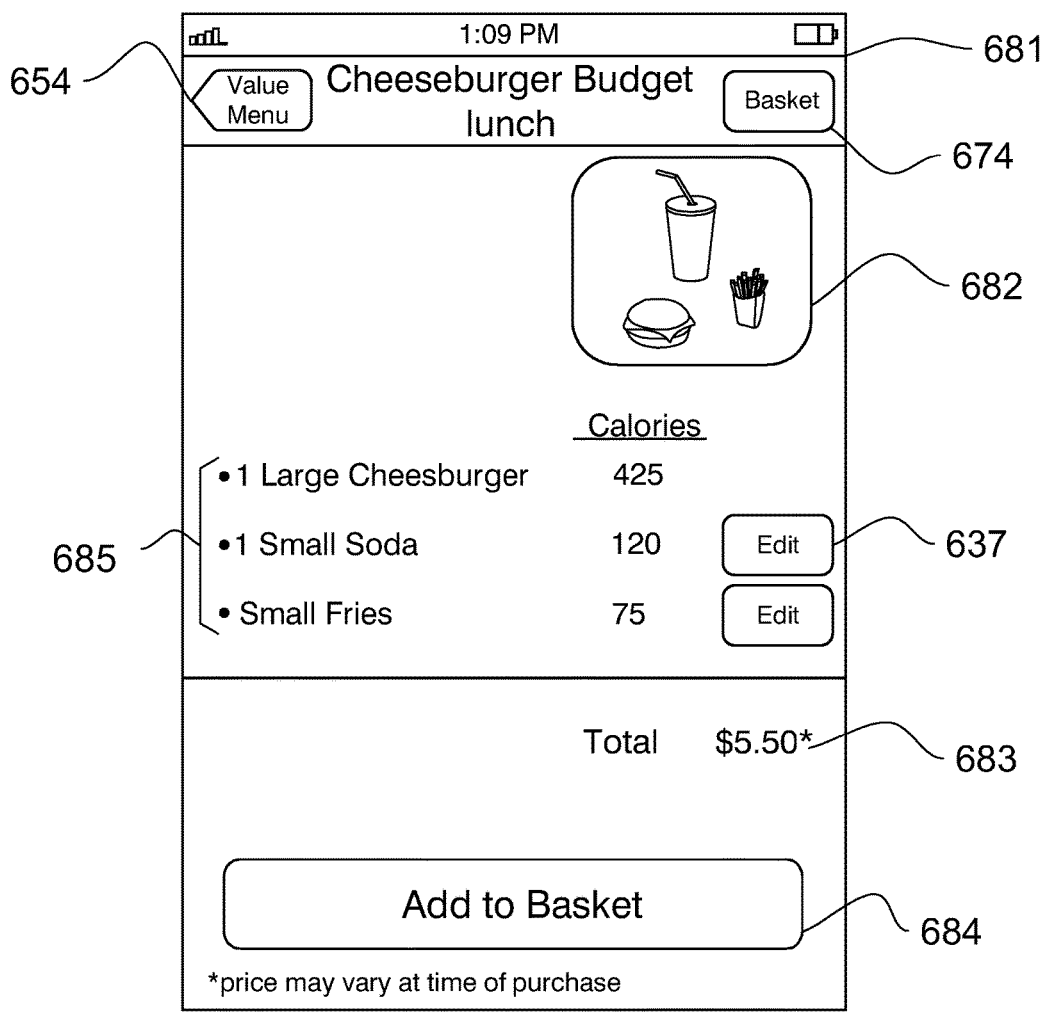
FIG. 17 illustrates an example of an item description screen used by the order management system in accordance with a particular embodiment.

FIG. 17 illustrates a product detail screen 681 for the "cheeseburger budget lunch." Though there are other ways to arrive at this screen, one method would be by selecting the arrow 673 to the right of this product item on FIG. 16. The product detail screen 681 may include a product image 682, a product description 685, a price 683, and an "add to basket" icon 684. The product description may include various data about the product and, where applicable, may allow a user to edit certain variables relating to the product such as size, color, etc. In this example, where the product is actually a meal comprising several products, there is an opportunity to edit the size of the soda and fries that are associated with the cheeseburger budget lunch. Were a user to select edit icon 637 and change the soda from a small to a large, there would likely be an associated change in the calories and total price of the product (meal).

From this screen, a user may return to the value meal by selecting return icon 654, view a list of the items already selected for purchase by pressing basket icon 674, or add the product shown on the screen 681 to their basket by selecting the "add to basket" icon 684. In some embodiments, there may be an option to see additional details, such as nutritional or preparation details about the product, by selecting an "additional details" icon that would load an incremental screen (not shown). In addition, a screen could be added that would allow a user to specify particular modifications or preparation instructions, such as, for example, particular condiments to be used on a sandwich, and how long it should be cooked or at what temperature, etc.

Figure 18:
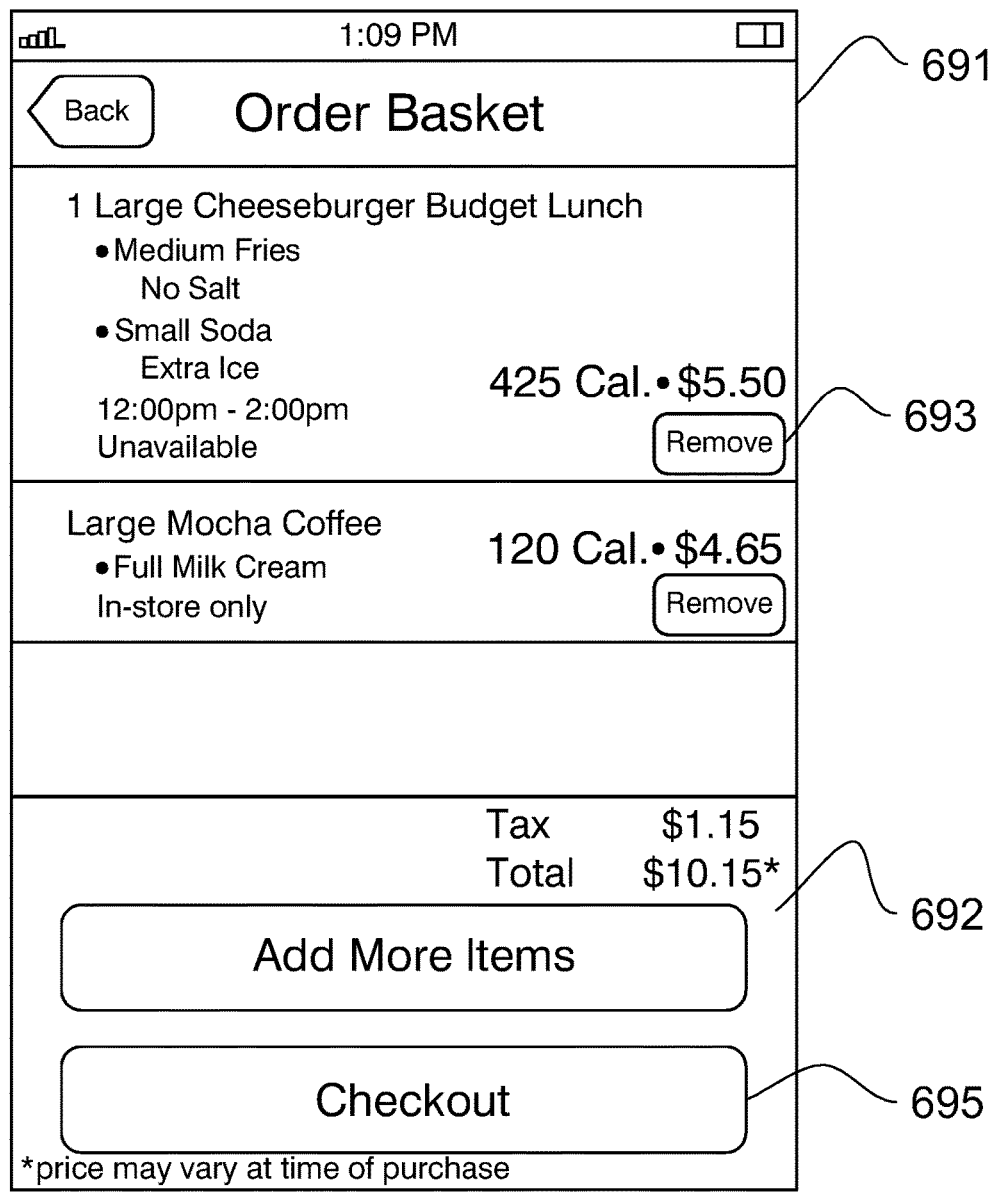
FIG. 18 illustrates an example of an order basket screen used by the order management system in accordance with a particular embodiment.

From nearly any screen displayed by the OMS application 318 on the mobile user device 140, a user can proceed to their order basket screen 691, such as that shown in FIG. 18. In the embodiment depicted, the order basket screen 691 provides a listing of all items selected for the order, together with the quantities of those items selected, the calories in those items, and the price of those items. The prices are summed into a total price 692. In this case, there is a warning indicating that the total price may vary at the time of purchase. In the illustrated embodiment, the "time of purchase" is the "second time" discussed above, namely, the time at which the user arrives at the venue and checks in their order. This warning is helpful because the pricing may change by the time the user finally checks the order in at the selected venue. In other cases, the OMS application 318 may be operating off of a stored version of the venue specific menu that does not reflect the current pricing at the venue. This issue of changing prices is less likely in embodiments where a "pull" of menu data from the venue server 120 by the OMS server 110 is required at the time of order setup. This capability of obtaining the real-time pricing is an advantage of the system over the prior art. From the order basket screen 691, a user may choose to remove an item from the basket by selecting a remove icon 693, to add more items by choosing the "add more items" icon 694, or to accept the selections by selecting checkout icon 695.

Figure 19:
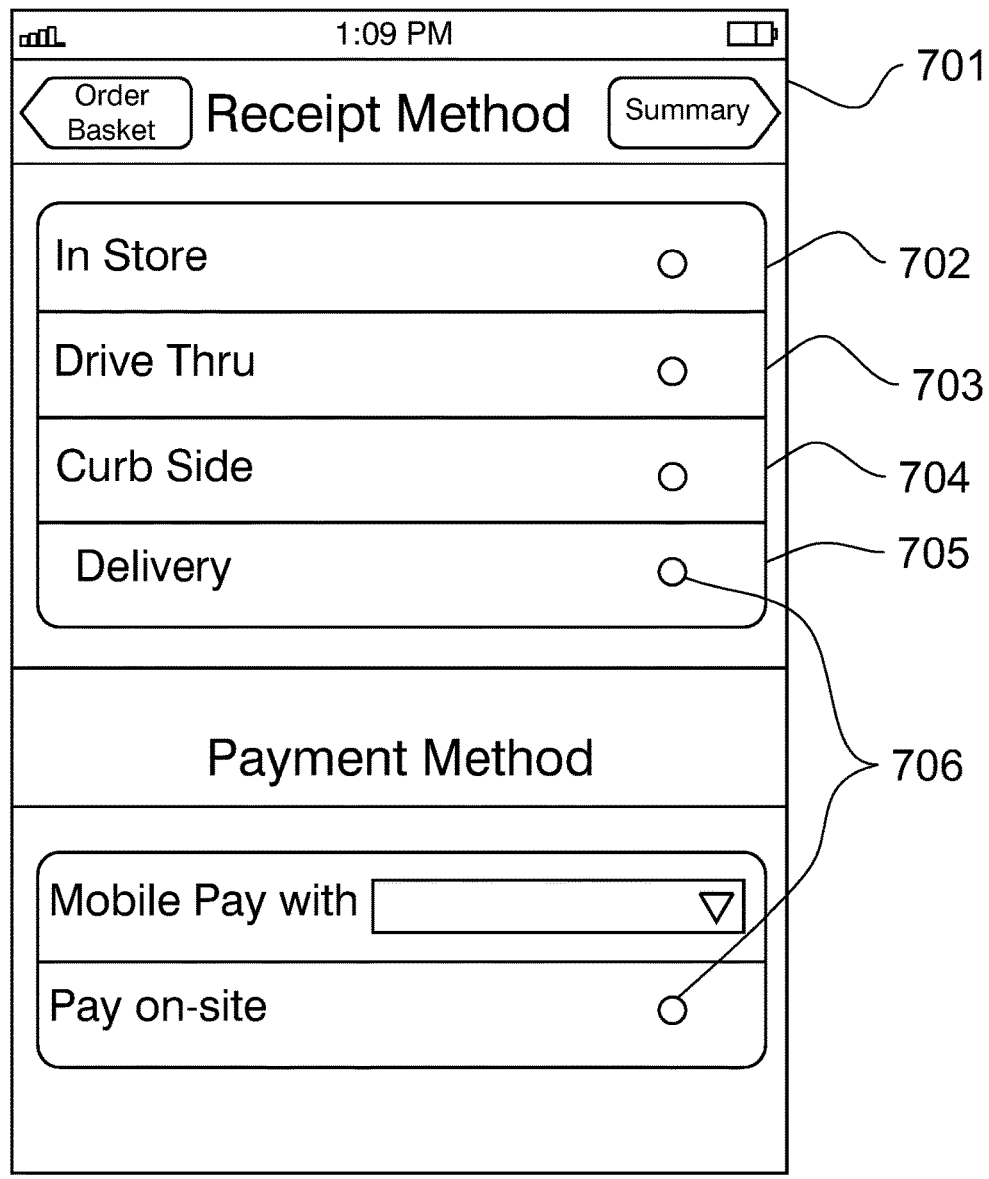
FIG. 19 illustrates an example of a receipt method screen used by the order management system in accordance with a particular embodiment.

Upon selecting checkout icon 695, the user proceeds to a receipt and payment method setup screen 701, such as that shown in FIG. 19. These screens may be separate in some embodiments, but are combined as shown here. Recall that payment method and receipt method, along with venue location and menu items, are the four primary order components required to submit an order to the OMS server 110.

As used in this description, the term "receipt method" simply means the method of how the user will receive the products ordered. It does not suggest that, or reflect upon whether, the user will go to the products, or whether the products will come (e.g., such as via delivery) to the user. In the illustrated embodiment, the receipt methods offered are (1) in store, (2) drive thru, (3) curb side, and (4) delivery. Which options will actually be available may depend on various factors such as, but not limited to, the venue selection. This is one example of why it is preferred that the venue selection be made first among the four primary order components. In the quick service restaurant model used as an example in this description, "in store" would indicate a customer pick-up at the checkout counter, "drive-thru" would be handed out via a drive-thru lane, "curb side" would, as will be seen, allow for a user to park at the venue and receive their order without proceeding through a drive thru lane, and "delivery" would involve restaurant personnel or a third party vendor bringing the order to a designated location. In the event that a user selects delivery icon 705, they would be prompted to designate such a location (not shown), which would then be validated by the system to ensure that delivery is available to that location. Selection of the "in store" icon 702 would typically require the user to then designate whether they will be dining in or taking the order to go, though this option can be changed at the time of order check in.

While other payment methods might be available in other embodiments, here the options are to pay on site or to elect a mobile pay option using dropdown box 707. In some embodiments, selecting a mobile pay option is required to use the OMS 100. The options in the dropdown box 707 will depend on the payment methods the user has setup in the OMS 100 (see, e.g., FIG. 7 and the associated description above). Once a receipt method and payment method are selected, the associated selection buttons 706 associated with those methods will be highlighted and the user will be able to proceed to the summary screen 711 by pressing the summary icon 708.

Figure 20:
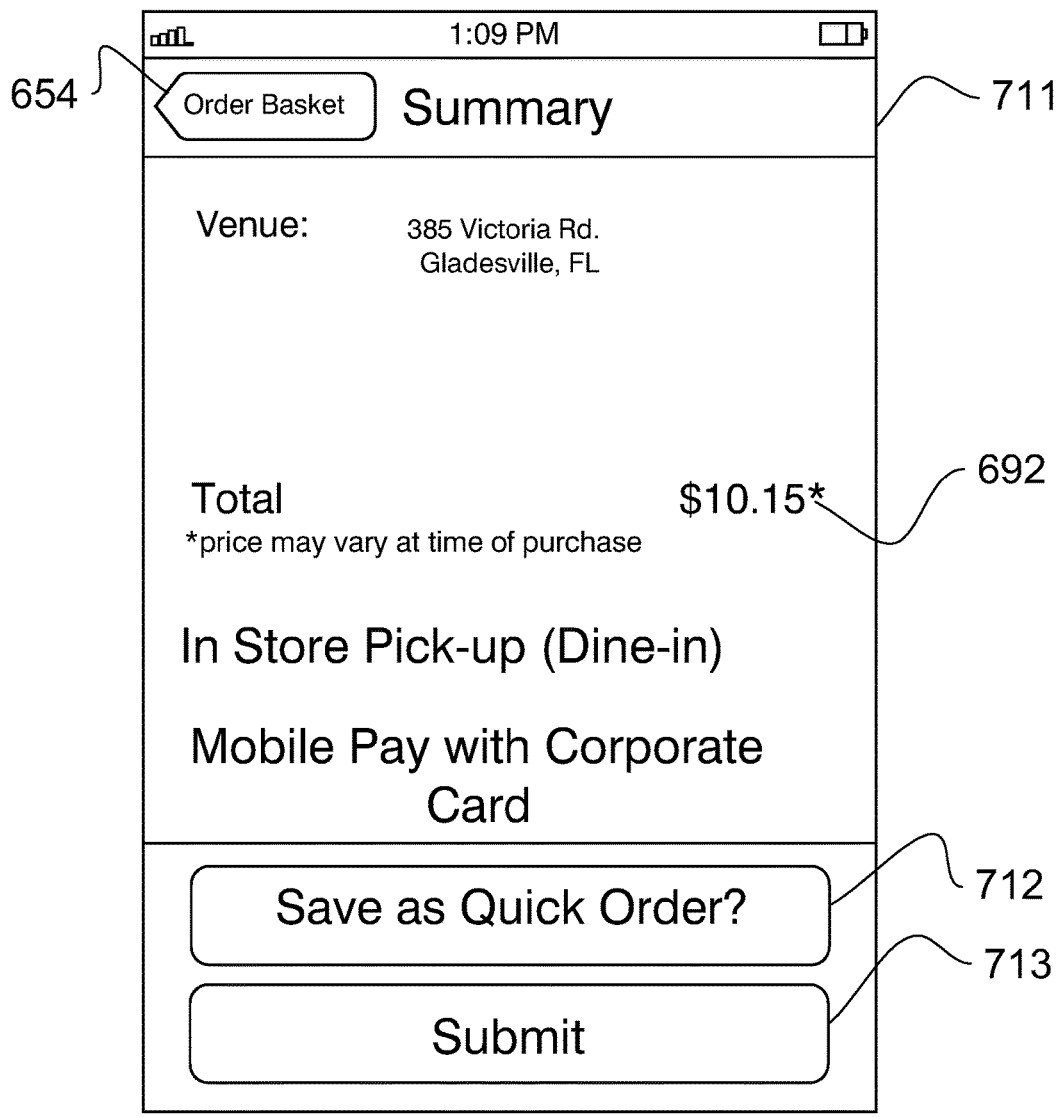
FIG. 20 illustrates an example of an order summary screen used by the order management system in accordance with a particular embodiment.

The summary screen 711 is typically the final screen prior to submission of the order to the OMS server 110. An example summary screen 711 is shown in FIG. 20. The summary screen 711 will typically show the four primary components of the order, and what has been selected for each. However, due to spatial constraints, the only aspect of the menu items component is the total price 692. In this case, the user has selected to place an order with a venue located in Gladesville, Fla. for an estimated price of $10.15 to be picked up at the counter for dine in, and paid for via a card designated by the user on the OMS 100 as "corporate card." Notably, while these are the order components to be submitted, the user is not locked in to any of them. Also, at least the receipt method selection is not required in order to submit an order in certain embodiments. The OMS 100 works most smoothly (both on the back-end for the organization and on the front end for the user/consumer) when no changes are made. However, as will be seen, changes may be made at the time of check-in. Changes to some order components are more disruptive than others. For example, if the user checks in at the drive thru of the designated venue instead of inside the store, a backend correction can quickly be made before the order is released for preparation. Alternatively, if the user shows up at a completely different venue, the OMS 100 is more likely to have to prompt the user for changes or updates to the order that eliminate some of the efficiencies behind use of the system.

Upon reviewing the order components of the summary screen 711, a user may return to the order basket by selecting the return icon 654, save the order as a new Quick Order by selecting icon 712, or submit the order to the OMS 100 by selecting submit icon 713. Returning to the flowchart of FIG. 9, selection of the submit icon 713 equates to step 970. The OMS then stores the order as the Current Order for the user in the user account at step 980. Again, in the illustrated embodiment, a user may have only one Current Order, defined as the order most recently submitted to the OMS Server 110 by a particular user that has not been checked in. Thus, if there is already a Current Order stored in the system for the user that has not been checked in, the order setup process begins with that Current Order (e.g., the items left in the basket, but not checked out). In some embodiments, the OMS component application 318 will store an "in-process" order even if it was never submitted, such that the system will pick up where it left off in the order setup process. Note again that no charges are applied to the user's payment method at the time or order submission, and the venue is still not aware of the order. The order is "on hold" until the user arrives at the venue.

Figure 21:
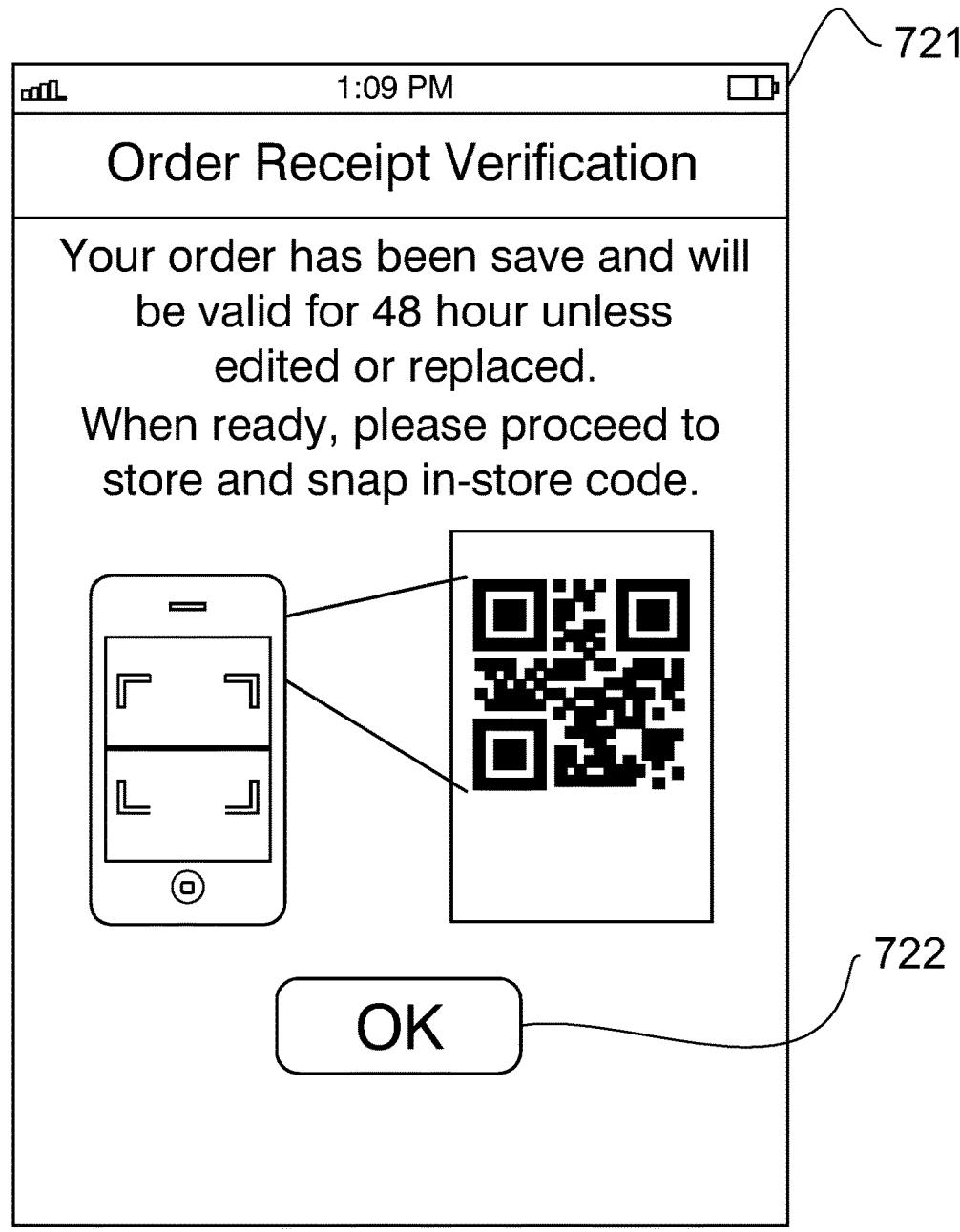
FIG. 21 illustrates an example of an order check-in screen used by the order management system in accordance with a particular embodiment.

Though not listed as a step in FIG. 9, in some embodiments, the OMS server 110 may send receipt verification data back to the mobile user device 140 acknowledging receipt of a new Current Order. This may be communicated to the user by the OMS application component 318 through an order receipt verification screen 721, such as that shown in FIG. 21. This screen provides the user with instructions on checking in the order, and (though not on the screen of FIG. 21) may also remind the user that they have not actually been charged yet. Rather, the user's order is "on hold," and will be so until it is checked in. In some embodiments, the receipt verification screen may also provide a timeline for which the current order will be valid. In the example shown in FIG. 21, current orders are only maintained for 48 hours. Thus, if the order is not checked in within that timeframe, it will be automatically deleted from the user's account on the OMS server 110. The receipt verification screen 721 is asking the user to acknowledge this instruction by selecting the OK prompt 722. Selection of this prompt would typically close the OMS application component 318 until re-launched by the user upon arrival at the venue.

Figure 10A:
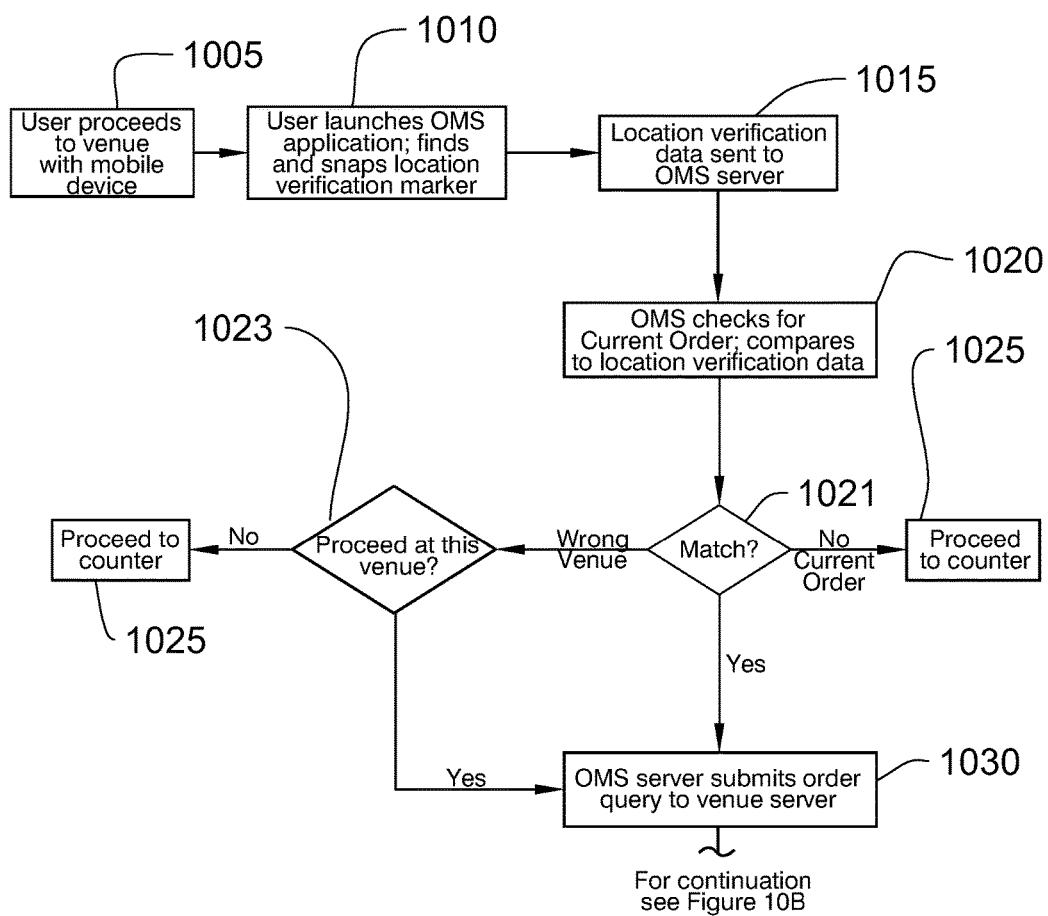
FIG. 10A is the first portion of a two-part flow chart illustrating an embodiment of a process for checking in and receiving an order in accordance with the invention.
Figure 10B:
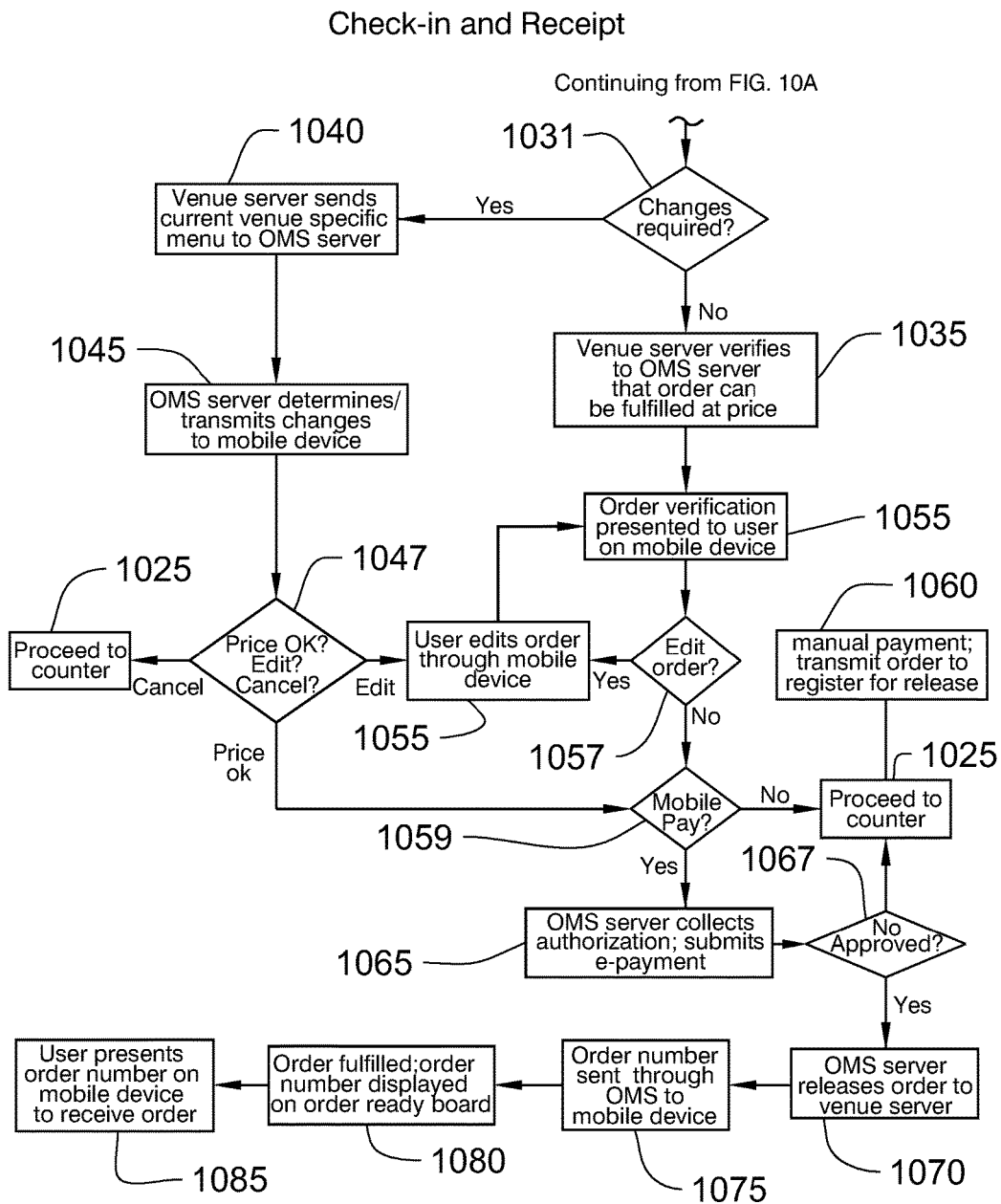
FIG. 10B is the second portion of a two-part flow chart illustrating an embodiment of a process for checking in and receiving an order in accordance with the invention.

FIGS. 10A and 10B provide a flow chart illustrating an embodiment of the process for checking in and receiving an order in accordance with the present invention. As discussed above, this is the second of the two "sub-processes" in the OMS order process. Once a user has completed the order generation and submission component of the process discussed in association with FIG. 9, the user begins the process flow of FIG. 10A at step 1005 by proceeding to the selected venue with their mobile user device 140 (unless the user is already there). While this may be nearly immediate (such as if a user generates and submits an OMS order while standing inside the venue), it need not be. In fact, the OMS 100 is designed under the assumption that the order and submission will take place at a first time, and that the steps in FIGS. 10A and 10B will take place at a later time, and in a different location.

Figure 22:
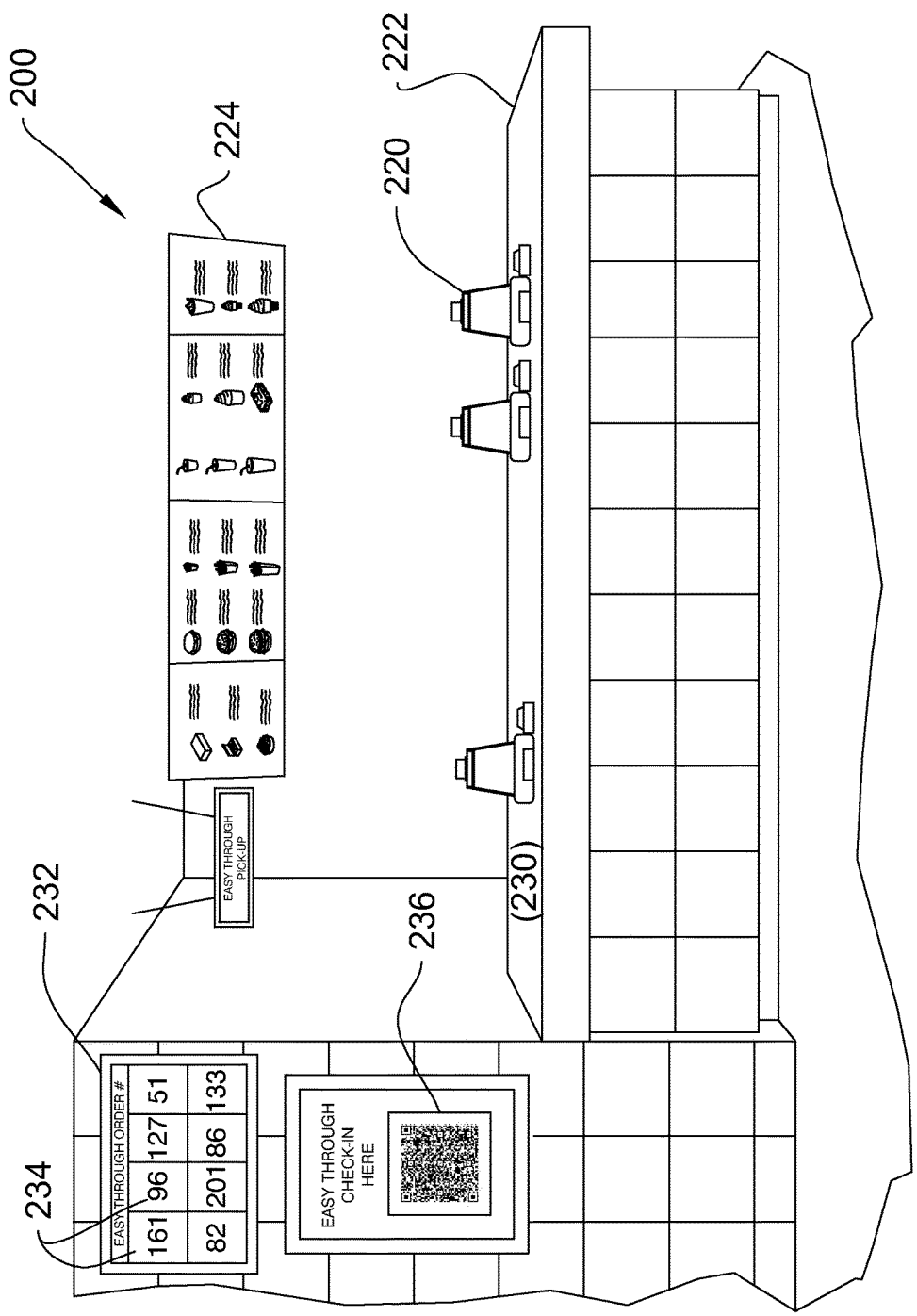
FIG. 22 depicts the layout of an order pick-up counter inside a restaurant venue according to a particular embodiment.

For explanation purposes, FIG. 22 is an illustration of the inside of a potential venue. Specifically, FIG. 22 illustrates a traditional pick-up counter 222 at a quick service restaurant 200. The counter features three point of sale (POS) registers 220, and a traditional menu board 224 behind the counter. There is also an order ready board 232 showing order numbers that are ready for pickup. However, this restaurant is non-traditional in that it offers an OMS pickup location 230 and a location verification marker 236. In the illustrated embodiment, the location verification marker 236 comprises a QR Code that uniquely identifies the venue at which it is located. The code may also uniquely identify a location at the venue, e.g., curb-side, drive-thru, or at the pickup counter, etc. This is preferably done passively, without any hardware or battery required.

For example, the location verification marker 236 could simply be a poster hanging on the wall. In fact, because the location verification marker need only be a passive, lasting image, a venue might have several identical or nearly identical markers, such as, for example, one in a dive thru lane, one in the store, and even several at curbside locations in the parking lot. Thus, in such an embodiment, there is no requirement to place any unique hardware at the venue location. This provides advantages over prior systems that required things such as the device reader of Pentel, or the bar code scanner of the previously discussed Carroll application. Notably, the location verification marker 236 is not limited to displaying a QR code, but rather could display any location-identifying indicia.

At step 1010 of FIG. 10A, the user has arrived at the venue and launches the OMS application component 318 on the user's mobile device 140. The user then proceeds to the appropriate location verification marker 236 which, as discussed above, could be in the drive thru lane, at a curbside location, or inside the store, depending on the embodiment. In the case of delivery, available in some embodiments, the location verification marker 236 could be at an off-site location acceptable to the venue, at which the user will take receipt of the order via delivery from the venue. In alternative embodiments, as explained below, the check in process for delivery does not necessarily utilize a location verification marker.

Upon launching the OMS application component 318, the user will be prompted to sign in with the OMS server 110, as previously discussed. Though, in some embodiments, certain functions such as menu review and setup can be performed after declining to sign in, sign is required to check-in a Current Order. Once signed in, the user will arrive at the welcome screen 621, where they can select the check in order icon 624 (see FIG. 11). This action will cause the OMS application component 318 to display the snap store code screen 731, such as that shown in FIG. 23.

Figure 23:
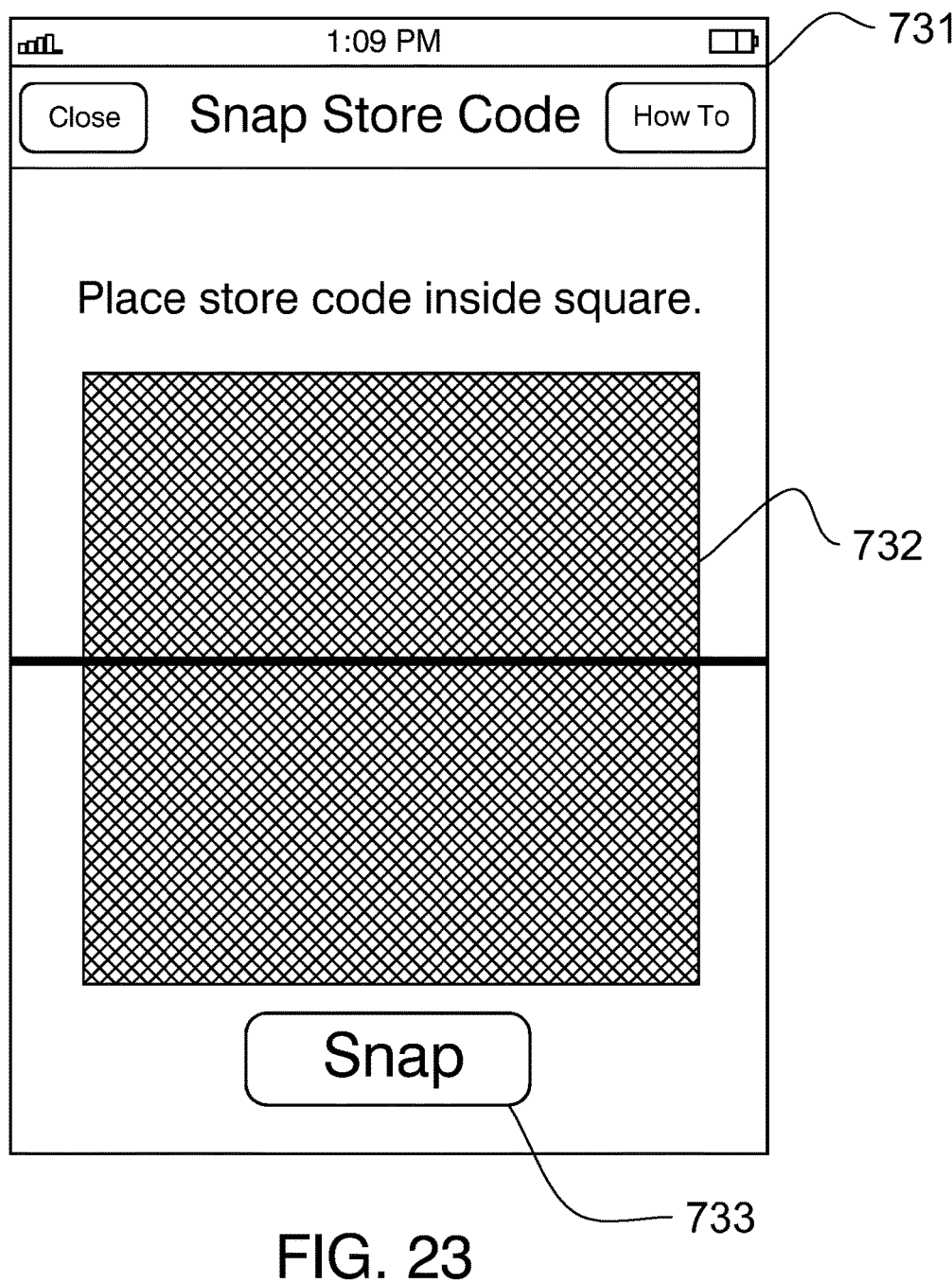
FIG. 23 illustrates an example of a screen for use in capturing a location verification marker used by the order management system in accordance with a particular embodiment.

FIG. 23 illustrates a screen having a central window or view field 732. The user must aim the mobile user device 140 in a fashion such that the location verification marker 236 appears in the view field, and then press the snap icon 733. This causes the OMS application component 318 to capture an image of the location verification marker 236, which is then, at step 1015 of FIG. 10A, transmitted via wireless network communication application 324 of the mobile device 140 to the remote OMS server 110.

Essentially, by taking this action, the mobile user device 140 is capturing location verification data from the location verification marker 236 that can be used to identify to the OMS server 110 that the user is, in fact, at the venue and ready to receive the Current Order. While there are other ways to do this based on the particular capabilities of the mobile user device 140, it is becoming a common feature for personally owned mobile devices to come equipped with a camera or lens feature. Given that the device 140 will be capable of downloading and installing the OMS application component 318, it should similarly be capable of downloading and installing a commonly available QR Code reader application, such as, for example, QR Droid from DroidLA. Thus, it is not significant whether the verification data reader application 320 is a sub-component of the OMS application 318, or if it is a stand-alone application that can be called and used in association with the OMS 100. What is important is that the mobile device 140 be capable of capturing location verification data and submitting it to the OMS server 110, as proscribed in step 1015 of FIG. 10A.

At step 1020, the OMS server 110 reviews the location verification data received from the mobile user device 140. Because the user has already signed in, the OMS server 110 can check for and access the user's Current Order from the user's account. If there is no Current Order stored in the user's account, the check-in process fails. A user must have created and submitted an order for that order to be checked in. Thus, decision step 1021 of FIG. 10A accounts for this. If there is no Current Order (or some other critical OMS data failure), the OMS server 110 returns an irreconcilable error to the mobile user device 140, causing the OMS application component 318 to generate a message directing the user, at step 1025, to proceed to the counter and place their order in the traditional manner, or to set up and submit a new mobile order on the spot.

Provided that there is a Current Order for the user in the user's account on the OMS server 110 (or its associated database), the OMS server 110 reviews the Current Order to determine if the venue selected in that order matches the venue identified by the verification location data received from the mobile user device 140. If the venue is correct, the process proceeds to step 1030. What happens if the locations do not match depends largely on the settings of the OMS 100. In some cases, the process will proceed anyway, albeit with a higher likelihood that the order will need to be edited. In other cases, the user may be instructed of the error and asked for some type of security verification information to ensure they are authorized and wish to proceed. In the case of FIG. 10B, if the locations do not match, the OMS server 110 identifies the location mismatch to the user and, at decision point 1023, queries the user whether they want to have the order fulfilled at the current location. If the user declines, the system defaults to recommending, through the mobile user device 140, that the user proceed to the counter (step 1025) and place an order manually. What becomes of the Current Order in such a scenario would again be up to the specific programming of the embodiment. Because it has not been fulfilled, the Current Order would likely remain in place unless the user requests that it be deleted. Assuming the user agrees, at decision point 1023, to have the order fulfilled at this different venue, the process proceeds back on track to step 1030.

At step 1030, the OMS server 110 submits an order query to the venue server 120. This is the first time in the OMS process that the venue server 120 (or any venue-specific component) has seen the items being requested by the user. The venue server 120 reviews the order and verifies whether it can be fulfilled at the quoted price at the present time. If no changes are required, and the order is acceptable as submitted (including total price), the venue server 120 transmits an order acceptance communication to the OMS server 130 at step 1035. However, the venue server 120 does nothing further with the order at this point. The order has not been released for fulfillment. If the venue server 120 determines that changes are required to the order, it responds to the OMS server 130 in the illustrated embodiment by transmitting the latest venue specific menu data at step 1040. This response requires minimal computation and takes processing load off of the venue server 120, which may not be equipped to handle large external processing loads and likely has primary responsibilities for managing and controlling other computer-based systems within the venue. Instead, at step 1045, the OMS server 110 performs the heavier processing to determine what elements of the Current Order need to change to conform with the current venue specific menu data, and transmits this information to the mobile user device 140. The OMS application component 318 then presents these required changes to the user and asks if the user would like to proceed.

Figure 24:
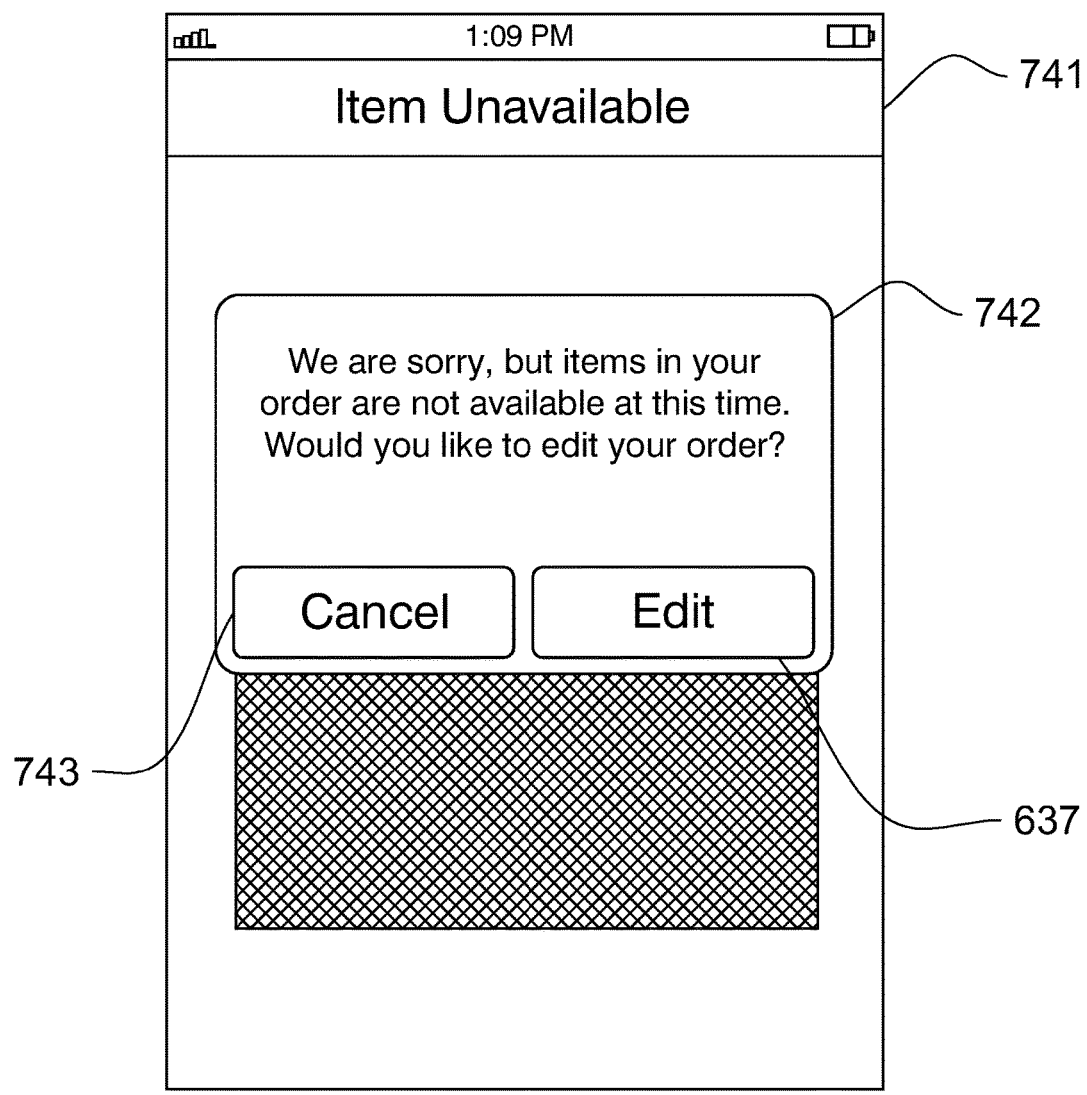
FIG. 24 illustrates an example of an item unavailable screen used by the order management system in accordance with a particular embodiment.

FIG. 24 provides an example of an "item unavailable" screen 741 that might be used by the OMS 100 to alert a user of the need for a change. In other cases, more detailed information might be provided. For example, if a restaurant is no longer offering a beverage ordered by the user, but all other menu items are available, this fact will be communicated to the user, perhaps along with recommended replacement beverages. While simplified, the item unavailable screen 741 presents essentially the same options to the user—they can edit the order or cancel. Message box 742 provides the user with an option to select cancel icon 743 to end the OMS process, or edit icon 637 to enter changes to the current order.

Though FIG. 24 would be presented at decision box 1047 in the flowchart of FIG. 10B, decision box 1047 also addresses the situation where all of the items are available, but at a different total price. Thus, there are three options for departing from decision box 1047. The user can cancel the OMS order (such as by selecting icon 743 of FIG. 24), edit the OMS order (such as by selecting icon 637 of FIG. 24), or, in the case where only price has changed, can agree to the new price. If the user is not interested in editing the order (whether due to the new price, or the unavailability of desired item(s)), the OMS 100 defaults to step 1025 and displays the "proceed to counter" screen discussed above (not shown). In this case, because the Current Order has been rejected by the user at its current price, or includes unavailable items, the OMS server 110 deletes the Current Order from the user's account.

If the user decides to edit the current order, the user will be presented with the present venue specific menu from which to select replacement items. Though not shown, this process would involve the user working through the same series of screens as those used to initially set up the order, such as, for example, the screens shown in FIGS. 15-18. At step 1050, the user selects updated menu items from the current venue specific menu and submits order data identifying those items via the mobile user device 140 to the OMS server 110. Because these items are all from the current venue specific menu, there is no need to check with the venue server 120 as to availability, so the process loops back on track to an order verification screen 751 at step 1055.

In cases where only the price has changed and the user is comfortable with the new price, the process may go to the order verification screen 751, or may bypass it. For example, the OMS application component 318 may present the user with the items being ordered when it presents the updated prices to query the user if the prices are acceptable at decision point 1047. This is essentially what the verification screen 751 does, and there is no point in showing the user this data again if they just approved it. Accordingly, as shown in FIG. 10B, the process may proceed directly to decision point 1059.

Figure 25:
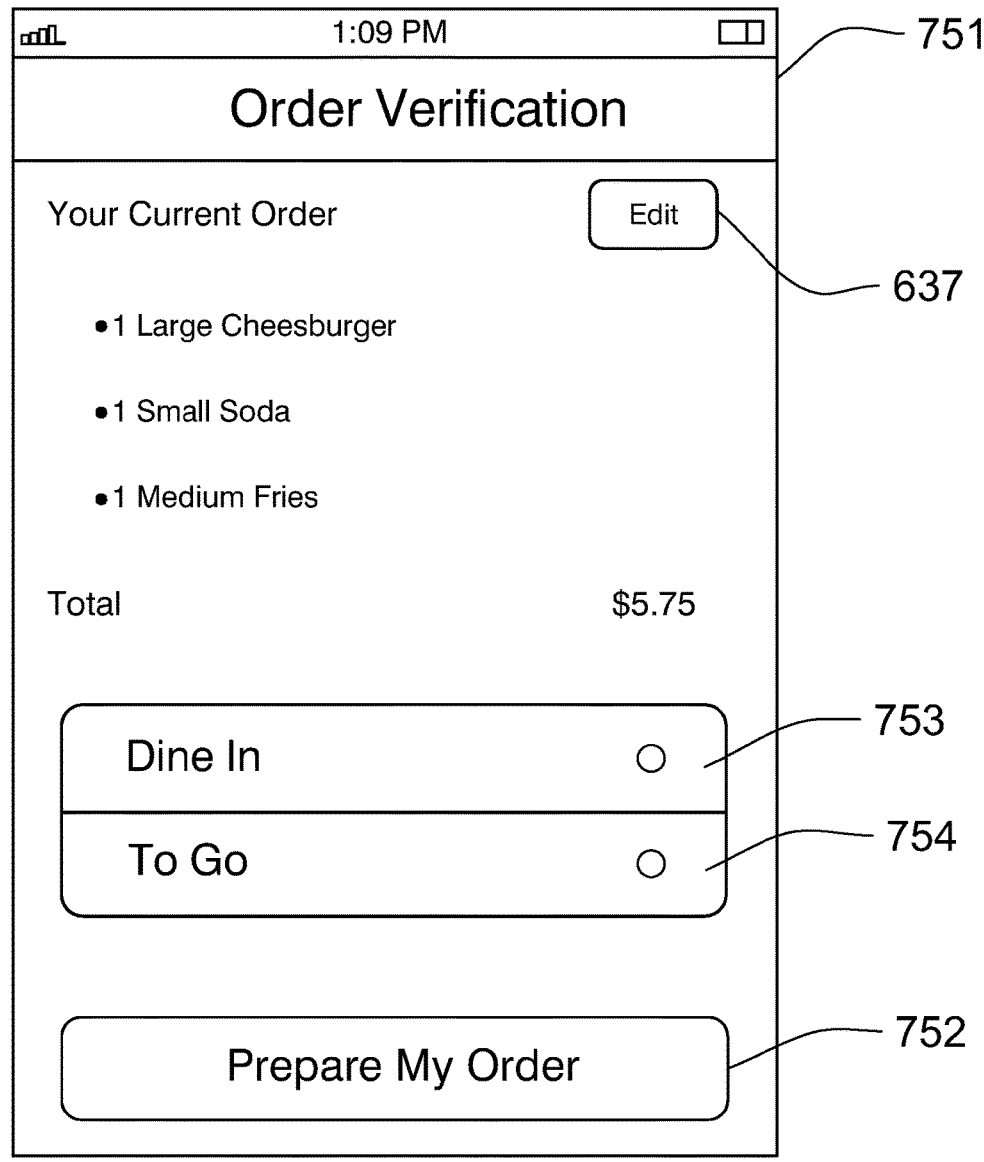
FIG. 25 illustrates an example of an order verification screen used by the order management system in accordance with a particular embodiment.

Reverting back to decision point 1031, if the venue server 120 approved the pricing and availability of the Current Order, this is communicated from the venue server 120 to the OMS server 110 at step 1035 and then, at step 1055, the OMS application component 318 on the mobile user device 140 presents an order verification screen 751 to the user. As discussed above, this screen may also be reached via a forced edit of the Current Order. The order verification screen 751, as exemplified in FIG. 25, shows the user the items ordered along with their current prices. Where the receipt method selected is "pickup at counter," there is also a dine in icon 753 and a to go icon 754. A selection of one of these options was already made during order setup so there is a default in place if no selection in made. It is offered again here because this is a decision that is likely to have changed. In embodiments that utilize different location verification markers 236 in different locations (e.g., curb-side, drive-thru, etc.) at the same venue, the system skips these options and schedules the order based on which marker 236 was scanned in and received. Because the order has not yet been released to the venue, making a change from "to go" to "dine in" at this point does not affect the venue fulfillment process.

From the order verification screen, the user may either select edit icon 637, or "prepare my order" icon 752. This decision corresponds to decision box 1057 on FIG. 10B. Depending on how the process arrived at decision box 1057, the OMS server 110 may have to retrieve the latest venue specific menu data from the venue server 120 at this point (e.g., if the venue server 120 validated the Current Order without change). The process then joins the edit order path at step 1050 and will continue to loop until the user is satisfied with the order. Choosing the "prepare my order" icon 752 on screen 751 allows the process to proceed.

If authorization is given to proceed, the OMS server 110 attempts to collect payment. Though payment could be collected after the order is released to the venue, it is preferred that payment be received and verified first. From here, if the Current Order specifies a payment method that is electronic (such as use of a pre-authorized debit card, etc.), the OMS server 110 may submit for payment against the payment method automatically. However, it is preferred that, as shown with decision step 1059 in FIG. 10B, one last query is made to the user as to whether to proceed with payment submission. This step may also include retrieving some type of pin or code from the user wherein the pin is needed to enable the financial transaction. For security reasons, such a pin would not be stored in the user's account on the OMS server 110.

Once the OMS server 110 collects the proper authorization at step 1065, it then submits the authorization for payment. Preferably, the OMS 100 will connect to an outside, pre-existing system to actually effect the financial transaction. If payment is approved and the transaction goes through at decision point 1067, the process continues. If the transaction request is refused, the OMS server 110 may try again, or prompt the user for a different form of electronic payment through the mobile user device 140. However, ultimately failures to collect in this manner will result in the "proceed to counter" screen (step 1025). Where the authorization is successful, but for less than the total amount due, the user will be prompted for an alternative method to pay for the balance. For example, if a selected stored value card only has five dollars remaining, that value is reduced to zero and the remaining order balance must be satisfied through other means.

Figure 26:
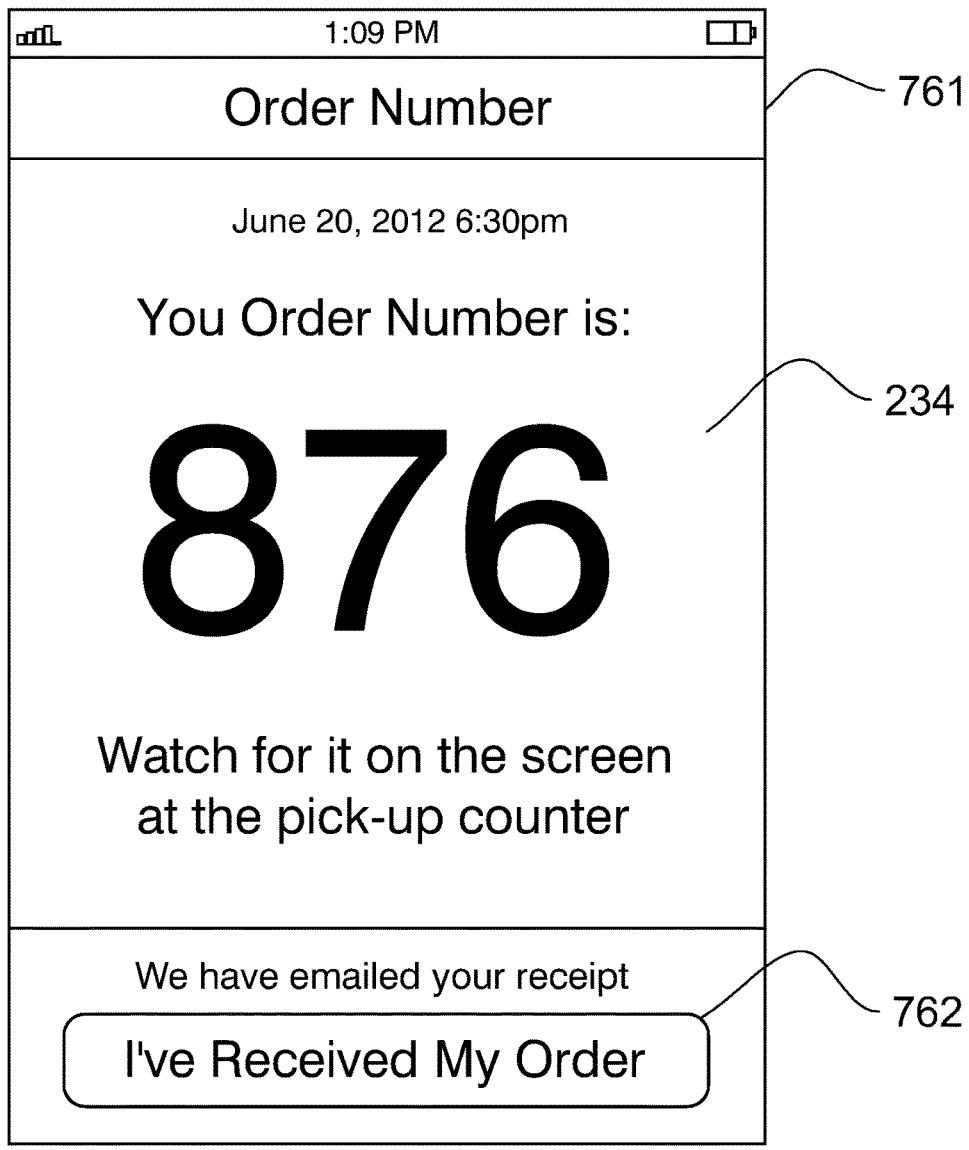
FIG. 26 illustrates an example of an order number delivery screen used by the order management system in accordance with a particular embodiment.

Once the proper amount is collected, the process continues to step 1070, where the OMS server 110 releases the order to the venue server 120 to fulfill the order. The order is now released into the processing queue along with all traditionally received orders, and an order number 234 is generated. At step 1075, the restaurant server 120 sends the order number 234 to the OMS server 110, which, in turn, forwards it to the mobile user device 140 where the OMS application component 318 causes it to be displayed, along with receipt instructions on an order number screen 761. An example of an order number screen 761 is provided in FIG. 26. There is also shown an indication that a payment receipt has been emailed to the user's email address. This action can be performed by the OMS server 110, which would receive an electronic version of the receipt from the venue server 120, or, alternatively, the OMS server 110 could generate the electronic receipt from the information it has about the current order. Thus, there is no need to create a paper receipt, which adds yet further to the efficiency of the OMS 100.

At step 1080, for orders to be received inside the venue, the order number 234 associated with that order is displayed on the order ready board 232 once the order is prepared by the venue personnel. Though labeled with "easy through" in FIG. 22, the order ready board 232 is not necessarily equipment that is unique to the OMS 100. Many venues may already have such a device to alert customers when orders placed through traditional means are ready for pickup. Thus, this is not necessarily incremental equipment that is required to implement the OMS 100. For that matter, the traditional method of venue personnel calling out an order number when ready could also be used. Finally, at step 1085, the user presents their mobile user device 140, with the order number screen 761 displaying the proper order number, to venue personnel at the OMS pickup location 230 to receive their order. If the order is to be received at curb-side or via the drive-thru, though no order ready board is used, the user still presents the order number screen 761 on the device 140 to verify payment.

Reverting back, there are several ways that the user can wind up paying via traditional methods. If the Current Order called for mobile payment, but the user has now changed their mind and declines the query at step 1059, or if payment at counter was selected as the payment method for the Current Order in the first place, OMS application component 318 will instruct the user to proceed to the counter at step 1025. This may also happen even if an electronic payment method was approved where the total dollar amount is above some amount at which a hand signature is required. However, this does not mean the process converts to a completely manual order entry. Though the user must pay the cashier by traditional means (or otherwise require venue personnel involvement to receive a signature, etc.), the order, which is fully setup in the mobile user device 140 and has already been verified as correct by the venue server 120, may then be received to the cash register/POS machine 220 and immediately released for fulfillment.

This option, available in certain embodiments, requires coupling the mobile user device 140 to the POS machine 220. Preferably, this is done wirelessly, such as by a local data transfer protocol (infrared, Bluetooth, etc.), so as to limit the need for physical hardware at the venues to accommodate the OMS 100. However, a hard-wired scanning device, reader, or docking station could also be used. This order transfer after manual payment is shown as step 1060 on FIG. 10B. Though not show, from this point the fulfillment and order receipt process would proceed much like as described above, except data would be transferred directly from mobile device 140 to POS 220 instead of through the OMS server 110.

In an alternative embodiment where it is desired to prevent direct communication between mobile user devices and venue specific hardware, the POS 220 could be enabled such that the cashier could initiate a signal from the POS that would travel through the venue server 120 to the OMS server 110 identifying that the user has paid, the order has been released for fulfillment, and that further communication between OMS server 110 and the mobile user device 140 may proceed (such as from step 1075 as discussed above). In this case, an order number 234 would also be transmitted along with the communication from POS 220 through the OMS server 110 to the mobile user device 140.

Figure 27:
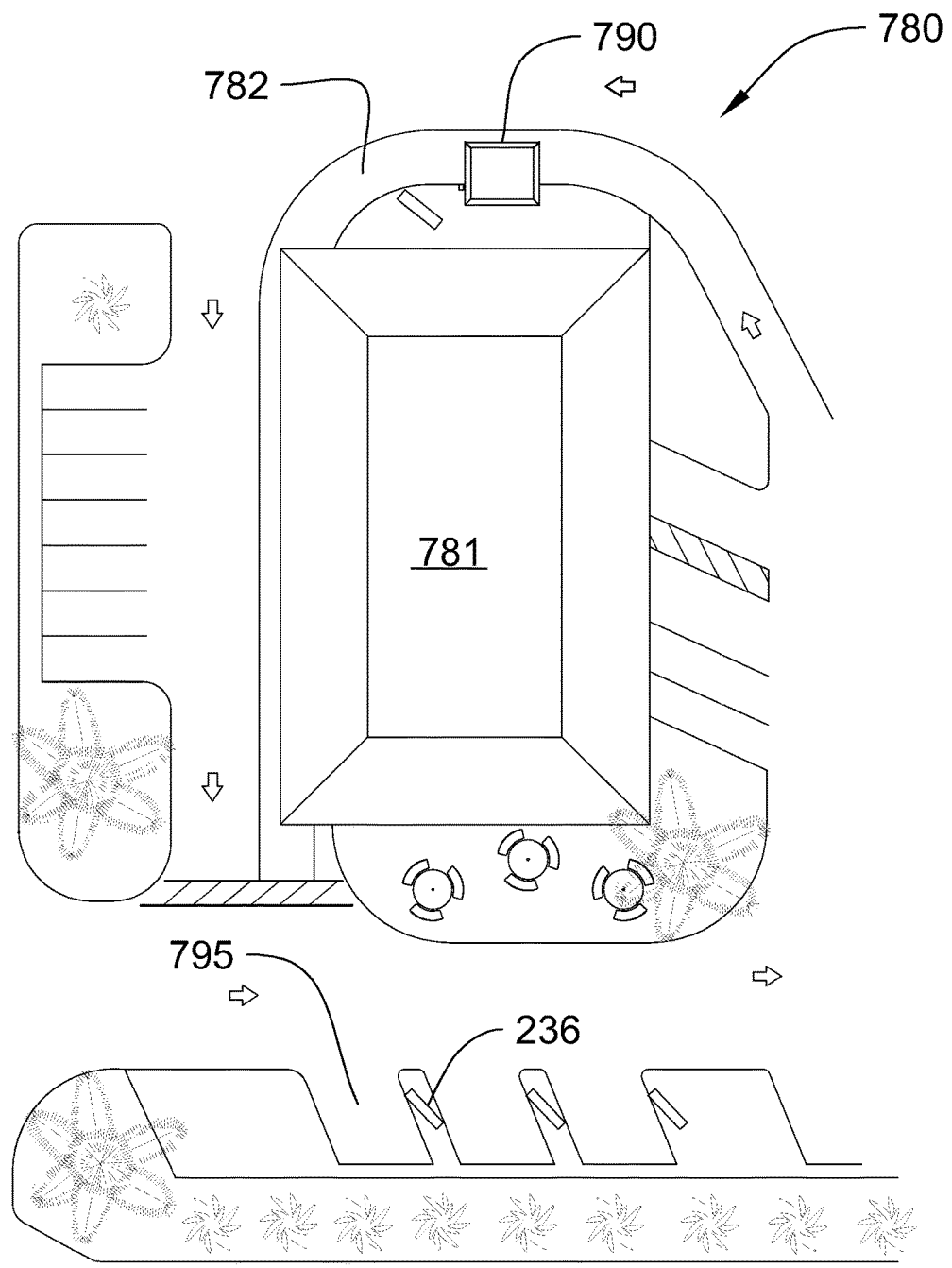
FIG. 27 depicts the layout of the exterior of a restaurant venue according to a particular embodiment.
Figure 28:
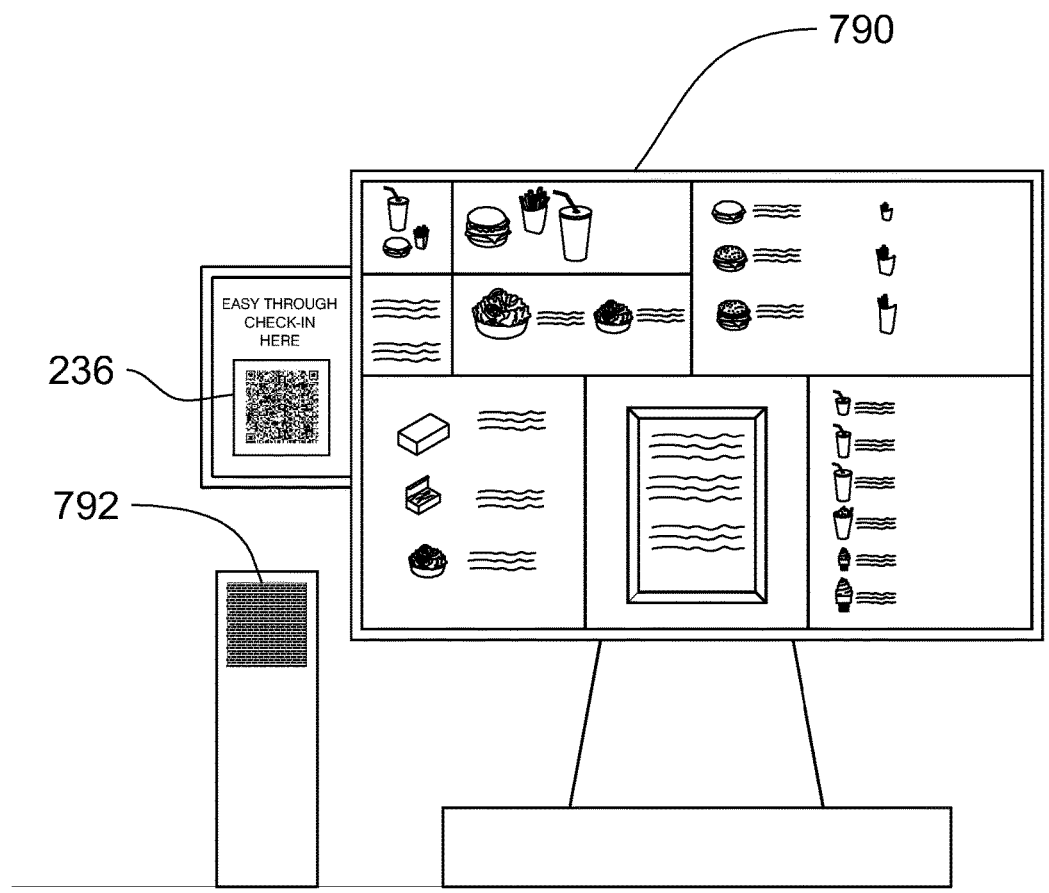
FIG. 28 depicts a location verification marker along a drive-thru lane of a restaurant venue according to a particular embodiment.

In the example discussed above in the process flow associated with FIGS. 10A and 10B, the Current Order designated pickup at counter as the method of order receipt. However, as discussed above, there are other options in some embodiments, such as pickup at a drive thru window, delivery to a curb-side location on the venue premises, or delivery to a location off the premises. The latter option will be discussed further below, but receipt via drive thru and curb-side delivery will be discussed in association with FIGS. 27 and 28. FIG. 27 shows an aerial view of a venue property 780, such as a quick service restaurant. The restaurant building 781 is surrounded by parking spaces and a drive thru lane 782. Arrows are used to show the direction of traffic flow. A conventional menu board 790 is located along the drive-thru lane 782, which is used to receive orders in the traditional manner. A closer, frontal view of the menu board 790 is shown in FIG. 28. As can be seen in FIG. 28, the menu board 790 has been modified to also include a location verification marker 236. As discussed above, this need be nothing more than a large QR code that is used to check in an order with the OMS 100. Since this location verification marker 236 is outside it will need to be protected from environmental factors, for example, by printing it on a metal sign, covering a traditional poster in laminate, and/or providing some shade to prevent sun-fade.

Checking in an OMS order in the drive-thru lane proceeds in basically the same way as shown in the process flow of FIGS. 10A and 10B, except that there would be no order ready board 232 and no OMS pick-up point 230. An order number 234 would still be generated and could still be sent through to the user's mobile device 140 for use in showing a venue employee at the pickup window (not shown). Also, if there were problems with or changes desired to the Current Order (such as at decision points 1031 or 1057 of FIG. 10B), the OMS 100 may be set up to more quickly instruct the user to place the order using the traditional menu board 790 and relay the order to the venue personnel through the speaker box 792 instead of trying to fix the problem or make the change via the mobile user device 140 while sitting in the drive thru lane blocking traffic. The "proceed to counter" step 1025 of FIG. 10A or 10B would instead be an instruction to proceed with placement of the order through the speaker box 792. In some cases, where space allows for a double drive thru lane, OMS traffic might be directed into an OMS designated lane to help keep things running smoothly for non-OMS traffic.

The curb-side locations 795 of FIG. 27 have been designated as parking spots for OMS 100 users. These spots could be located anywhere convenient within the parking lot of the venue where a location verification marker can be situated. As shown in FIG. 27, each spot has its own location verification marker. The markers might be slightly unique, such that they can convey to the venue personnel (from the mobile user device 140, through the OMS server 110 and venue server 120 to a venue POS machine 220 on the inside of the store) exactly which curbside spot the user is occupying. Alternatively, there may be a single location verification marker 236 for curb-side check-in that users scan as they pass by, and then instructions are sent from the venue server 120, through OMS server 110 to the mobile user device 140 instructing the user where to park and await their order. Because there is no one waiting in line behind the user in the curb-side scenario, there is more allowance for a user to correct or change an order from their vehicle while at the venue property 780. However, if an error occurs that does not allow the Current Order to release, the user will be instructed to proceed with a manual order by entering the venue building 781 or using the drive thru lane 782.

In some cases, some venues within an organization will not offer OMS use via drive-thru or curbside, while other venues within the organization will. This problem can be dealt with during order setup. For example, this information could be conveyed to a user during venue selection (step 915 of FIG. 9, for example) using a venue details screen such as that shown in FIG. 14. Based on the venue selection made, the OMS server 110 would only allow selection of a receipt method (step 940 of FIG. 9, using a screen such as that of FIG. 19) that is allowed at that venue.

The situation gets slightly more difficult when a venue only offers OMS via curbside or drive thru at certain times. For example, a venue might offer OMS curbside during peak hours (so as to handle more customers simultaneously and cut down on line length), and might not allow OMS via drive thru during those hours (because the drive thru traffic is likely to be heavy already). While this information may be conveyed to a user on a venue details screen such as that of FIG. 14, that does not prohibit the scenario where the user sets up an OMS order for curbside or drive thru and then tries to check in the Current Order outside of those windows at the wrong pickup point. In such a case, there will need to be an additional check done by the OMS server 110 at step 1020 of FIG. 10A, for example. If the OMS server 110 determines that the Current Order calls for a receipt method only allowed during a certain time window and the user is trying to check in the Current Order outside that time window, the OMS server will cause the OMS application component 318 on the mobile user device 140 to provide an instruction that the user must pick up the order at the OMS pickup counter 230 inside the store. However, the user could otherwise proceed with checking in the order in accordance with FIGS. 10A and 10B from their vehicle.

In the off-venue delivery scenario, use of a location verification marker 236 is less important. This is because delivery will be to a pre-defined location. This may be one of several locations designated by the venue (which would be provided to the user for selection from a list during the order setup process), or could be to a location specified by the user. Just as with Quick Orders, the user could have pre-defined locations (favorite locations) stored in their user account on the OMS server 110 to choose from. In some cases, where available, the OMS 100 could select the venue that will produce the goods to be delivered based on the user specified delivery location. For example, the OMS server 110 could select the venue server 120 to communicate with based on its physical proximity to the user-designated location. This selection would need to take into account that some venues might not offer delivery, and others may not be staffed to make deliveries at a particular time. Thus, there may be a call from the OMS server 110 to the venue server 120 for the venue selected to check to see if (1) deliveries are presently being made and (2) if delivery to the user-designated location is acceptable. For example, the administrator for the venue may have set the venue server 120 to deny all requests for delivery to locations outside of a 10 mile radius. If the OMS server 110 cannot find a venue willing to make the delivery to the user-defined location, it will signal the OMS application component 318 on the user's remote device 140 to instruct the user that delivery is unavailable.

Another difference with off-venue delivery is that the user should specify up front when they want to take delivery. In cases where the user is coming to the venue, it is not so important to know when that will be because the order can be prepared upon the user's arrival. In the case of delivery, it would not be ideal for the user to "check-in" and request delivery (especially to a user-defined location) at some random later time, because the venue may not be staffed to make the delivery at that time and the "proceed to counter" default option would not be feasible. Thus, where delivery is selected during the order setup phase, not only must the user select a delivery location, they will ideally be requested to specify a delivery time. The OMS server 110 can then verify that delivery will be available from the selected venue at that time.

Finally, unlike with at-venue receipt, it is preferable with delivery to require payment at the time of order entry and submission. This prevents the risk that a delivery order is placed, prepared, and delivered, but no one is there to receive it or pay for it. Though payment could be accepted via traditional means upon delivery to a user able to show an order number screen 761 to a delivery person, ideally the user would be required to submit electronic payment prior to order submission. Because there will already be a designated delivery time and venue selected, the OMS server 110 will be able to coordinate with the venue server 110 to determine the final price and availability of items at the initial submission stage. Thus, the steps of FIG. 10 are mostly pulled forward to the setup and submission stage, such that the user receives an order number before ending the session with the OMS application 318. Then, upon delivery, the user needs only to show the order number to the delivery person and take receipt of the goods. Notably, the OMS 100 may not accept orders for delivery where the total amount is less than some pre-designated amount.

Another option unique to delivery available in some embodiments is a tracking feature that allows a user to determine the status of their order through the OMS application component 318 on their mobile user device 140 once the order has been placed. For example, at any time after the user has submitted the order, the user can log in to the OMS server 110 and view an order status screen (not shown) that shows the phase of the order preparation (e.g., awaiting preparation, being prepared, en route, etc.). This screen can also provide an estimated time of order arrival to help keep the user informed in the event of a delay. This capability could be enabled by communicating with the venue server 120, which, in turn, could be fed information from the fulfillment section of the venue as to when delivery orders are initiated, completed, and sent out for delivery. The delivery staff member could then carry a GPS-enabled device that is monitored by the OMS server 110, such that an accurate prediction of the delivery time may be updated based on the location of the delivery personnel. In some cases, this system may provide for 2-way communications between the OMS server 110 and the delivery person's device such that the delivery person can receive directions or other instructions from the OMS server 110.

While that completes the description of the principle components of the OMS 100, there are other features, options and differences that may be available in certain alternative embodiments. For example, in some embodiments a user may be able to specify a window during which they intend to check in the order at the order set up stage, such that the OMS server 110 can request a version of the venue specific menu that is expected to be offered at that time. Thus, if the user wants to set up a breakfast order from a quick service restaurant for pickup on his way to work the next morning, he can do so even though it is 10 PM and breakfast items are not a component of the current venue specific menu. Here, there would be an additional option to specify an anticipated check in time, such as between steps 915 and 920 on FIG. 9. The user would identify a time the next morning, and the OMS server 110 would then request and receive the breakfast menu from the selected venue. Assuming the user checks in during the proscribed window, everything should run smoothly. If he checks in several hours after the window and breakfast is no longer being served, the system will follow the order correction path starting at step 1040 of FIG. 10B.

In other embodiments, the OMS system 100 may be used to keep track of additional information for users beyond Quick Orders of favorite venues/delivery locations. For example, it could also keep track of order histories, such as what was purchased, on what date, and for what price. It could track when the order was picked up, and where. In the quick service restaurant example, it could also track nutritional information, such as calories in the orders, etc. It could also use the past order history to make product recommendations to the user during the order set up process for new or limited time goods that fit the user's buying habits and profile.

In still other embodiments, particularly for use by organizations that offer stored value cards, the OMS system 100 could be used as a stored-value system in association with, or separate from, that program. For example, a user could purchase "OMS bucks" by authorizing the OMS server 110 to charge some electronic payment card set up by the user and authenticated by the OMS. The amount charged would then be "credited" to the user's account on the OMS server 110. This amount could be displayed to the user through the OMS application component 318 upon request, and could be used to pay for orders made through the OMS 100. In some cases, third parties could credit the OMS user's account without actually placing any of their own card payment information on the account. In this manner, the OMS 100 could be used as an equivalent to a gift card system that uses traditional plastic stored value cards. Instead of buying a card and having value put on it, the third party would just log in to a gift interface of the OMS 100, select the user they wish to provide the gift, submit payment, and the purchased amount of "OMS bucks" would be credited to the user's account.

It has thus been described how the OMS 100 can be implemented to facilitate the placement and processing of remote orders, even in situations with dynamic menus and conditions, and in a multiple venue environment. Any process descriptions or blocks in figures, such as FIGS. 5, 8, 9, 10A and 10B, should be understood as representing modules, segments, or portions of code which include one or more executable instructions for implementing specific logical functions or steps in the process. Certain process steps may be executed out of order from that shown or discussed, additional steps may be included, or some steps discussed may be bypassed or not used, without departing from the scope of the invention as disclosed, as would be understood by those having ordinary skill in the art.

It should be emphasized that the above-described embodiments of the present invention, particularly, any "preferred" embodiments, are possible examples of implementations, merely set forth for a clear understanding of the principles of the invention. Many variations and modifications may be made to the above-described embodiment(s) of the invention without substantially departing from the spirit and principles of the invention. Also, it will be understood that the present invention can be adapted to use with venues other quick service restaurants, such as, for example, retail stores, convenience stores, or other venues where placement of remote orders for goods or services would be desired. Unless specifically stated otherwise in the language of the particular claim at issue, it is intended that the following claims include such other types of venues.

The invention claimed is:

1. An order management system comprising:
a mobile device having a processor, a wireless transceiver, a scanning lens, a display, and a memory, the processor configured to execute an application stored in the memory to present menu options to a user via the display, receive a venue selection and a menu option selection from the user, convert the venue selection and the menu option selection into order data, and read location verification markers via the scanning lens;
an order management system server at a first location and in wireless communication with the mobile device, via the wireless transceiver of the mobile device, the order management system configured to receive the order data from the mobile device while the mobile device is at a second location remote from the first location;
a plurality of venue servers, each venue server associated with a particular venue, each venue in a location remote from both the first and second locations, each venue server in communication with the order management system server and configured to provide real-time venue-specific menu information identifying goods presently available at the venue with which the venue server is associated, and to receive the order data from the order management system server; and
a first location verification marker positioned at a first venue where a first venue server is located, the first location verification marker comprising an indicia that uniquely identifies the first venue, and configured to be readable by the scanning lens of the mobile device;
wherein, in response to the scanning lens of the mobile device reading the first location verification marker, the mobile device is configured to transmit the indicia of the first location verification marker to the order management system server to indicate that the mobile device is at the first venue,
wherein, based on the indicia received from the mobile device, the order management system server is configured to determine whether the first venue at which the mobile device is located corresponds to the venue selection included in the order data received from the mobile device, and
wherein, in response to determining that the venue selection identifies a venue other than the first venue at which the mobile device is located, the order management system server transmits a response to the mobile device to cause the application to present menu options, via the display, to alter the order data.

2. The order management system of claim 1, wherein, in response to determining that the venue selection identifies the first venue at which the mobile device is located, the order management system server releases the order data to the first venue.

3. The order management system of claim 1, wherein, prior to receiving the venue selection, the order management system server recommends at least one of the venues from the plurality of venues based, at least in part, on its proximity to the second location.

4. The order management system of claim 1, wherein the indicia that uniquely identifies the first venue is a QR code.

5. The order management system of claim 1, wherein the venue specific menu information for the first venue is updated multiple times each day to reflect changes in the plurality of goods offered at the first venue.

6. The order management system of claim 1, wherein the order management system server stores the order data as a quick order for use in the generation of subsequent current orders by application software stored in the memory of the mobile device.

7. The order management system of claim 1, wherein the order data identifies a receipt method from the list of receipt methods consisting of pickup at counter, drive-thru, and curb-side delivery.

8. The order management system of claim 1, wherein the order management system server releases the order data to the first venue for production upon verifying receipt of payment for the one or more goods identified in the order data.

9. An order management system comprising:
a mobile device having a processor, a wireless transceiver, a scanning lens, a display, and a memory, the processor configured to execute an application stored in the memory to receive a request from a user that at least one time-sensitive menu item be produced by a selected venue, convert the request into order data, and read location verification markers via the scanning lens;
an order management system server at a first location and in wireless communication with the mobile device, via the wireless transceiver of the mobile device, the order management system configured to receive the order data from the mobile device while the mobile device is at a second location remote from the first location, wherein the selected venue is remote from the first location and the second location,
a plurality of venue servers, each venue server associated with a particular venue, each venue in a location remote from both the first and second locations, each venue server in communication with the order management system server and configured to provide real-time venue-specific menu information identifying goods presently available at the venue with which the venue server is associated, and to receive the order data from the order management system server;
a first location verification marker positioned at a first venue where a first venue server is located, the first location verification marker comprising an indicia that uniquely identifies the first venue, and configured to be readable by the scanning lens of the mobile device;
wherein, in response to the scanning lens of the mobile device reading the first location verification marker, the mobile device is configured to transmit the indicia of the first location verification marker to the order management system server to indicate that the mobile device is at the first venue,
wherein, upon receiving the indicia, the order management system server is configured to determine whether the first venue at which the first location verification marker is located corresponds to the selected venue included in the request received from the mobile device, and
wherein, in response to determining that the selected venue corresponds with the first venue at which the first location verification marker is located, the order management system server is configured to release the order data received from the mobile device to the first venue for production of the at least one time-sensitive menu item at the first venue, and
wherein, in response to determining that the selected venue does not correspond with the first venue at which the first location verification marker is located, the order management system server is configured to cause the mobile device to present an alert indicating that the user is not at the selected venue.

10. The order management system of claim 9, wherein the order management system server generates an order number associated with the received request.

11. The order management system of claim 10, wherein the order management system server transmits the order number to the mobile device.

12. The order management system of claim 11, wherein the first venue server displays the order number on an order ready board once the at least one time-sensitive menu item has been produced and is ready to be received.

13. The order management system of claim 9, wherein the order management system server sends venue specific menu information to the mobile device, wherein the venue specific menu information is indicative of the time-sensitive menu items presently available to be produced by the first venue.

14. The order management system of claim 9, wherein the indicia that uniquely identifies the first venue is a QR code.

15. The order management system of claim 9, wherein the venue specific menu information for the first venue is updated multiple times each day to reflect changes in the plurality of goods offered at the first venue.

16. The order management system of claim 9, wherein the order management system server stores the order data as a quick order for use in the generation of subsequent current orders by application software stored in the memory of the mobile device.

17. The order management system of claim 9, wherein the order management system server verifies that the at least one time-sensitive menu item is presently available from the first venue.

18. The order management system of claim 1, further including a second location verification marker positioned at the first venue, wherein the first location verification marker is at a first position at the first venue and the second location verification marker is at a second position at the first venue, wherein the first position is different than the second position.

19. The order management system of claim 18, wherein the first position is within an interior of the first venue and the second position is at an exterior of the first venue, wherein the order management system server is configured to identify that the user is at the first venue for dine-in or pickup in response to receiving the first location verification marker, wherein the order management system server is configured to identify that the user is at the first venue for drive-thru or curbside delivery in response to receiving the second location verification marker.

20. The order management system of claim 18, wherein the first position is a first exterior position of the first venue and the second position is a second exterior position of the first venue.

21. The order management system of claim 20, wherein the first position is at a menu board for drive-thru and the second position is at a curbside spot, wherein the order management system server is configured to identify that the user is at the first venue for drive-thru in response to receiving the first location verification marker, wherein the order management system server is configured to identify that the user is at the first venue for curbside delivery in response to receiving the second location verification marker.

22. The order management system of claim 20, wherein the first position is at a first curbside spot and the second position is at a second curbside spot different than the second curbside spot to enable the order management system server to identify a position of the user for curbside delivery.

23. An order management system comprising:
- an order management system server at a first location and in wireless communication with a mobile device of a user, the order management system configured to:
  - receive and hold order data from the mobile device when the mobile device is at a second location different than the first location, the order data including a menu selection and a selected venue, and
  - accept changes to the order data while the order data is held;
- a first venue server located at and associated with a first venue, the first venue being remotely located relative to the first position and the second location, the first venue server in communication with the order management system server to provide real-time venue-specific menu information identifying goods presently available at the first venue and to receive the order data from the order management system server; and
- a first location verification marker located at and associated with the first venue, the first location verification marker includes an indicia that uniquely identifies the first venue, the first location verification marker is configured to be readable within an image captured by the mobile device, wherein, the order management system server is configured to identify that the user is at the first venue in response to receiving information from the mobile device that is derived from the first location verification marker, wherein, in response to identifying that the user is at the first venue, the order management system server is configured to determine whether the first venue at which the user is located is the selected venue of the order data submitted by the mobile device of the user, wherein, in response to determining that the first venue is the selected venue, the order management system server is configured to release the order data received from the mobile device to the first venue for production of the at least one time-sensitive menu item at the first venue, and wherein, in response to determining that the first venue is not the selected venue, the order management system server is configured to cause the mobile device to present an alert indicating that the user is not at the selected venue and to not release the order data to the first venue server.

24. The order management system of claim 23, wherein, in response to determining that the first venue is not the selected venue, the order management system server is further configured to cause the mobile device to present menu options to enable the user to alter the order data.

25. The order management system of claim 24, wherein in response to receiving altered order data from the mobile device, release the order data to the first venue server.

* * * * *